(12) United States Patent
Tokunaga et al.

(10) Patent No.: US 6,958,366 B2
(45) Date of Patent: Oct. 25, 2005

(54) ANTIFOULING COATING COMPOSITION AND NOVEL RESIN

(75) Inventors: Koji Tokunaga, Osaka (JP); Masataka Ooka, Ikoma (JP); Hiroo Tanaka, Osaka (JP); Asako Oda, Osaka (JP); Hiroshi Matsuzawa, Izumiotsu (JP); Makoto Tsuboi, Otake (JP); Eiichi Yoshikawa, Otake (JP); Yasuhiro Yuki, Otake (JP); Satoshi Hiyoshi, Yokohama (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 310 days.

(21) Appl. No.: 10/240,759

(22) PCT Filed: Apr. 12, 2001

(86) PCT No.: PCT/JP01/03158

§ 371 (c)(1),
(2), (4) Date: Oct. 11, 2002

(87) PCT Pub. No.: WO01/77238

PCT Pub. Date: Oct. 18, 2001

(65) Prior Publication Data

US 2003/0118544 A1 Jun. 26, 2003

(30) Foreign Application Priority Data

Apr. 12, 2000 (JP) ........................................ 2000-110833
Apr. 12, 2000 (JP) ........................................ 2000-110935

(51) Int. Cl.$^7$ .............................. C08K 3/20; C08F 20/06
(52) U.S. Cl. ...................... 523/122; 524/413; 524/432; 526/317.1; 526/318
(58) Field of Search .......................... 523/122; 524/413, 524/432; 526/317.1, 318

(56) References Cited

U.S. PATENT DOCUMENTS 5,116,611 A 5/1992 Masuoka et al.
6,211,273 B1 * 4/2001 Bru-Magniez et al. ...... 524/365
6,479,566 B2 * 11/2002 Lines et al. ................. 523/122

FOREIGN PATENT DOCUMENTS

EP 0 297 505 1/1989

| JP | 58-47066 | 3/1983 |
|---|---|---|
| JP | 63-61989 | 11/1988 |
| JP | 2-674 | 1/1990 |
| JP | 2-675 | 1/1990 |
| JP | 8-512287 | 12/1996 |
| JP | 2001-504530 | 4/2001 |
| WO | WO 94/24168 | 10/1994 |
| WO | WO 98/18455 | 5/1998 |
| WO | WO 99/38898 | 8/1999 |

OTHER PUBLICATIONS

Cochin et al.; New substituted polymethylenes by free radical polymerization of bulky fumarates and their properties; Polymer, vol. 41, No. 11, pp. 3895–3903; May 2000. See PCT search report.

* cited by examiner

Primary Examiner—Kriellion A. Sanders
(74) Attorney, Agent, or Firm—Armstrong, Kratz, Quintos, Hanson & Brooks, LLP

(57) ABSTRACT

An antifouling coating composition having an excellent coating film strength and also has markedly superior antifouling properties, and a novel resin which is useful as a matrix resin for the composition are provided. The antifouling coating composition comprises a vinyl polymer (A) having, as a repeating unit, a structural unit (a) represented by the following formula (1):

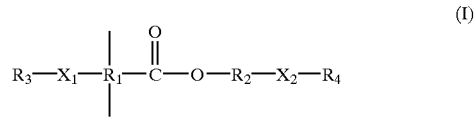

(I)

(in the formula (1), $X_1$ and $X_2$ each independently represents an ester bond or a carbonyl group; $R_1$ represents an ethylene structure which forms a covalent bond with the carbonyl carbon atom and $X_1$ in the formula (1) at the same or adjacent carbon atom; $R_2$ represents a gem-alkylene group, a vic-alkylene group, an arylmethylidene group or an arylethylene group; and $R_3$ and $R_4$ represent an alkyl group or an aryl group, or a hydrocarbon group having a carbonyl group, an ether bond or an ester bond) and an antifouling agent (B).

14 Claims, 24 Drawing Sheets

ANTIFOULING COATING COMPOSITION AND NOVEL RESIN

TECHNICAL FIELD

The present invention relates to an antifouling coating composition which is useful as antifouling coatings and various outdoor coatings to be applied on structures in seawater, vessels, and fishing nets, etc., and relates to a novel resin which is useful as a vehicle component for an antifouling coating.

BACKGROUND ART

The bottoms of vessels, structures in seawater, and fishing nets are immersed in seawater for prolonged periods during use and thus there arises a problem that adhesion and growth of various aquatic organisms, for example, marine animals such as oysters, hard-shelled mussels and barnacles, plants such as layer, or bacteria, on the surface, impair the appearance and the function thereof. Particularly, adhesion and growth of these aquatic organisms on vessel bottoms increase the surface roughness, thereby reducing the vessel speed and the fuel efficiency. A great deal of labor is required to remove these aquatic organisms from the vessel bottoms.

To prevent damage due to adhesion of aquatic organisms, an antifouling coating having excellent antifouling properties, for example, a coating containing a copolymer of tributyltin methacrylate (hereinafter abbreviated to TBTMA) and cuprous oxide, has hitherto been coated on the vessel bottoms. The coating film obtained from the antifouling coating can always maintain an active surface as a so-called "hydrolyzable self-polishing type coating film" which exerts an antifouling effect by releasing an organotin compound such as hexabutyldistannoxane or tributyltin halide as a result of hydrolysis of the copolymer in seawater.

However, since the organotin compound produced by hydrolysis of the copolymer of TBTMA is highly toxic, there is fear of adverse effects on the ecosystem due to ocean pollution.

Japanese Examined Patent Application, Second Publication No. Sho 63-61989 discloses a technology of using an antifouling coating containing a tin-free polymer as a vehicle component, wherein cuprous oxide as an antifouling agent is released as a result of dissolution of a matrix resin, thereby imparting antifouling properties. The vehicle component (a matrix resin) used in this technology is an alkoxyalkyl acrylate homopolymer or a copolymer of an alkoxyalkyl acrylate and a monomer containing no carboxyl or hydroxyl group.

However, the antifouling coating described in Japanese Examined Patent Application, Second Publication No. Sho 63-61989 is actually insufficient in solubility and in hydrolyzability of the matrix resin in seawater because the coating is designed considering the film strength of major importance. Consequently, practical antifouling properties could not be obtained.

DISCLOSURE OF INVENTION

An object to be achieved by the present invention is to provide an antifouling coating composition having an excellent coating film strength and excellent antifouling properties, and a novel resin which is useful as a matrix resin for the composition.

To achieve the above object, the present inventors have intensively researched and have found that the use of a vinyl polymer having, as a repeating unit, a specific structure having a specific electron-withdrawing group and a specific ester group as the matrix resin imparts an excellent coating film strength and markedly enhance the hydrolyzability of the matrix resin, thereby yielding an antifouling coating film having excellent antifouling properties and excellent long-term antifouling properties. Thus, the present invention has been completed.

The present invention is directed to an antifouling coating composition comprising a vinyl polymer (A) having, as a repeating unit, a structural unit (a) represented by the following formula (1):

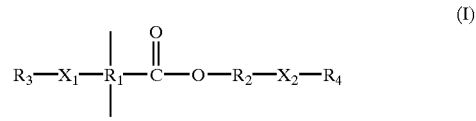

(1)

(in the formula (1), $X_1$ and $X_2$ each independently represents an ester bond or a carbonyl group; $R_1$ represents an ethylene structure which forms a covalent bond with the carbonyl carbon atom and $X_1$ in the formula (1) at the same or adjacent carbon atom; $R_2$ represents a gem-alkylene group, a vic-alkylene group, an arylmethylidene group or an arylethylene group; and $R_3$ and $R_4$ represent an alkyl group or an aryl group, or a hydrocarbon group having a carbonyl group, an ether bond or an ester bond) and an antifouling agent (B).

Furthermore, the present invention is directed to a resin which has a weight-average molecular weight within a range from 1,000 to 300,000 and comprises, as a repeating unit, a structural unit (a2) represented by the following formula (2):

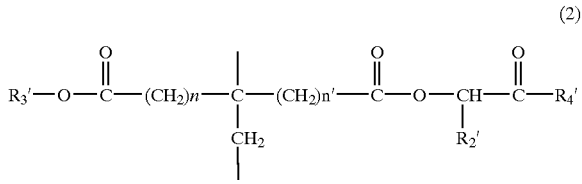

(2)

(in the formula (2), $R_2'$ represents a group selected from an alkyl group having 1 to 11 carbon atoms, a benzyl group, a phenyl group and a methylphenyl group, or a hydrogen atom; $R_3'$ represents a structure of R—, R—O—R'—, R—O—CO—CH($R_2'$)—, R—CO—CH($R_2'$)— or R—O—R'—O—CO—CH($R_2'$)—; $R_4'$ represents a structure of R—, R—O—, R—O—R'— or R—O—R'—O—, in which R represents an alkyl group having 1 to 8 carbon atoms, a benzyl group, a phenyl group, a naphthyl group or a methylphenyl group and R' represents an alkylene group having 1 to 8 carbon atoms; and n and n' each independently represents an integer of 0 or 1).

Furthermore, the present invention is directed to a resin which has a weight-average molecular weight within a range from 1,000 to 300,000 and comprises, as a repeating unit, the structural unit (a2) and a structural unit (b) as a divalent group, which is derived from a (meth)acrylate, a vinyl alkylcarboxylate, a (meth)acrylamide compound and an aromatic vinyl compound, wherein a ratio of the structural unit (a2) to the structural unit (b), [structural unit (a2)/structural unit (b)], is within a range from (1/99) to (70/30) in terms of the number of each structural unit.

Furthermore, the present invention is directed to a resin which has a weight-average molecular weight within a range from 1,000 to 300,000 and comprises, as a repeating unit, a structural unit (a3) represented by the following formula (3):

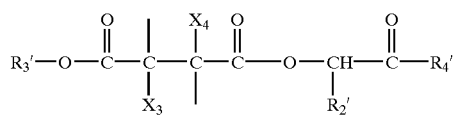

(3)

(in the formula (3), $R_2'$ represents a group selected from an alkyl group having 1 to 11 carbon atoms, a benzyl group, a phenyl group and a methylphenyl group, or a hydrogen atom; $R_3'$ represents a structure of R—, R—O—R'—, R—O—CO—CH($R_2'$)—, R—CO—CH($R_2'$)— or R—O—R'—O—CO—CH($R_2'$)—; $R_4'$ represents a structure of R—, R—O—, R—O—R'— or R—O—R'—O—; and $X_3$ and $X_4$ each independently represents a hydrogen atom or a methyl group; in which P represents an alkyl group having 1 to 8 carbon atoms, a benzyl group, a phenyl group, a naphthyl group or a methylphenyl group and R' represents an alkylene group having 1 to 8 carbon atoms).

Furthermore, the present invention is directed to a resin which has a weight-average molecular weight within a range from 1,000 to 300,000 and comprises, as a repeating unit, the structural unit (a3) and a structural unit (b) as a divalent group, which is derived from a (meth)acrylate, a vinyl alkylcarboxylate, a (meth)acrylamide compound and an aromatic vinyl compound, wherein a ratio of the structural unit (a3) to the structural unit (b), [structural unit (a3)/structural unit (b)], is within a range from (1/99) to (70/30) in terms of the number of each structural unit.

The present invention will now be described in detail.

As described previously, the vinyl polymer (A) used in the antifouling coating composition of the present invention has, as a repeating unit, a structural unit (a) represented by the following formula (1):

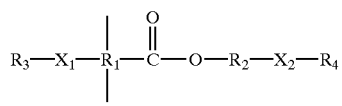

(I)

(in the formula (1), $X_1$ and $X_2$ each independently represents an ester bond or a carbonyl group; $R_1$ represents an ethylene structure which forms a covalent bond with the carbonyl carbon atom and $X_1$ in the formula (1) at the same or adjacent carbon atom; $R_2$ represents a gem-alkylene group, a vic-alkylene group, an arylmethylidene group or an arylethylene group; and $R_3$ and $R_4$ represent an alkyl group or an aryl group, or a hydrocarbon group having a carbonyl group, an ether bond or an ester bond).

Because of having such a repeating unit, the vinyl polymer (A) imparts excellent film strength to the coating film, thereby improving long-term antifouling properties of the coating film. Since structure moieties $X_1$ and $X_2$ each having electron-withdrawing nature enhance the activity of the ester structure, the hydrolyzability is markedly enhanced.

The present invention is characterized in that, $X_1$ and a carbonyl carbon atom of the ester bond, and $X_2$ and the ether oxygen atom of the ester bond are bonded through one or two carbon atoms in the formula (1), whereby the hydrolyzability is markedly enhanced by the synergistic electron-withdrawing effect of the electron attractive groups $X_1$ and $X_2$. $R_1$ is a hydrocarbon group which forms a covalent bond with the carbonyl carbon atom and $X_1$ in the formula (1) at the same or adjacent carbon atom, and also forms a main chain or a polymer chain. $R_1$ is preferably an aliphatic hydrocarbon group having 2 or 3 carbon atoms. Specific examples thereof include those represented by the following structures in the formula (1).

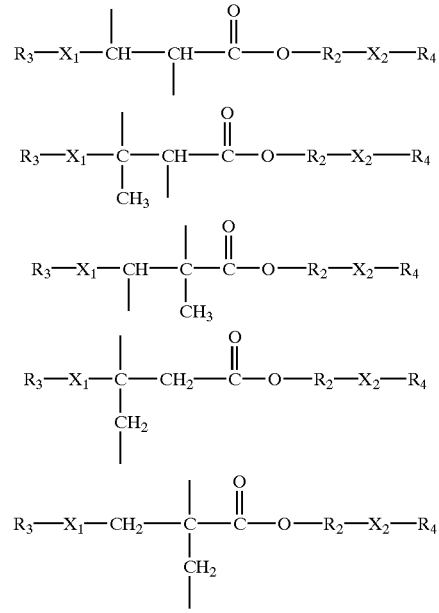

In the formula (1), $R_2$ represents a gem-alkylene group, a vic-alkylene group, an arylmethylidene group or an arylethylene group. The group selected therefrom is preferably a gem-alkylene group having 1 to 12 carbon atoms, a vic-alkylene group having 2 to 12 carbon atoms, a phenylmethylidene group, a methylphenylmethylidene group, a phenylethylidene group or a phenylethylene group in view of antifouling properties, and particularly preferably a gem-alkylene group because the hydrolyzability of the coating film is markedly improved.

Examples of the gem-alkylene group having 1 to 12 carbon atoms include methylene group, ethylidene group, n-propylidene group, iso-butylidene group, neopentylidene group, n-pentylidene group, n-hexylidene group, n-octylidene group, 2-ethylhexylidene group, n-decylidene group and n-dodecylidene group. Examples of the vic-alkylene group having 2 to 12 carbon atoms include vic propylene group, vic-butylene group, vic-pentylene group, vic-hexylene group, vic-octylene group, vic-(2-ethyl) hexylene group, vic-decylene group and n-dodecylidene group.

Among these groups, a methylene group or an alkylidene group having 1 to 5 carbon atoms is preferred in view of the hydrolyzability. Among these groups, a methylene group or an ethylidene group is preferred and methylene group is particularly preferred.

As described above, $X_1$ and $X_2$ are selected from a carbonyl group and an ester bond. An electron-withdrawing group selected from these functional groups activates the ester bond in the formula (1) and suppresses the excessive increase in the polarity of the vinyl polymer, thereby improving the hydrolyzability of the objective vinyl polymer (A) of the present invention and the durability thereof. In case the electron-withdrawing ability is too high, the effect of activating the ester bond in the formula (1) is enhanced. However, the polarity of the vinyl polymer (A) itself increases and the vinyl polymer (A) tends to dissolve easily in seawater, and thus the coating film becomes inferior in long-term antifouling properties and durability of antifouling properties. On the other hand, when the electron-withdrawing ability is too low, the effect of activating the ester bond in the formula (1) is not exerted although long-term antifouling properties are improved by suppressing the elution of the vinyl polymer (A) in seawater.

Therefore, in the present invention, by introducing an electron-withdrawing group selected from an ester bond and a carbonyl group into the vinyl polymer (A), the ester group in the formula (1) is activated while maintaining the strength of the coating film. This leads to a marked enhancement of hydrolyzability.

$R_3$ and $R_4$ represent an alkyl group or an aryl group, or a hydrocarbon group having a carbonyl group, an ether bond or an ester bond. Specifically, a structural unit (a2) represented by the following formula (2) and a structural unit (a3) represented by the formula (3) are preferred as the structural unit (a) in view of the coating film strength, antifouling properties and long-term antifouling properties.

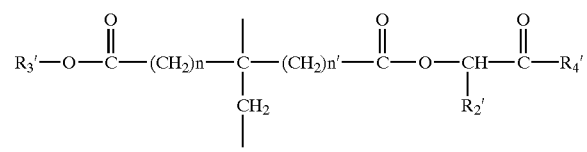

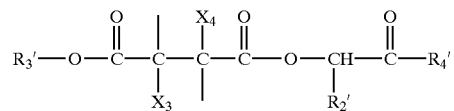

In the formulas (2) and (3), $R_2'$ represents a group selected from an alkyl group having 1 to 11 carbon atoms, a benzyl group, a phenyl group and a methylphenyl group, or a hydrogen atom; $R_3'$ represents a structure of R—, R—O—R'—, R—O—CO—CH($R_2'$)—, R—CO—CH($R_2'$)— or R—O—R'—O—CO—CH($R_2'$)—; and $R_4'$ represents a structure of R—, R—O—, R—O—R'— or R—O—R'—O—. R represents an alkyl group having 1 to 8 carbon atoms, a benzyl group, a phenyl group, a naphthyl group or a methylphenyl group and R' represents an alkylene group having 1 to 8 carbon atoms.

In the formula (2), n and n' each independently represents an integer of 0 or 1. In this case, any one of n and n' is preferably 0 and the other one is preferably 1.

In the formula (3), $X_3$ and $X_4$ represent a hydrogen atom or a methyl group. In this case, any one of $X_3$ and $X_4$ is preferably a hydrogen atom and the other one is preferably a methyl group, or both of them are preferably hydrogen atoms.

Among the structural unit (a2) represented by the formula (2), structures I-1 to I-9 are particularly preferred because satisfactory hydrolyzability of the coating film improves antifouling properties.

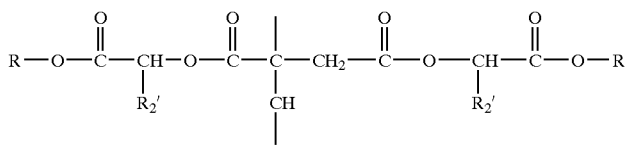

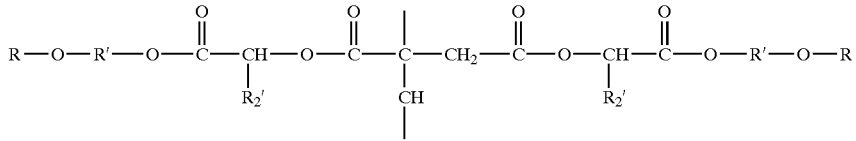

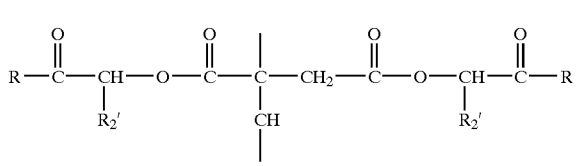

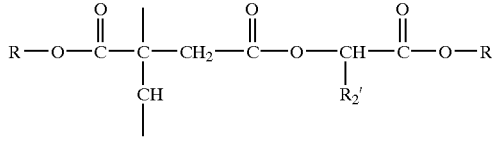

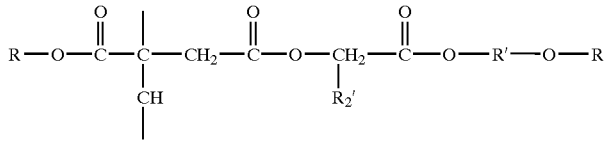

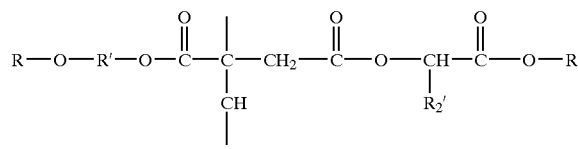

I-6

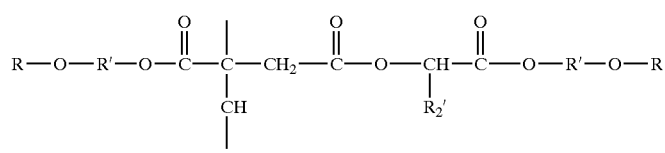

I-7

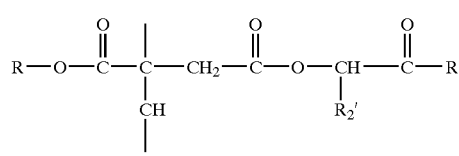

I-8

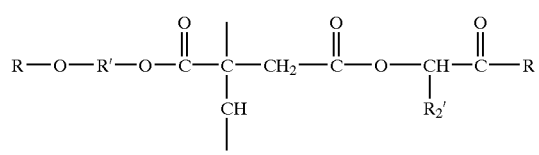

I-9

Among the structures I-1 to I-9, structures I-5 to I-9 include isomer s having a structure wherein the group to the right of the —C—CH₂— and the group to the left of the —C—CH₂— are switched.

In the structures I-1 to I-9, R includes, for example, an alkyl group having 1 to 8 carbon atoms selected from a methyl group, an ethyl group, a n-propyl group, an isopropyl group, an n-butyl group, an isobutyl group, a tert-butyl group, a cyclopentyl group, an n-hexyl group, a cyclohexyl group, a 4-methylcyclohexyl group, an n-octyl group, and a cyclooctyl group, or a beuzyl group, a phenyl group, a naphthyl group or methylphenyl group, and is preferably an alkyl group having 1 to 5 carbon atoms. Among these groups, a methyl group, an ethyl group or a butyl group are particularly preferred because the polarity of the vinyl polymer (A) is increased and the resulting coating film is superior in hydrolyzability.

R' includes, for example, an alkylene group such as methylene group, ethylene group, propylene group or butylene group, or a phenylene group, and is preferably an ethylene group because the resulting coating film is superior in hydrolyzability.

$R_2'$ includes, for example, a group selected from an alkyl group having 1 to 11 carbon atoms, a benzyl group, a phenyl group and a methylphenyl group, or a hydrogen atom. The alkyl group having 1 to 11 carbon atoms includes, for example, a methyl group, an ethyl group, an n-propyl group, an isopropyl group, an n-butyl group, an isobutyl group, a tert-butyl group, a cyclopentyl group, an n-hexyl group, a cyclohexyl group, a 4-methylcyclohexyl group, an n-octyl group, a cyclooctyl group, a nonyl group, a decyl group or an dodecyl group. $R_2'$ is preferably a methyl group or a hydrogen atom because the resulting coating film is superior in hydrolyzability.

As the structural unit (a3) represented by the formula (3), the following structures are particularly preferred because satisfactory hydrolyzability of the coating film improves antifouling properties.

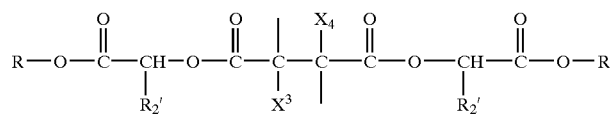

II-1

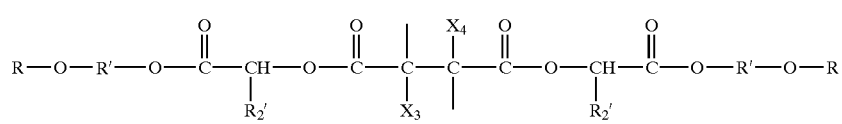

II-2

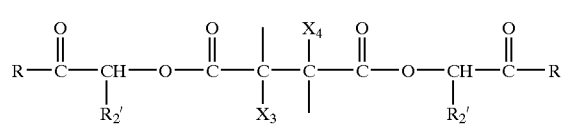

II-3

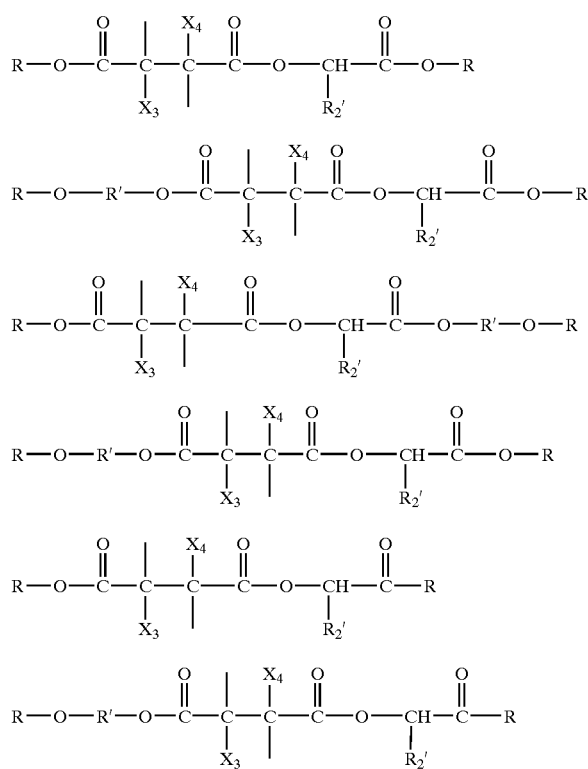

II-4

II-5

II-6

II-7

II-8

II-9

In the structures II-1 to II-9, R includes, for example, an alkyl group having 1 to 8 carbon atoms selected from a methyl group, an ethyl group, an n-propyl group, an isopropyl group, an n-butyl group, an isobutyl group, a tert-butyl group, a cyclopentyl group, an n-hexyl group, a cyclohexyl group, a 4-methylcyclohexyl group, an n-octyl group and cyclooctyl group, or a benzyl group, a phenyl group, a naphthyl group or a methylphenyl group. Among these groups, R is preferably an alkyl group having 1 to 5 carbon atoms, particularly a methyl group, an ethyl group or a butyl group because the polarity of the vinyl polymer (a) is increased and the resulting coating film is superior in hydrolyzability.

R' includes, for example, an alkylene group such as a methylene group, ethylene group, propylene group or butylene group, or a phenylene group, and is preferably an ethylene group because the resulting coating film is superior in hydrolyzability.

$R_2'$ includes, for example, a group selected from an alkyl group having 1 to 11 carbon atoms, a benzyl group, a phenyl group and a methylphenyl group, or hydrogen atom. The alkyl group having 1 to 11 carbon atoms includes, for example, a methyl group, an ethyl group, a propyl group, an n-butyl group, a tert-butyl group, a cyclopentyl group, an n-hexyl group, a cyclohexyl group, a 4-methylcyclohexyl group, an n-octyl group, a cyclooctyl group, a nonyl group, a decyl group or a dodecyl group. $R_2'$ is preferably a methyl group or a hydrogen atom because the resulting coating film is superior in hydrolyzability.

$X_3$ and $X_4$ represent a hydrogen atom or a methyl group. In this case, any one of $X_3$ and $X_4$ is preferably a hydrogen atom and the other one is preferably a methyl group, or both of them are preferably hydrogen atoms.

The vinyl polymer (A) is preferably a polymer which contains in addition to the structural unit (a), a structural unit (b) as a divalent group derived from a (meth)acrylate, a (meth)acrylamide compound, a vinyl alkylcarboxylate and an aromatic vinyl compound, in a ratio of [structural unit (a)/structural unit (b)] within a range from (1/99) to (70/30) in terms of the number of each structural unit. By introducing a structural unit (b), the degree of polymerization is enhanced in the preparation of the vinyl polymer (A). Thus, it is possible to markedly increase the coating film strength and to impart various performances to the coating film depending on the structural unit (b) to be introduced. From the point of further improving these performances, [structural unit (a)/structural unit (b)] is particularly preferably within a range from (5/95) to (50/50).

By introducing the divalent group derived from the (meth) acrylate and vinyl alkylcarboxylate, the coating film strength is markedly increased.

By introducing the divalent group derived from the (meth) acrylamide compound, the hydrophilicity of the coating film is improved, and then the hydrolyzability is improved. By introducing the divalent group derived from the aromatic vinyl compound, the hardness of the coating film is markedly increased.

When using the (meth)acrylate and the (meth)acrylamide compound, a group selected from a hydroxyl group, a tertiary amino group, a silyl ether group and a polyoxyalkylene group is preferably introduced into the molecular structure, because the hydrophilicity of the coating film is improved and then the hydrolyzability is improved and, particularly, antifouling properties of antifouling coatings for vessel bottoms are markedly improved.

Specifically, the content of the group selected from a hydroxyl group, a tertiary amino group, a silyl ether group and a polyoxyalkylene group in the vinyl polymer (A) is preferably within a range from 0.5 to 30 mol %, and more preferably from 1.0 to 20 mol %, in terms of the amount of the structural unit (b) having such a group.

The vinyl polymer (A) may contain both the structural unit (a) and the structural unit (b), or may contain one or more kinds of the structural units (a) as a main constituent unit. In the case in which the polymer contains the structural unit (a) as a main constituent unit, the amount of the structural unit (a) is preferably 99.0 mol % or more based on the vinyl polymer (A).

Although the molecular weight of the vinyl polymer (A) is not specifically limited, the weight-average molecular weight measured by gel permeation chromatography (GPC) is preferably within a range from 1,000 to 300,000, more preferably from 1,000 to 150,000, and particularly preferably from 1,000 to 100,000, in view of long-term antifouling properties of the coating film.

GPC data were obtained by using liquid chromatograph LC-08 manufactured by Japan Analytical Industry Co., Ltd. as a measuring apparatus, polystyrene packed column SHODEX ((A-805)+(A-804)+(A-803)+(A-802)) manufactured by Showa Denko K. K. as a column and tetrahydrofuran (THF) as an eluent, under the conditions of a low rate of 1 ml/min., a concentration of 0.4% and a measuring temperature of 25° C.

The method of preparing the vinyl polymer (A) described above in detail includes:

method 1: method of polymerizing a compound having a polymerizable unsaturated group corresponding to the structural unit (a) and, furthermore, a (meth)acrylate, a vinyl alkylcarboxylate or a (meth)acrylamide compound required to obtain a copolymer and, if necessary, an aromatic vinyl compound by means of bulk polymerization, solution polymerization or dispersion polymerization in an organic solvent, or suspension polymerization or emulsion polymerization in an aqueous medium, or method 2: method of reacting polymer having a carboxyl group, which is prepared by polymerizing an unsaturated dicarboxylic acid such as itaconic acid, maleic acid, fumaric acid, citraconic acid or mesaconic acid, or a half ester of the unsaturated dicarboxylic acid, with α-halocarboxylates and/or α-haloketones in the presence of a basic compound. Among these methods, the method 1 is preferred because the polymer is easily purified and thus the objective product can be obtained in a simple manner.

In the method 1, the radical polymerization method can be applied when the bulk polymerization or the polymerization in the aqueous medium is conducted. When the polymerization is conducted in the organic solvent, the anionic polymerization method or the radical polymerization method can be applied. Among these methods, the radical polymerization method is preferred and the solution radical polymerization method in the organic solvent is particularly preferred because it is the most convenient method.

When the vinyl polymer of the present invention is prepared by the solution radical polymerization method, conventional organic solvents are used. Typical examples thereof include aliphatic or alicyclic hydrocarbons such as n-hexane, n-heptane, n-octane, cyclohexane, cyclopentane and cyclooctane; aromatic hydrocarbons such as toluene, xylene and ethylbenzene; alcohols such methyl alcohol, ethyl alcohol, n-butyl alcohol, cyclohexanol, ethylene glycol monobutyl ether and propylene glycol monomethyl ether; esters such as ethyl acetate, n-butyl acetate, n-amyl acetate, ethylene glycol monoethyl ether acetate and ethylene glycol monobutyl ether acetate; ketones such as acetone, methyl ethyl ketone, methyl isobutyl ketone, methyl n-amyl ketone and cyclohexanone; ethers such as dimethoxyethane, tetrahydrofuran, dioxane, diisopropyl ether and di-n-butyl ether; and N-methylpyrrolidone, dimethylformamide, dimethylacetamide and ethylene carbonate.

As radical polymerization initiators used to conduct the solution radical polymerization in the organic solvent, various conventional compounds can be used. Examples thereof include azobisisobutyronitrile, dibenzoyl peroxide, tert-butylperoxy benzoate, tert-butylperoxy-2-ethylhexanoate, tert-butyl hydroperoxide, di-tert-butyl peroxide and cumene hydroperoxide.

Specific solution radical polymerization method includes various methods such as:

① method of charging all of a monomer, an organic solvent and a polymerization initiator in a reaction vessel and heating, ② method of adding a monomer and a polymerization initiator in a heated organic solvent, and ③ method of heating a mixture of a portion of a monomer and an organic solvent and adding the remaining monomer and a polymerization initiator in the mixture.

During the polymerization, the polymerization temperature is preferably within a range from 60 to 140° C. and the reaction time is preferably within a range from about 8 to 50 hours. The amount of the polymerization initiator is not specifically limited, but is preferably within a range from 0.5 to 10% by weight based on the monomer.

The polymerizable monomer corresponding to the structural unit (a) includes, for example, polymerizable monomers having an ester group represented by the following structures.

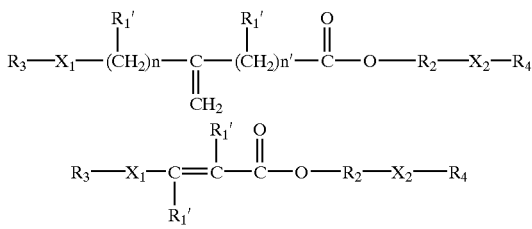

In the respective structures described above, $R_1'$ is a hydrogen atom or alkyl group, and is particularly preferably a hydrogen atom or a methyl group.

$R_2$ represents a gem-alkylene group, a vic-alkylene group, an arylmethylidene group, an arylethylidene group or an arylethylene group. The group selected from these groups is particulatly preferably a gem-alkylene group having 1 to 12 carbon atoms, a vic-alkylene group having 2 to 12 carbon atoms, a phenylmethylidene group, a phenylethylidene group, a methylphenylmethylidene group or a phenylethylene group from the point of good balance of the hydrolyzability and long-term antifouling properties.

Examples of the gem-alkylene group having 1 to 12 carbon atoms include methylene group, ethylidene group, n-propylidene group, iso-butylidene group, tert-butylated methylidene group, n-pentylidene group, n-hexylidene group, n-octylidene group, 2-ethylhexylidene group, n-decylidene group and n-dodecylidene group. Examples of the vic-alkylene group having 2 to 12 carbon atoms include vic-propylene group, vic-butylene group, vic-pentylene group, vic-hexylene group, vic-octylene group, vic-(2-ethyl) hexylene group, vic-decylene group and n-dodecylene group.

Among these groups, a methylene group or an alkylidene group having 1 to 5 carbon atoms is preferred in view of the hycirolyzability. A methylene group or an ethylidene group is more preferred and a methylene group is particularly preferred.

$X_1$ and $X_2$ are selected from a carbonyl group and an ester bond. $R_3$ and $R_4$ represent an alkyl group or an aryl group, or a hydrocarbon group having a carbonyl group, an ether bond or an ester bond. Specifically, itaconate ester derivatives represented by the following structural formulas I'-1 to I'-9 as well as fumaric acid ester derivatives, maleic acid ester derivatives, citraconic acid ester derivatives and mesaconic acid ester derivatives represented by II'-1 to II'-9 are particularly preferred because of excellent hydrolyzability of the vinyl polymer (A).

Specific examples of the itaconic acid ester derivatives represented by I'1 to I'-9 include the followings.

group, an n-butyl group, an isobutyl group, a tert-butyl group, a cyclopentyl group, an n-hexyl group, a cyclohexyl group, a 4-methylcyclohexyl group, an n-octyl group and a cyclooctyl group, or a benzyl group, a phenyl group, a naphthyl group or methylphenyl group, and is preferably an alkyl group having 1 to 5 carbon atoms, particularly a methyl group, an ethyl group or a butyl group because the polarity of the vinyl polymer (A)(is increased and the resulting coating film is superior in hydrolyzability.

R' includes, for example, an alkylene group such as a methylene group, an ethylene group, a propylene group or a butylene group, or a phenylene group, and is preferably an

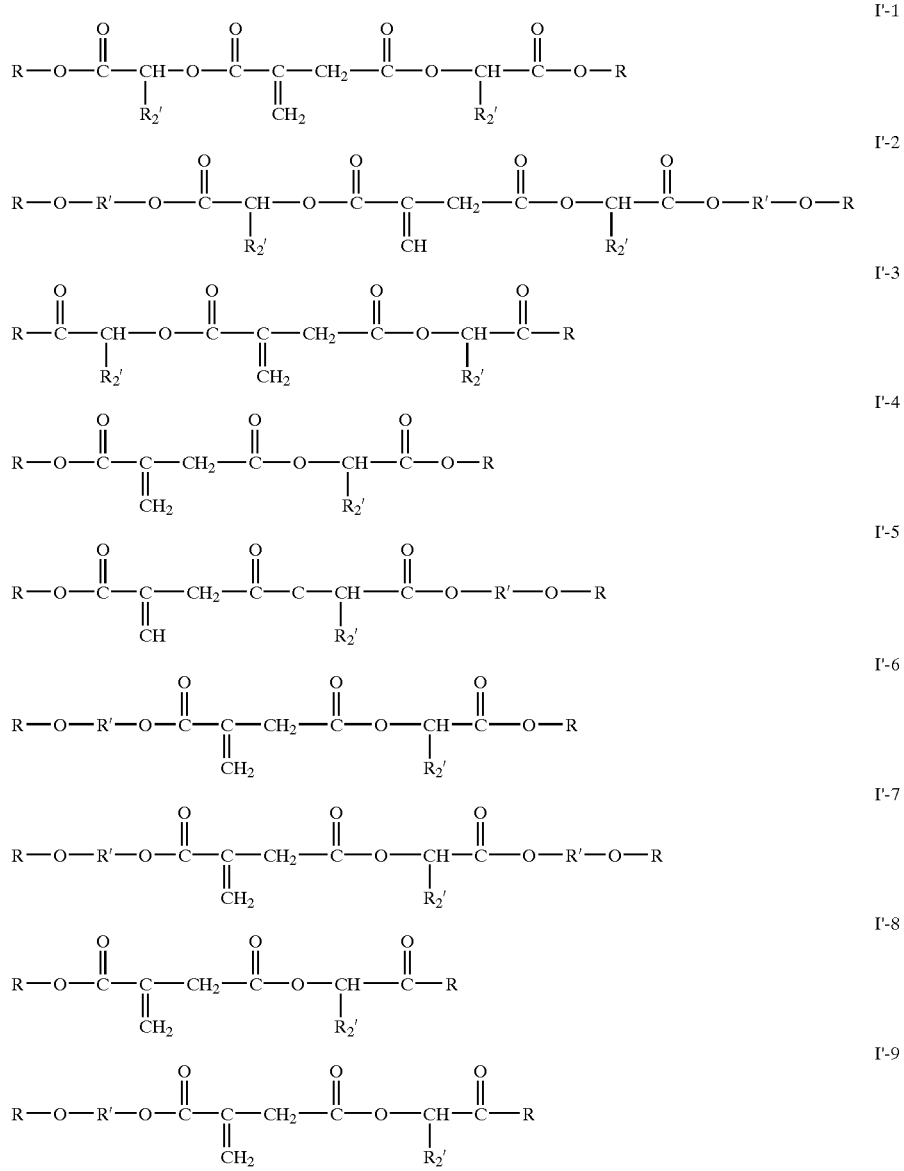

Among the structures I-'1 to I'9, structures I'-5 to I'-9 include isomers having a structure wherein the group to the right of the —C—CH$_2$— and the group to the left of the —C—CH$_2$— are switched.

In the structures I'-1 to I'9, R includes, for example, an alkyl group having 1 to 8 carbon atoms selected from a methyl group, an ethyl group, a n-propyl group, an isopropyl ethylene group because the resulting coating film is superior in hydrolyzability.

$R_2'$ includes, for example, a group selected from an alkyl group having 1 to 11 carbon atoms, a benzyl group, a phenyl group and a methylphenyl group, or a hydrogen atom. The alkyl group having 1 to 11 carbon atoms includes, for example, a methyl group, an ethyl group, an n-propyl group, an isopropyl group, an n-butyl group, an isobutyl group, a tert-butyl group, a cyclopentyl group, an n-hexyl group, a cyclohexyl group, a 4-methylcyclohexyl group, an n-octyl group, a cyclooctyl group, a nonyl group, a decyl group or a dodecyl group. R' is preferably a methyl group or a hydrogen atom because the resulting coating film is superior in hydrolyzability.

Among these polymerizable monomers, examples of those represented by I'-1 include bis(methoxycarbonylmethyl)itaconate, bis(ethoxycarbonylmethyl)itaconate, bis(n-propoxycarbonylmethyl)itaconate, bis(n-butoxycarbonylmethyl)itaconate, bis(n-hexyloxycarbonylmethyl)itaconate, bis(n-octyloxycarbonyloxymethyl)itaconate, bis(1-ethoxycarbonylethyl)itaconate, di[1-(n-propoxycarbonyl)ethyl]itaconate, di[1-(iso-propoxycarbonyl)ethyl]itaconate, di[1-(n-butoxycarbonyl)ethyl]itaconate, di[1-(iso-butoxycarbonyl)ethyl]itaconate, di[1-(n-hexyloxycarbonyl)ethyl]itaconate, di[1-(n-octyl-oxycarbonyl)ethyl]itaconate, bis(1-cyclopentyloxycarbonylethyl)itaconate, bis(1-cyclohexyloxycarbonylethyl)itaconate, bis(cyclopentylcarbonylmethyl)itaconate, bis(cyclohexylcarbonylmethyl)itaconate, bis(benzyloxycarbonylmethyl)itaconate, bis(1-phenylethoxycarbonylmethyl)itaconate, bis(cyclopentyloxycarbonylmethyl)itaconate, bis(cyclohexyloxycarbonylmethyl)itaconate, bis(4-methylcyclohexyloxycarbonylmethyl)itaconate, bis(phenoxycarbonylmethyl)itaconate, bis(1-naphthoxycarbonylmethyl)itaconate, bis(2-naphthoxycarbonylmethyl)itaconate, bis(3-methylphenoxycarbonylmethyl)itaconate, bis(4-methylphenoxycarbonylmethyl)itaconate, bis(1-benzyloxycarbonylethyl)itaconate, di[1-(1-phenylethoxycarbonyl)ethyl]itaconate, bis(1-phenoxycarbonylethyl)itaconate, di[1-(1-naphthoxycarbonyl)ethyl]itaconate, di[1-(2-naphthoxycarbonyl)ethyl]itaconate, di[1-(3-methylphenoxycarbonyl)ethyl]itaconate and di[1-(4-methylphenoxycarbonyl)ethyl]itaconate.

Examples of those represented by I'-2 include compounds such as bis(2-methoxyethoxycarbonylmethyl)itaconate, bis(2-ethoxyethoxycarbonylmethyl)itaconate, di[2-(n-propoxy)ethoxycarbonylmethyl]itaconate, di[2-(n-butoxy)ethoxycarbonylmethyl]itaconate, di[2-(n-hexyloxy)ethoxycarbonylmethyl]itaconate, bis(3-methoxypropoxycarbonylmethyl)itaconate, bis(1-methoxycarbonylethyl)itaconate, di[1-(2-methoxyethoxycarbonyl)ethyl]itaconate, di[1-(2-ethoxyethoxycarbonyl)ethyl]itaconate, di{1-[2-(n-propoxy)ethoxycarbonyl]ethyl}itaconate, di{1-[2-(n-butoxy)ethoxycarbonyl]ethyl}itaconate, di[1-(3-methoxypropoxycarbonyl)ethyl]itaconate, bis(2-phenoxyethoxycarbonylmethyl)itaconate, di[2-(4-methylphenoxy)ethoxycarbonylmethyl]itaconate, bis(2-benzyloxyethoxycarbonylmethyl)itaconate, di[2-(2-phenylethoxy)ethoxycarbonylmethyl]itaconate, di[1-(2-phenoxyethoxycarbonyl)ethyl]itaconate, di{1-[2-(4-methylphenoxy)ethoxycarbonyl]ethyl}itaconate, di[1-(2-benzyloxyethoxycarbonyl)ethyl]itaconate and di{1-[2-(2-phenylethoxy)ethoxycarbonyl]ethyl}itaconate.

Examples of those represented by I'-3 include bis(2-oxopropyl)itaconate, bis(2-oxobutyl)itaconate, bis(3-methyl-2-oxobutyl)itaconate, bis(2-oxopentyl)itaconate, bis(4-methyl-2-oxopentyl)itaconate, bis(benzoylmethyl)itaconate and bis(1-naphthoylmethyl)itaconate.

Examples of those represented by I'-4 include monomethyl-mono(methoxycarbonylmethyl)itaconate, monomethyl-mono(ethoxycarbonylmethyl)itaconate, monomethyl-mono(n-butoxycarbonylmethyl)itaconate, monoethyl-mono(ethoxycarbonylmethyl)itaconate, mono(n-propyl)-mono(n-propoxycarbonylmethyl)itaconate, mono(n-butyl)-mono(methoxycarbonylmethyl)itaconate, mono(n-butyl)-mono(n-butoxycarbonylmethyl)itaconate, mono(n-hexyl)-mono(n-hexyloxycarbonylmethyl)itaconate, mono(2-ethylhexyl)-mono(methoxycarbonylmethyl)itaconate, monomethyl-mono(2-ethylhexyloxycarbonylmethyl)itaconate, mono(2-methoxyethyl)-mono(methoxycarbonylmethyl)itaconate, mono(2-methoxyethyl)-mono(ethoxycarbonylmethyl)itaconate, mono(2-ethoxyethyl)-mono(n-propoxycarbonylmethyl)itaconate, mono(2-ethoxyethyl)-mono(n-butoxycarbonylmethyl)itaconate, mono[2-(n-butoxy)ethyl]-mono(n-hexyloxycarbonylmethyl)itaconate, mono[2-(n-hexyloxy)ethylethyl)]-mono(methoxycarbonylmethyl)itaconate, monocyclopentyl-mono(methoxycarbonylmethyl)itaconate, monocyclohexyl-mono(ethoxycarbonylmethyl)itaconate, monocyclohexyl-mono(2-ethylhexyloxycarbonylmethyl)itaconate, monomethyl-mono(cyclopentyloxycarbonylmethyl)itaconate, monoethyl-mono(cyclohexyloxycarbonylmethyl)itaconate, mono(n-butyl)-mono(cyclohexyloxycarbonylmethyl)itaconate, monocyclopentyl-mono(cyclopentyloxycarbonylmethyl)itaconate, monocyclohexyl-mono(cyclohexyloxycarbonylmethyl)itaconate, monocyclopentyl-mono(cyclohexyloxycarbonylmethyl)itaconate, monobenzyl-mono(methoxycarbonylmethyl)itaconate, mono(2-phenylethyl)-mono(ethoxycarbonylmethyl)itaconate, monobenzyl-mono(n-butoxycarbonylmethyl)itaconate, monophenyl-mono(methoxycarbonylmethyl)itaconate, mono(i-naphthyl)-mono(ethoxycarbonylmethyl)itaconate, monophenyl-mono(2-ethylhexyloxycarbonylmethyl)itaconate, mono(4-methylphenyl)-mono(methoxycarbonylmethyl)itaconate, mono(4-methylphenyl)-mono(2-ethylhexyloxycarbonylcarbonylmethyl)itaconate, monomethyl-mono(benzyloxycarbonylmethyl)itaconate, monoethyl-mono(1-phenylethoxycarbonylmethyl)itaconate, mono(2-ethylhexyl)-mono(benzyloxycarbonylmethyl)itaconate, monocyclopentyl-mono(benzyloxycarbonylmethyl)itaconate, monomonocyclohexyl-mono(2-phenylethoxycarbonylmethyl)itaconate, monophenyl-mono(benzyloxycarbonylmethyl)itaconate, mono(1-naphthyl)-mono(2-phenylethoxycarbonylmethyl)itaconate, mono(4-methylphenyl)-mono(benzyloxycarbonylmethyl)itaconate, mono(4-methylphenyl)-mono(1-phenylethoxycarbonylmethyl)itaconate, monophenyl-mono(cyclopentyloxycarbonylmethyl)itaconate, mono(1-naphthyl)-mono(cyclohexyloxycarbonylmethyl)itaconate, mono(4-methylphenyl)-mono(cyclopentyloxycarbonylmethyl)itaconate, monomethyl-mono(phenoxycarbonylmethyl)itaconate, mono(n-hexyl)-mono(phenoxycarbonylmethyl)itaconate, mono(n-octyl-)-mono(phenoxycarbonylmethyl)itaconate, mono(2-methoxyethyl)-mono(phenoxycarbonylmethyl)itaconate, mono[2-(n-butoxy)ethyl]-mono(phenoxycarbonylmethyl)itaconate, mono(6-ethoxyhexyl)-mono(phenoxycarbonylmethyl)itaconate, monobenzyl-mono(phenoxycarbonylmethyl)itaconate, monobenzyl-mono(1-naphthoxycarbonylmethyl)itaconate, monocyclopentyl-mono(phenoxycarbonylmethyl)itaconate, monocyclohexyl-mono(phenoxycarbonylmethyl)itaconate, monophenyl-mono(phenoxycarbonylmethyl)itaconate, mono(1-naphthyl)-mono(phenoxycarbonylmethyl)itaconate, monophenyl-mono(1-naphthoxycarbonylmethyl)itaconate, mono(4-methylphenyl)-mono(phenoxycarbonylmethyl) itaconate, mono(4-methylphenyl)-mono(1-naphthoxycarbonylmethyl)itaconate, monomethyl-mono(3-methylphenoxycarbonylmethyl)itaconate, mono(n-hexyl)-mono(4-methylphenoxycarbonylmethyl)itaconate, mono(2-ethylhexyl)-mono(4-methylphenoxycarbonylmethyl) itaconate, monobenzyl-mono(3-methylphenoxycarbonylmethyl)itaconate, monocyclopentyl-mono(3-methylphenoxycarbonylmethyl) itaconate, monocyclohexyl-mono(4-methylphenoxycarbonylmethyl)itaconate, monophenyl-mono(4-methylphenoxycarbonylmethyl)itaconate, mono(1-naphthyl)-mono(4-methylphenoxycarbonylmethyl) itaconate and mono(4-methylphenyl)-mono(4-methylphenoxycarbonylmethyl)itaconate.

Examples of those represented by I'-5 include monomethyl-mono(2-methoxyethoxycarbonylmethyl) itaconate, monoethyl-mono(2-ethoxyethoxycarbonylmethyl)itaconate, mono(n-propyl)-mono[2-(n-propoxy)ethoxycarbonylmethyl]itaconate, mono(n-butyl)-mono[2-(n-butoxy)ethoxycarbonylmethyl] itaconate, monomethyl-mono[2-(n-hexyloxy) ethoxycarbonylmethyl]itaconate, mono(2-ethylhexyl)-mono (3-methoxypropoxycarbonylmethyl)itaconate, monocyclohexyl-mono(2-methoxyethoxycarbonylmethyl) itaconate, monocyclohexyl-mono[2-(n-hexyloxy) ethoxycarbonylmethyl]itaconate, monobenzyl-mono(2-methoxyethoxycarbonylmethyl)itaconate, mono(2-phenylethyl)-mono[2-(n-propoxy)ethoxycarbonylmethyl] itaconate, mono(1-phenylethyl)-mono[2-(n-butoxy) ethoxycarbonylmethyl]itaconate, monophenyl-mono(2-methoxyethoxycarbonylmethyl)itaconate, monophenyl-mono[2-(n-hexyloxy)ethoxycarbonylmethyl]itaconate, mono(1-naphthyl)-mono[2-(n-propoxy) ethoxycarbonylmethyl]itaconate, mono(4-methylphenyl)-mono(2-methoxyethoxycarbonylmethyl)itaconate and mono(4-methylphenyl)-mono[2-(n-hexyloxy) ethoxycarbonylmethyl]itaconate.

Examples of those represented by I'-6 include mono(2-methoxyethyl)-mono(cyclopentyloxycarbonylmethyl) itaconate, mono(2-ethoxyethyl)-mono (cyclohexyloxycarbonylmethyl)itaconate, mono[2-(n-octyloxy)ethyl]-mono(cyclohexyloxycarbonylmethyl) itaconate, mono(2-methoxyethyl)-mono (benzyloxycarbonylmethyl)itaconate, mono(2-ethoxyethyl)-mono(1-phenylethoxycarbonylmethyl)itaconate, mono(6-ethoxyhexyl)-mono(benzyloxycarbonylmethyl)itaconate, mono(2-methoxyethyl)-mono(3-methylphenoxycarbonylmethyl)itaconate, mono[2-(n-butoxy)ethyl]-mono(4-methylphenoxycarbonylmethyl) itaconate and mono[2-(n-hexyloxy)ethyl]-mono(3-methylphenoxycarbonylmethyl)itaconate.

Examples of those represented by I'-7 include mono(2-methoxyethyl)-mono(2-methoxyethoxycarbonylmethyl) itaconate, mono(2-methoxyethyl)-mono[2-(n-hexyloxy) ethoxycarbonylmethyl]itaconate, mono(6-ethoxyhexyl)-mono(2-methoxyethoxycarbonylmethyl)itaconate, mono(2-ethoxyethyl)-mono(2-ethoxyethoxycarbonylmethyl) itaconate and mono[2-(n-propoxy)ethyl]-mono[2-(n-propoxy)ethoxycarbonylmethyl]itaconate.

Examples of those represented by I'-8 include monomethyl-mono(2-oxopropyl)itaconate, mono(2-ethylhexyl)-mono(2-oxopropyl)itaconate, monomethyl-mono(2-oxobutyl)itaconate, monoethyl-mono(2-oxopropyl) itaconate, monoethyl-mono(2-oxobutyl)itaconate, mono(n-hexyl)-mono(2-oxooctyl)itaconate, monocyclopentyl-mono (2-oxopropyl)itaconate, monocyclohexyl-mono(2-oxobutyl) itaconate, monocyclohexyl-mono(2-oxodecyl)itaconate, monocyclohexyl-mono(4-methoxy-2-oxobutyl)itaconate, monocyclopentyl-mono[2-oxo-4-(n-propoxy)butyl] itaconate, monomethyl-mono(cyclopentylcarbonylmethyl) itaconate, monoethyl-mono(cyclohexylcarbonylmethyl) itaconate, mono(n-butyl)-mono(cyclohexylcarbonylmethyl) itaconate, monocyclopentyl-mono (cyclopentylcarbonylmethyl)itaconate, monocyclohexyl-mono(cyclohexylcarbonylmethyl)itaconate, monocyclopentyl-mono(cyclohexylcarbonylmethyl) itaconate, monobenzyl-mono(2-oxopropyl)itaconate, monobenzyl-mono(2-oxobutyl)itaconate, mono(2-phenylethyl)-mono(2-oxobutyl)itaconate, monophenyl-mono(2-oxopropyl)itaconate, mono(1-naphthyl)-mono(2-oxobutyl)itaconate, monophenyl-mono(2-oxopentyl) itaconate, monophenyl-mono(2-oxodecyl)itaconate, mono (4-methylphenyl)-mono(2-oxopropyl)itaconate, monomethyl-mono(2-oxo-3-phenylpropyl)itaconate, monoethyl-mono(2-oxo-3-phenylbutyl)itaconate, mono(2-ethylhexyl)-mono(2-oxo-3-phenylpropyl)itaconate, monocyclopentyl-mono(2-oxo-3-phenylpropyl)itaconate, monocyclohexyl-mono(2-oxo-4-phenylbutyl)itaconate, monophenyl-mono(2-oxo-3-phenylpropyl)itaconate, monophenyl-mono(2-oxo-3-phenylbutyl)itaconate, mono (1-naphthyl)-mono(2-oxo-4-phenylbutyl)itaconate, mono (4-methylphenyl)-mono(2-oxo-3-phenylpropyl)itaconate, mono(4-methylphenyl)-mono(2-oxo-3-phenylbutyl) itaconate, monophenyl-mono(cyclopentylcarbonylmethyl) itaconate, mono(1-naphthyl)-mono (cyclohexylcarbonylmethyl)itaconate, mono(4-methylphenyl)-mono(cyclopentylcarbonylmethyl)itaconate, monomethyl-mono(benzoylmethyl)itaconate, monoethyl-mono(benzoylmethyl)itaconate, monomethyl-mono(1-naphthylcarbonylmethyl)itaconate, monomethyl-mono(2-naphthylcarbonylmethyl)itaconate, monobenzyl-mono (benzoylmethyl)itaconate, monobenzyl-mono(1-naphthylcarbonylmethyl)itaconate, monocyclopentyl-mono (benzoylmethyl)itaconate, monocyclohexyl-mono (benzoylmethyl)itaconate, monocyclohexyl-mono(1-naphthylcarbonylmethyl)itaconate, monophenyl-mono (benzoylmethyl)itaconate, mono(1-naphthyl)-mono (benzoylmethyl)itaconate, monophenyl-mono(1-naphthylcarbonylmethyl)itaconate, mono(4-methylphenyl)-mono(benzoylmethyl)itaconate, monomethyl-mono(3-methylbenzoylmethyl)itaconate, monomethyl-mono(4-methylbenzoylmethyl)itaconate, mono(2-ethylhexyl)-mono (4-methylbenzoylmethyl)itaconate, monobenzyl-mono(3-methylbenzoylmethyl)itaconate, monobenzyl-mono(4-methylbenzoylmethyl)itaconate, monocyclopentyl-mono(3-methylbenzoylmethyl)itaconate, monocyclohexyl-mono(4-methylbenzoylmethyl)itaconate, monocyclooctyl-mono(4-methylbenzoylmethyl)itaconate, monophenyl-mono(3-methylbenzoylmethyl)itaconate, monophenyl-mono(4-methylbenzoylmethyl)itaconate, mono(1-naphthyl)-mono (4-methylbenzoylmethyl)itaconate, mono(3-methylphenyl)-mono(3-methylbenzoylmethyl)itaconate and mono(4-methylphenyl)-mono(4-methylbenzoylmethyl)itaconate.

Examples of those represented by I'-9 include mono(2-methoxyethyl)-mono(2-oxopropyl)itaconate, mono(6-ethoxyhexyl)-mono(2-oxopropyl)itaconate, mono(2-methoxyethyl)-mono(2-oxobutyl)itaconate, mono(2-ethoxyethyl)-mono(2-oxopentyl)itaconate, mono(2-ethoxyethyl)-mono(2-oxohexyl)itaconate, mono(2- methoxyethyl)-mono(cyclopentylcarbonylmethyl)itaconate, mono(2-ethoxyethyl)-mono(cyclohexylcarbonylmethyl)itaconate, mono[2-(n-butoxy)ethyl]-mono(cyclohexylcarbonylmethyl)itaconate, mono(2-methoxyethyl)-mono(2-oxo-3-phenylpropyl)itaconate, mono[2-(n-butoxy)ethyl]-mono(2-oxo-4-phenylbutyl)itaconate, mono(2-methoxyethyl)-mono(benzoylmethyl)itaconate, mono(2-ethoxyethyl)-mono(benzoylmethyl)itaconate, mono[2-(n-butoxy)ethyl]-mono(benzoylmethyl)itaconate, mono(2-methoxyethyl)-mono(1-naphthylcarbonylmethyl)itaconate, mono(2-methoxyethyl)-mono(3-methylbenzoylmethyl)itaconate, mono(2-ethoxyethyl)-mono(4-methylbenzoylmethyl)itaconate and mono[2-(n-butoxy)ethyl]-mono(4-methylbenzoylmethyl)itaconate.

Among these compounds, particularly preferred are compounds having a structure wherein R is a methyl group, an ethyl group or a butyl group, R' is an ethylene group and $R_2'$ is a methyl group or a hydrogen atom because of excellent hydrolyzability of the coating film.

Specific examples of the fumarate derivative, maleic acid ester derivative, citraconic acid ester derivative and mesaconic acid ester derivative include those represented by the following structural formulas II'-1 to II'-9.

R includes, for example, alkyl group having 1 to 8 carbon atoms selected from a methyl group, an ethyl group, a propyl group, an n-butyl group, a tert-butyl group, a cyclopentyl group, an n-hexyl group, a cyclohexyl group, a 4-methylcyclohexyl group, an n-octyl group and a cyclooctyl group, or an benzyl group, a phenyl group, a naphthyl group or a methylphenyl group, and is preferably an alkyl group having 1 to 5 carbon atoms, particularly a methyl group, an ethyl group or a butyl group because the polarity of the vinyl polymer (A) is increased and the resulting coating film is superior in hydrolyzability.

R' includes, for example, an alkylene group such as a methylene group, an ethylene group, a propylene group or a butylene group, or a phenylene group, and is preferably an ethylene group because the resulting coating film is superior in hydrolyzability.

$R_2'$ includes, for example, a group selected from an alkyl group having 1 to 11 carbon atoms, a benzyl group, a phenyl group and a methylphenyl group, or a hydrogen atom. The alkyl group having 1 to 11 carbon atoms includes, for example, a methyl group, an ethyl group, a propyl group, an n-butyl group, a tert-butyl group, a cyclopentyl group, an n-hexyl group, a cyclohexyl group, a 4-methylcyclohexyl group, an n-octyl group, a cyclooctyl group, a nonyl group,

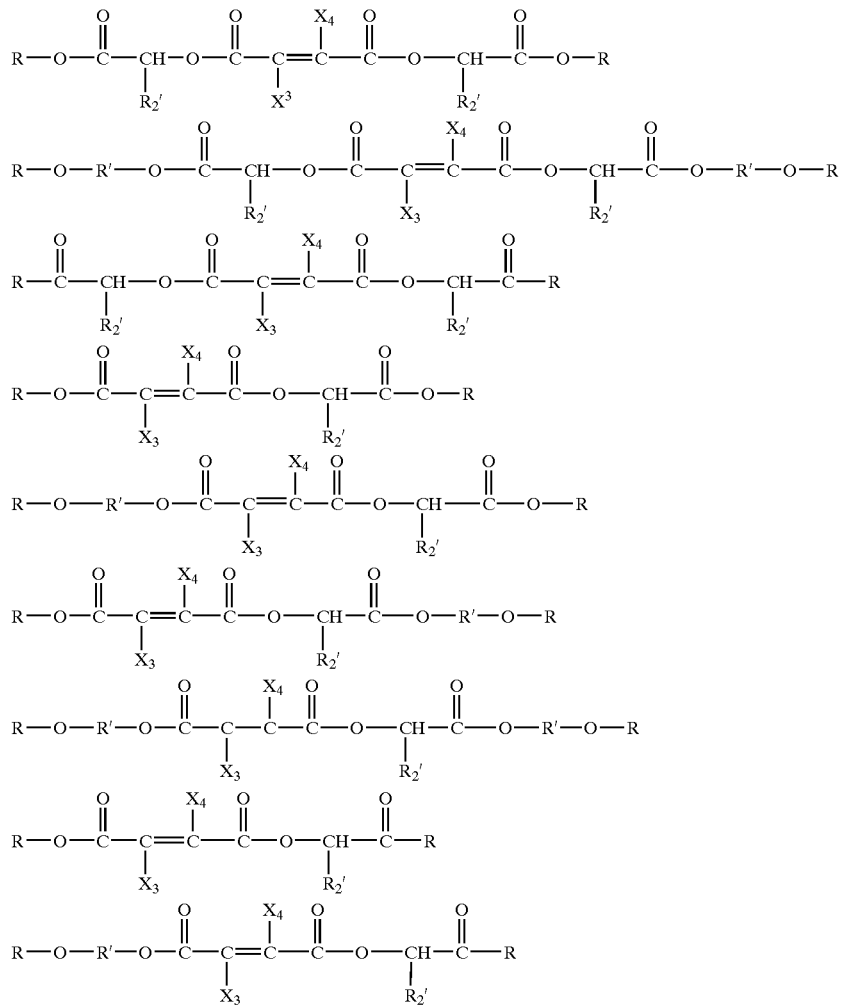

a decyl group or an dodecyl group. $R_2'$ is preferably a methyl group or a hydrogen atom because the resulting coating film is superior in hydrolyzability.

Among these polymerizable monomers, examples of those represented by II'-1 include bis(methoxycarbonylmethyl)fumarate, bis(ethoxycarbonylmethyl)fumarate, bis(n-propoxycarbonylmethyl)fumarate, bis(iso-propoxycarbonylmethyl)fumarate, bis(n-butoxycarbonylmethyl)fumarate, bis(iso-butoxycarbonylmethyl)fumarate, bis(n-hexyloxycarbonylmethyl)fumarate, bis(n-octyl-oxycarbonylmethyl)fumarate, bis(cyclopentyloxycarbonylmethyl)fumarate, bis(cyclohexyloxycarbonylmethyl)fumarate, bis(4-methylcyclohexyloxycarbonylmethyl)fumarate, bis(1-methoxycarbonylethyl)fumarate, bis(1-ethoxycarbonylethyl)fumarate, di[1-(n-propoxycarbonyl)ethyl]fumarate, di[1-(iso-propoxycarbonyl)ethyl]fumarate, di[1-(n-butoxycarbonyl)ethyl]fumarate, di[1-(iso-butoxycarbonyl)ethyl]fumarate, di[1-(n-hexyloxycarbonyl)ethyl]fumarate, di[1-(n-octyl-oxycarbonylethyl]fumarate, bis(1-cyclopentyloxycarbonylethyl)fumarate, bis(1-cyclohexyloxycarbonylethyl)fumarate and di[1-(4-methylcyclohexyloxycarbonyl)ethyl]fumarate.

Examples of those represented by II'-2 include bis(2-methoxyethoxycarbonylmethyl)fumarate, bis(2-ethoxyethoxycarbonylmethyl)fumarate, di[2-(n-propoxy)ethoxycarbonylmethyl]fumarate, di[2-(n-butoxy)ethoxycarbonylmethyl]fumarate, di[2-(n-hexyloxy)ethoxycarbonylmethyl]fumarate, bis(6-ethoxyhexyloxycarbonylmethyl)fumarate, bis(3-methoxypropoxycarbonylmethyl)fumarate, di[1-(2-methoxyethoxycarbonyl)ethyl]fumarate, di[1-(2-ethoxyethoxycarbonyl)ethyl]fumarate, di{1-[2-(n-propoxy)ethoxycarbonyl]ethyl}fumarate, di{1-[2-(n-butoxy)ethoxycarbonyl]ethyl}fumarate, di{1-[2-(n-hexyloxy)ethoxycarbonyl]ethyl}fumarate and di[1-(3-methoxypropoxycarbonyl)ethyl]fumarate.

Examples of those represented by II'-3 include bis(2-oxopropyl)fumarate, bis(2-oxobutyl)fumarate, bis(3-methyl-2-oxobutyl)fumarate, bis(2-oxopentyl)fumarate, bis(4-methyl-2-oxopentyl)fumarate, bis(2-oxodecyl)fumarate, bis(2-oxotridecyl)fumarate, bis(2-oxotetradecyl)fumarate, bis(cyclopentylcarbonylmethyl)fumarate and bis(cyclohexylcarbonylmethyl)fumarate.

Examples of those represented by II'-4 include monomethyl-mono(methoxycarbonylmethyl)fumarate, monomethyl-mono(ethoxycarbonylmethyl)fumarate, monomethyl-mono(n-butoxycarbonylmethyl)fumarate, monoethyl-mono(ethoxycarbonylmethyl)fumarate, mono(n-propyl)-mono(n-propoxycarbonylmethyl)fumarate, mono(n-butyl)-mono(methoxycarbonylmethyl)fumarate, mono(n-butyl)-mono(n-butoxycarbonylmethyl)fumarate, mono(n-hexyl)-mono(n-hexyloxycarbonylmethyl)fumarate, mono(2-ethylhexyl)-mono(methoxycarbonylmethyl)fumarate, monomethyl-mono(2-ethylhexyloxycarbonylmethyl)fumarate, monocyclopentyl-mono(methoxycarbonylmethyl)fumarate, monocyclohexyl-mono(ethoxycarbonylmethyl)fumarate, monocyclohexyl-mono(2-ethylhexyloxycarbonylmethyl)fumarate, monomethyl-mono(cyclopentyloxycarbonylmethyl)fumarate, monoethyl-mono(cyclohexyloxycarbonylmethyl)fumarate, mono(2-ethylhexyl)-mono(cyclopentyloxycarbonylmethyl)fumarate, monocyclopentyl-mono(cyclopentyloxycarbonylmethyl)fumarate, monocyclohexyl-mono(cyclohexyloxycarbonylmethyl)fumarate and monocyclopentyl-mono(cyclohexyloxycarbonylmethyl)fumarate.

Examples of those represented by II'-5 include mono(2-methoxyethyl)-mono(methoxycarbonylmethyl)fumarate, mono(2-methoxyethyl)-mono(ethoxycarbonylmethyl)fumarate, mono(2-ethoxyethyl)-mono(ethoxycarbonylmethyl)fumarate, mono(2-ethoxyethyl)-mono(n-propoxycarbonylmethyl)fumarate, mono(2-ethoxyethyl)-mono(n-butoxycarbonylmethyl)fumarate, mono[2-(n-butoxy)ethyl]-mono(n-hexyloxycarbonylmethyl)fumarate, mono(4-ethoxybutyl)-mono(2-ethylhexyloxycarbonylmethyl)fumarate, mono[2-(n-hexyloxy)ethyl]-mono(methoxycarbonylmethyl)fumarate, mono(2-methoxyethyl)-mono(cyclopentyloxycarbonylmethyl)fumarate and mono[2-(n-octyloxy)ethyl]-mono(cyclohexyloxycarbonylmethyl)fumarate.

Examples of those represented by II'-6 include monomethyl-mono(2-methoxyethoxycarbonylmethyl)fumarate, monoethyl-mono(2-ethoxyethoxycarbonylmethyl)fumarate, mono(n-propyl)-mono[2-(n-propoxy)ethoxycarbonylmethyl]fumarate, mono(2-ethylhexyl)-mono(3-methoxypropoxycarbonylmethyl)fumarate, monocyclohexyl-mono(2-methoxyethoxycarbonylmethyl)fumarate and monocyclohexyl-mono[2-(n-butoxy)ethoxycarbonylmethyl]fumarate.

Examples of those represented by II'-7 include mono(2-methoxyethyl)-mono(2-methoxyethoxycarbonylmethyl)fumarate, mono(2-methoxyethyl)-mono[2-(n-hexyloxy)ethoxycarbonylmethyl]fumarate, mono(6-ethoxyhexyl)-mono(2-methoxyethoxycarbonylmethyl)fumarate and mono(3-methoxypropyl)-mono(3-methoxypropoxycarbonylmethyl)fumarate.

Examples of those represented by II'-8 include monomethyl-mono(2-oxopropyl)fumarate, mono(2-ethylhexyl)-mono(2-oxopropyl)fumarate, monomethyl-mono(2-oxobutyl)fumarate, monoethyl-mono(2-oxopropyl)fumarate, monoethyl-mono(2-oxobutyl)fumarate, mono(n-hexyl)-mono(2-oxooctyl)fumarate, monomethyl-mono(2-oxodecyl)fumarate, monobenzyl-mono(2-oxopropyl)fumarate, monobenzyl-mono(2-oxobutyl)fumarate, mono(2-phenylethyl)-mono(2-oxobutyl)fumarate, monocyclopentyl-mono(2-oxopropyl)fumarate, monocyclohexyl-mono(2-oxobutyl)fumarate, monocyclohexyl-mono(2-oxodecyl)fumarate, monophenyl-mono(2-oxopropyl)fumarate, mono(1-naphthyl)-mono(2-oxobutyl)fumarate, monophenyl-mono(2-oxopentyl)fumarate, monophenyl-mono(2-oxodecyl)fumarate, mono(4-methylphenyl)-mono(2-oxopropyl)fumarate, monomethyl-mono(2-oxo-3-phenylpropyl)fumarate, monoethyl-mono(2-oxo-3-phenylbutyl)fumarate, mono(2-ethylhexyl)-mono(2-oxo-3-phenylpropyl)fumarate, mono(2-methoxyethyl)-mono(2-oxo-3-phenylpropyl)fumarate, mono[2-(n-butoxy)ethyl]-mono(2-oxo-4-phenylbutyl)fumarate, monocyclopentyl-mono(2-oxo-3-phenylpropyl)fumarate, monocyclohexyl-mono(2-oxo-4-phenylbutyl)fumarate, monophenyl-mono(2-oxo-3-phenylpropyl)fumarate, monophenyl-mono(2-oxo-3-phenylbutyl)fumarate, mono(1-naphthyl)-mono(2-oxo-4-phenylbutyl)fumarate, mono(4-methylphenyl)-mono(2-oxo-3-phenylpropyl)fumarate, monomethyl-mono(cyclopentylcarbonylmethyl)fumarate, monoethyl-mono(cyclohexylcarbonylmethyl)fumarate, mono(n-butyl)-mono(cyclohexylcarbonylmethyl)fumarate, monocyclopentyl-mono(cyclopentylcarbonylmethyl)fumarate, monocyclohexyl-mono(cyclohexylcarbonylmethyl) fumarate, monocyclopentyl-mono (cyclohexylcarbonylmethyl)fumarate, monophenyl-mono (cyclopentylcarbonylmethyl)fumarate, mono(1-naphthyl)-mono(cyclohexylcarbonylmethyl)fumarate, mono(4-methylphenyl)-mono(cyclopentylcarbonylmethyl)fumarate, monomethyl-mono(benzoylmethyl)fumarate, monoethyl-mono(benzoylmethyl)fumarate, monomethyl-mono(1-naphthylcarbonylmethyl)fumarate, mono(2-methoxyethyl)-mono(benzoylmethyl)fumarate, mono[2-(n-butoxy)ethyl]-mono(benzoylmethyl)fumarate, mono(2-methoxyethyl)-mono(1-naphthylcarbonylmethyl)fumarate, monobenzyl-mono(benzoylmethyl)fumarate, monobenzyl-mono(1-naphthylcarbonylmethyl)fumarate, monocyclopentyl-mono(benzoylmethyl)fumarate, monocyclohexyl-mono(benzoylmethyl)fumarate, monocyclohexyl-mono(1-naphthylcarbonylmethyl)fumarate, monophenyl-mono(benzoylmethyl)fumarate, mono(1-naphthyl)-mono(benzoylmethyl)fumarate, monophenyl-mono(1-naphthylcarbonylmethyl)fumarate, mono(4-methylphenyl)-mono(benzoylmethyl)fumarate, mono(4-methylphenyl)-mono(1-naphthylcarbonylmethyl)fumarate, monomethyl-mono(3-methylbenzoylmethyl)fumarate, monoethyl-mono(4-methylbenzoylmethyl)fumarate, mono(2-ethylhexyl)-mono(4-methylbenzoylmethyl)fumarate, monobenzyl-mono(3-methylbenzoylmethyl)fumarate, monobenzyl-mono(4-methylbenzoylmethyl)fumarate, monocyclopentyl-mono(3-methylbenzoylmethyl)fumarate, monocyclohexyl-mono(4-methylbenzoylmethyl)fumarate, monocyclooctyl-mono(4-methylbenzoylmethyl)fumarate, monophenyl-mono(3-methylbenzoylmethyl)fumarate, monophenyl-mono(4-methylbenzoylmethyl)fumarate, mono(1-naphthyl)-mono(4-methylbenzoylmethyl)fumarate and mono(3-methylphenyl)-mono(3-methylbenzoylmethyl) fumarate.

Examples of those represented by II'-9 include mono(2-methoxyethyl)-mono(2-oxopropyl)fumarate, mono(6-ethoxyhexyl)-mono(2-oxopropyl)fumarate, mono(2-methoxyethyl)-mono(2-oxobutyl)fumarate, mono(2-ethoxyethyl)-mono(2-oxopentyl)fumarate, mono(2-ethoxyethyl)-mono(2-oxohexyl)fumarate, mono[3-(n-propoxy)propyl]-mono(2-oxodecyl)fumarate, mono(2-methoxyethyl)-mono(2-oxopropyl)fumarate, mono(6-ethoxyhexyl)-mono(2-oxopropyl)fumarate, mono(2-methoxyethyl)-mono(2-oxobutyl)fumarate, mono(2-ethoxyethyl)-mono(2-oxopentyl)fumarate, mono(2-ethoxyethyl)-mono(2-oxohexyl)fumarate, mono[3-(n-propoxy)propyl]-mono(2-oxodecyl)fumarate, mono(2-methoxyethyl)-mono(cyclopentylcarbonylmethyl)fumarate, mono(2-ethoxyethyl)-mono(cyclohexylcarbonylmethyl) fumarate, mono[2-(n-butoxy)ethyl]-mono (cyclohexylcarbonylmethyl)fumarate, mono(2-methoxyethyl)-mono(3-methylbenzoylmethyl)fumarate and mono[2-(n-butoxy)ethyl]-mono(4-methylbenzoylmethyl) fumarate.

As the maleic acid ester derivative, citraconic acid ester derivative and mesaconic acid ester derivative, those having the same ester group as in the fumarate can be used.

Among these compounds, particularly preferred are compounds having a structure wherein R is a methyl group, an ethyl group or a butyl group, R' is an ethylene group and $R_2'$ is a methyl group or a hydrogen atom in the structural formula II'-1 to II'-9 as well as corresponding maleic acid ester derivative, citraconic acid ester derivative and mesaconic acid ester derivative because of excellent hydrolyzability of the coating film.

Specific examples of the (meth)acrylate, (meth)acrylamide compound, vinyl alkylcarboxylate and aromatic vinyl compound, which give the structural unit (b), include the following.

Examples of the (meth)acrylates include alkyl (meth)acrylates having an alkyl group having 1 to 18 carbon atoms, such as methyl (meth)acrylate, ethyl (meth)acrylate, n-propyl (meth)acrylate, iso-propyl (meth)acrylate, n-butyl (meth)acrylate, iso-butyl (meth)acrylate, tert-butyl (meth) acrylate, 2-ethylhexyl (meth)acrylate, lauryl (meth)acrylate and stearyl (meth)acrylate; cycloalkyl (meth)acrylates such as cyclohexyl (meth)acrylate, 4-tert-butylcyclohexyl (meth) acrylate, isobornyl (meth)acrylate and adamantyl (meth) acrylate; (meth)acrylates having an aryl group, such as benzyl (meth)acrylate and phenyl (meth)acrylate; (meth) acrylates having an alkoxyalkyl group, such as 2-methoxyethyl (meth)acrylate and 2-ethoxyethyl (meth) acrylate; (meth)acrylates having a tertiary amino group, such as 2-dimethylaminoethyl (meth)acrylate, 2-diethylaminoethyl (meth)acrylate, 3-dimethylaminopropyl (meth)acrylate, 3-diethylaminopropyl (meth)acrylate, N-[2-(meth) acryloyloxyethyl]piperidine, N-[2-(meth)acryloyloxyethyl] pyrrolidine and N-[2-(meth)acryloyloxyethyl]morpholine; (meth)acrylates having an epoxy group, such as glycidyl (meth)acrylate and (β-methyl)glycidyl (meth)acrylate; (meth)acrylates having a silyl ether group, such as trimethylsiloxyethyl(meth)acrylate and triethylsiloxyethyl (meth)acrylate; (meth)acrylates having a hydroxyl group, such as 2-hydroxyethyl (meth)acrylate, 2-hydroxypropyl (meth)acrylate, 3-hydroxypropyl (meth)acrylate, 2-hydroxybutyl (meth)acrylate and 4-hydroxybutyl (meth) acrylate; (meth)acrylates having a hydroxyl group obtained by reacting the hydroxyl group-containing (meth)acrylates described above with ε-caprolactone; (meth)acrylates having a polyether chain, such as polyethylene glycol mono (meth)acrylate, mono (meth)acrylate of polyethylene glycol whose one terminal is blocked with an alkoxy group such as methoxy group, polypropylene glycol mono (meth)acrylate and mono (meth)acrylate of polypropylene glycol whose one terminal is blocked with an alkoxy group such as methoxy group; and (meth)acrylates having a silylester group, such as tri-iso-propylsilyl (meth)acrylate, tri-n-butylsilyl (meth)acrylate and tri-sec-butylsilyl (meth) acrylate.

Examples of the (meth)acrylamide compound include carboxylic acid amide group-containing monomer having no substituent on an N atom, such as (meth)acrylamide or crotonic acid amide, N-methylol (meth)acrylamide, N-methoxymethyl(meth)acrylamide, N-ethoxymethyl (meth)acrylamide, N-butoxymethyl(meth)acrylamide, N-ethoxyethyl(meth)acrylamide, N,N-dimethyl(meth) acrylamide, N,N-dimethylaminopropyl(meth)acrylamide and diacetoneacrylamide.

Typical examples of the vinyl carboxylate include vinyl acetate, vinyl propionate, vinyl butanoate, vinyl pivalate, vinyl ester of aliphatic monocarboxylic acids having a $C_{5-10}$ branched alkyl group, and aromatic carboxylic acid vinyl ester such as vinyl benzoate or vinyl p-tert-butylbenzoate.

Typical examples of the aromatic vinyl compound include styrene, 4-methylstyrene, 4-tert-butylstyrene, α-methylstyrene and divinylbenzene.

In addition to the monomers described above, various monomers can be used. Typical examples thereof include diesters of unsaturated dicarboxylic acids and monohydric alcohols, such as dimethyl maleate, diethyl maleate, diethyl fumarate, di-n-butyl fumarate and di-n-butyl itaconate; unsaturated dicarboxylic acid esters having a hydroxyl group, such as di-2-hydroxyethyl fumarate, mono-2-hydroxyethyl-mono-n-butyl fumarate and mono-2-hydroxyethyl-mono-n-butyl fumarate; monoesters of unsaturated dicarboxylic acid, such as mono-n-butyl maleate, mono-n-butyl fumarate and monomethyl itaconate; allyl compound such as allyl glycidyl ether or 2-hydroxyethylallyl ether; unsaturated carboxylic acids or acid anhydrides thereof, such as (meth)acrylic acid, crotonic acid, maleic acid, fumaric acid, itaconic acid, citraconic acid, mesaconic acid, maleic anhydride and itaconic anhydride; olefins such as ethylene, propylene and 1-butene; fluoroolefins such as vinylidene fluoride, tetrafluoroethylene, hexafluoropropylene and chlorotrifluoroethylene; chloroolefins such as vinyl chloride and vinylidene chloride; and vinyl ethers such as ethyl vinyl ether, n-butyl vinyl ether, cyclohexyl vinyl ether and 4-hydroxybutyl vinyl ether.

The content of the vinyl polymer (A) described above in detail in the composition is not specifically limited, but is preferably within a range from 1 to 70% by weight, and particularly from 3 to 50% by weight, based on the composition.

As the antifouling agent (B) used in the antifouling coating composition of the present invention, an inorganic antifouling agent and an organic antifouling agent can be used.

The inorganic antifouling agent is preferably a compound containing Cu(I) because of its excellent antifouling effects, and examples thereof include cuprous oxide, cuprous thiocyanate, basic cuprous sulfate and cuprous chloride.

Examples of the organic antifouling agent include cuprous acetate, oxine copper, copper nonylphenolsulfonate copper, copper bis(ethylenediamine)-bis(dodecylbenzene sulfonate), copper naphthenate, copper salt of rosin, bis(pentachlorophenolic acid)copper, metal pyrithion, tetramethylthiuram disulfide, 2,4,5,6-tetrachloroisophthalonitrile, N,N-dimethyldichlorophenylurea, pyridine-triphenyl boron, 4,5-dichloro-2-n-octyl-4-isothiazolin-3-one, 2,4,6-trichlorophenylmaleimide, 2-methylthio-4-tert-butylamino-6-cyclopropylamino-s-triazine, and carbamate compound such as zinc dimethyldithiocarbamate or manganese ethylenebisdithiocarbamate.

Among these organic antifouling agents, metal pyrithione, N,N-dimethyldichlorophenylurea, pyridine-triphenyl boron, 2,4,6-trichlorophenylmaleimide, 2-methylthio-4-tert-butylamino-6-cyclopropylamino-s-triazine, 4,5-dichloro-2-n-octyl-4-isothiazolin-3-one and 2,4,5,6-tetrachloroisophthalonitrile are particularly preferred because of excellent antifouling properties. As the metal pyrithione, copper pyrithione and zinc pyrithione are particularly preferred.

As the antifouling agent (B) used in the present invention, any of the inorganic antifouling agent and organic antifouling agent can be used. Among these, the inorganic antifouling agent is preferred because of excellent antifouling properties of the coating film, and cuprous oxide and cuprous thiocyanate are particularly preferred.

These antifouling agents (B) may be used alone, or two or more kinds thereof may be used in combination.

The amount of the antifouling agent (B) is preferably within a range from 1 to 70% by weight, and particularly from 2 to 65% by weight, based on the antifouling coating composition because remarkable effects of the present invention can be exerted.

As the antifouling agent (B), a copper compound and metal pyrithione are used in combination because a remarkable antifouling effect can be exerted. The amount of the copper compound is preferably within a range from 2 to 65% by weight based on the composition, while the amount of the metal pyrithion is preferably within a range from 0.5 to 40% by weight based on the composition.

The addition of zinc oxide in the antifouling coating composition of the present invention makes it possible to increase the coating film strength and to effectively control the polishing rate of the coating film. Zinc oxide is added in the amount within a range from 0.5 to 35 parts by weight, and preferably from 1 to 25 parts by weight, based on 100 parts by weight of the antifouling coating composition in view of control or the polishing rate and control of the coating film hardness.

The addition of an elution accelerator in the antifouling coating composition of the present invention makes it possible to enhance the elution of the coating film and to increase the polishing rate of the coating film, and thus a remarkable antifouling effect is exerted.

Examples of the elution accelerator include rosins such as gum rosin, wood rosin, tall oil rosin, disproportionated rosin, disproportionated rosin having low melting point, hydrogenated rosin, polymerized rosin, maleinated rosin, aldehyde-modified rosin, polyoxyalkylene ester of rosin, rosin alcohol, metal salt of rosin such as copper salt of rosin, zinc salt of rosin, magnesium salt of rosin, and rosin amine; and aliphatic carboxylic acids such as fatty acid having 5 to 30 carbon atoms, synthetic fatty acid or naphthenic acid, and Cu salt, Zn salt, Mg salt, Ca salt and the like thereof.

Among these elution accelerators, rosins are preferred because of excellent elution promoting effect.

The elution accelerator is preferably added in the amount within a range from 0.1 to 30 parts by weight, and more preferably 0.5 to 15 parts by weight, based on 100 parts by weight of the antifouling coating composition in view of the antifouling properties, polishing rate and water resistance of the coating film.

Preferably, the antifouling coating composition of the present invention further contains a vinyl ether polymer because improvement in crack resistance and adhesion and stable polishing rate of the resulting coating film are attained.

Examples of the vinyl ether polymer include polymethyl vinyl ether, polyethyl vinyl ether, polyisopropyl vinyl ether and polyisobutyl vinyl ether.

The amount of the vinyl ether polymer is preferably within a range from 0.1 to 10% by weight, and more preferably 0.2 to 5% by weight, based on the antifouling coating composition because the effect of improving the crack resistance and adhesion of the resulting coating film and the effect of stabilizing the polishing rate of the resulting coating film are exerted.

In the present invention, the other hydrophilic group-containing polymer may be used in combination with the vinyl ether polymer. Typical examples of the hydrophilic group-containing polymer include various (alkoxy) polyalkylene glycol mono(meth)acrylate (co)polymers such as (methoxy)polyethylene glycol mono(meth)acrylate (co)polymer.

The antifouling coating composition of the present invention can contain various plasticizers used commonly in coatings. The use of the plasticizer in combination makes it possible to improve the crack resistance of the coating film.

Examples of the plasticizer include orthophosphate, chlorinated paraffin, phthalate and adipate. And chlorinated paraffin and orthophosphate are particularly preferred.

The amount of the plasticizer is preferably within a range from 0.05 to 20% by weight, and more preferably 0.1 to 15% by weight, based on the antifouling coating composition.

For the purpose of improving the storage stability of the antifouling coating composition of the present invention, a dehydrating agent is preferably mixed therein. Examples of the dehydrating agent include inorganic dehydrating agents such as anhydrous gypsum ($CaSO_4$) and synthetic zeolite; organic dehydrating agents exemplified by orthocarboxylates such as methyl orthoformate and methyl orthoacetate, orthoborate, silicate compound and isocyanate compound such as p-toluenesulfonyl isocyanate.

The amount of the dehydrating agent is preferably within a range from 0.01 to 20% by weight, and more preferably 0.1 to 8% by weight, based on the antifouling coating composition.

The antifouling coating composition of the present invention may contain various pigments such as coloring pigments and extender pigments; dyes; resins other than vinyl ether polymers described above; and various additives such as anti-sagging agents or anti-setting agents, defoamers, segregation inhibitors and leveling agents.

Examples of the anti-sagging agent or anti-setting agent include salts of polyvalent metals such as Al, Cu and Zn and acids such as stearic acid, lecithin and alkylsulfonic acid; waxes such as polyethylene wax, hydrogenated castor oil wax, polyamide wax and polyethylene oxide wax; and synthetic fine silica powders. Preferred are hydrogenated castor oil wax, polyamide wax, polyethylene oxide wax and synthetic fine silica powder.

As the pigment, conventional organic pigments and inorganic pigments can be used. Examples of the inorganic pigment include titanium oxide, iron oxide, talc, mica and aluminum flake. Examples of the organic pigment include carbon black, phthalocyanine blue, phthalocyanine green and quinacridone red.

The antifouling coating composition of the present invention may further contain a polymer of a triorganosilyl ester of maleic acid or fumaric acid.

In the antifouling coating composition of the present invention, a homopolymer of an unsaturated monomer such as carbomethoxymethyl (meth)acrylate or carboethoxymethyl (meth)acrylate, a copolymer of those unsaturated monomer and the other polymerizable monomer, and the other acrylic resin may be used in combination, in addition to the vinyl polymer (A), as far as the effect of the present invention is not impaired.

In case the antifouling coating composition of the present invention contains a liquid plasticizer or a liquid dehydrating agent, the composition can be used without containing a solvent. On the other hand, in case the composition does not contain the liquid plasticizer or the liquid dehydrating agent, the composition must contain the solvent.

Also in case the composition contains the liquid plasticizer or the liquid dehydrating agent, the composition preferably contains the solvent. Specific examples of the solvent include various organic solvents listed as those which can be used in the preparation of the vinyl polymer of the present invention. The content of the solvent is preferably within a range from 5 to 95% by weight, and more preferably from 10 to 80% by weight, based on the antifouling coating composition.

The antifouling coating composition of the present invention can be prepared by various conventional methods using the respective components described above. For example, the antifouling coating composition is prepared by adding a predetermined amount of the respective components at a time or in an arbitrary order, and mixing and dispersing the components.

The antifouling coating composition of the present invention is a one-component coating composition and has exellent storage stability. The composition also gives a coating film which is exellent in crack resistance, adhesive poperty, long-term antifouling properties and antifouling properties. The antifouling coating composition of the present invention is coated on the surface of various molded articles (substrates) once or plural times by a conventional method, followed by drying. Examples of the substrate are marine structures such as water intake channels or exhaust channels of nuclear power plants, films for preventing sludge diffusion in various marine civil engineering works, vessels, and fishing implements such as ropes and nets. Thus, it is possible to obtain articles such as hulls, marine structures and fishing implements coated with the antifouling coating film having excellent crack resistance, excellent adhesive property, and excellent antifouling properties.

The antifouling coating composition of the present invention can be applied directly to the substrate described above. Also it may be applied to the substrate which is precoated with an undercoating material such as anti-rust agent or primer. Furthermore, the antifouling coating composition of the present invention can be coated on the surface of hulls and marine structures which are precoated with a conventional antifouling coating or precoated with the antifouling coating composition of the present invention, for the purpose of repairing.

The thickness of an antifouling coating film thus formed on the surface of hulls and marine structures is not specifically limited, but is preferably within a range from 30 to 500 $\mu$m because satisfactory long-term antifouling properties of the coating film are obtained.

The coating film having a desired thickness can be obtained, for example, by applying the coating composition once or several times.

The antifouling coating composition of the present invention yields an antifouling coating film which has excellent crack resistance and excellent adhesion and achieves satisfactorily controlled polishing rate, and also has excellent antifouling properties, particularly long-term antifouling properties.

BEST MODE FOR CARRYING OUT THE INVENTION

Figure 1:
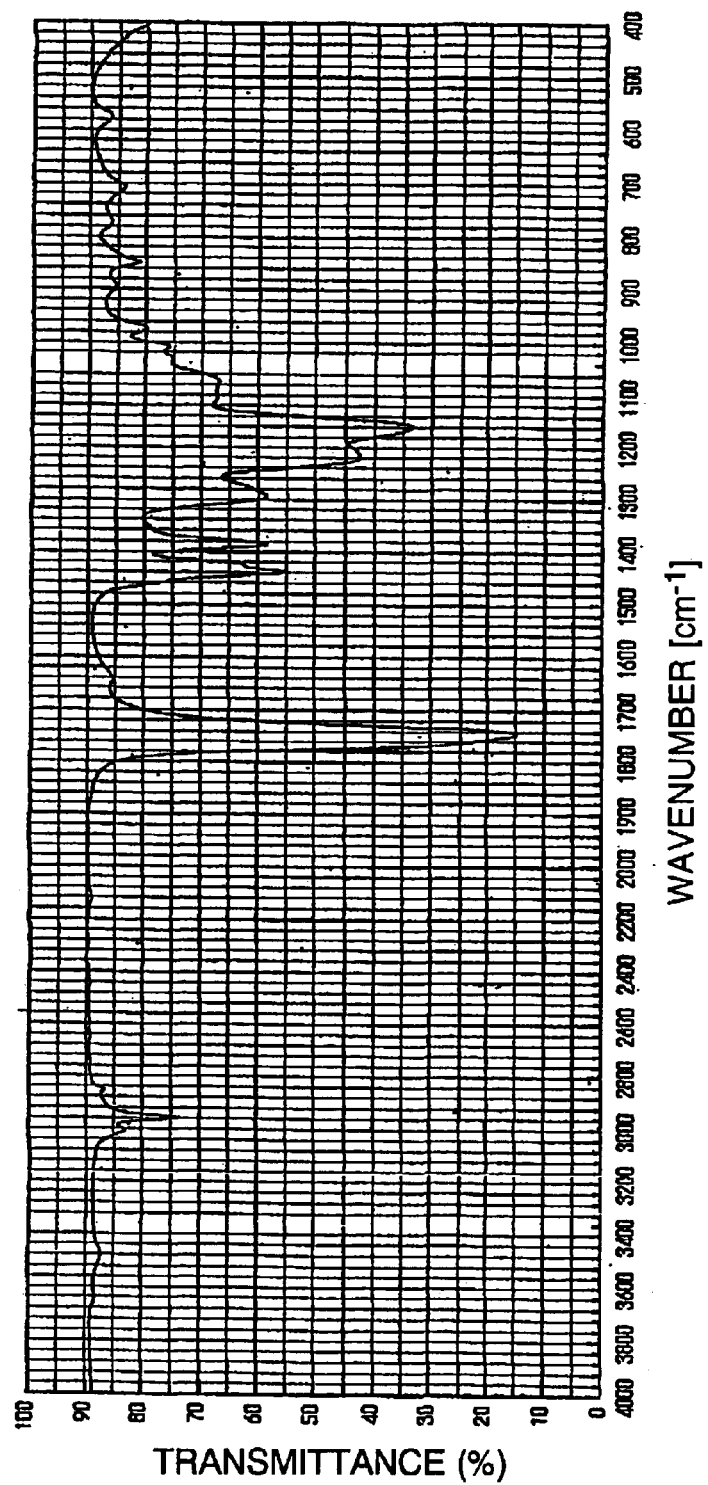
FIG. 1 is an IR spectrum of the vinyl polymer obtained in Example 1.

The best mode for carrying out the invention will now be described in detail by examples. In the following examples, parts and percentages are by weight unless otherwise specified.

In the examples, apparatuses and measuring conditions used to analyze the vinyl polymer are as follows. The content of the repeating unit in the vinyl polymer prepared was calculated based on the $^1$H-NMR measurement data. The weight-average molecular weight of the vinyl polymer was calculated based on the GPC measurement data. The nonvolatile content of the vinyl polymer solution was calculated based on the weight of the residue produced after drying the resin solution in an air-circulating oven at 105° C. for 3 hours.

IR Spectrum:
  Measuring apparatus: JASCO FT/IR-610 manufactured by JASCO Corporation
  Preparation of sample: A sample was made by a KBr disk method.

$^1$H-NMR Spectrum:
  Measuring apparatus: JEOL JNM-EX270(270 MHz) manufactured by JEOL Ltd.
  Solvent: deuterated chloroform
  Internal standard: tetramethylsilane GPC (Gel Permeation Chromatography):
  Measuring apparatus: liquid chromatograph LC-08 manufactured by Japan Analytical Industry Co., Ltd.
  Column: polystyrene packed column SHODEX (A-805)+ (A-804) 4-(A-803)+(A-802) manufactured by Showa Denko K. K.
  Eluent: tetrahydrofuran (THF)
  Flow rate: 1 ml/min.
  Concentration: 0.4%
  Measuring temperature: 25° C.
  Processing of measurement data: The weight-average molecular weight was calculated, excluding the fraction having a molecular weight of less than 320.

The unsaturated dicarboxylic acid ester monomers having an activated ester group used in the examples are as follows.

1. Bis(methoxycarbonylmethyl)itaconate (hereinafter abbreviated to BMCMI): This monomer was synthesized by reacting an itaconic acid potassium salt with methyl chloroacetate.

2. Bis(ethoxycarbonylmethyl)itaconate (hereinafter abbreviated to BECMI): This monomer was synthesized by reacting an itaconic acid potassium salt with ethyl chloroacetate.

3. Bis(n-butoxycarbonylmethyl)itaconate (hereinafter abbreviated to BBCMI): This monomer was synthesized by reacting an itaconic acid potassium salt with n-butyl chloroacetate.

4. Bis(2-methoxyethoxycarbonylmethyl)itaconate (hereinafter abbreviated to BMECMI): This monomer was synthesized by reacting an itaconic acid potassium salt with 2-methoxyethyl chloroacetate.

5. Bis(1-methoxycarbonylethyl)itaconate (hereinafter abbreviated to BMCEI): This monomer was synthesized by reacting an itaconic acid potassium salt with methyl 2-chloropropionate.

6. Monomethyl-mono(methoxycarbonylmethyl)itaconate (hereinafter abbreviated to MMCMI): This monomer was synthesized by reacting a potassium salt of monomethyl itaconate with methyl chloroacetate.

7. Monomethyl-mono(butoxycarbonylmethyl)itaconate (hereinafter abbreviated to MBCMI): This monomer was synthesized by reacting a potassium salt of monomethyl itaconate with n-butyl chloroacetate.

8. Bis(2-oxopropyl)itaconate (hereinafter abbreviated to OXPI): This monomer was synthesized by reacting an itaconic acid potassium salt with 1-chloro-2-oxopropane.

9. Bis(methoxycarbonylmethyl)fumarate (hereinafter abbreviated to BMCMF): This monomer was synthesized by reacting a fumaric acid potassium salt with methyl chloroacetate.

10. Bis(1-methoxycarbonylethyl)fumarate (hereinafter abbreviated to BMCEF): This monomer was synthesized by reacting a fumaric acid potassium salt with methyl 2-chloropropionate.

11. Bis(methoxycarbonylmethyl)fumarate (hereinafter abbreviated to BMCMM): This monomer was synthesized by reacting a maleic acid potassium salt with methyl chloroacetate.

EXAMPLE 1

Preparation of Vinyl Polymer

Figure 2:
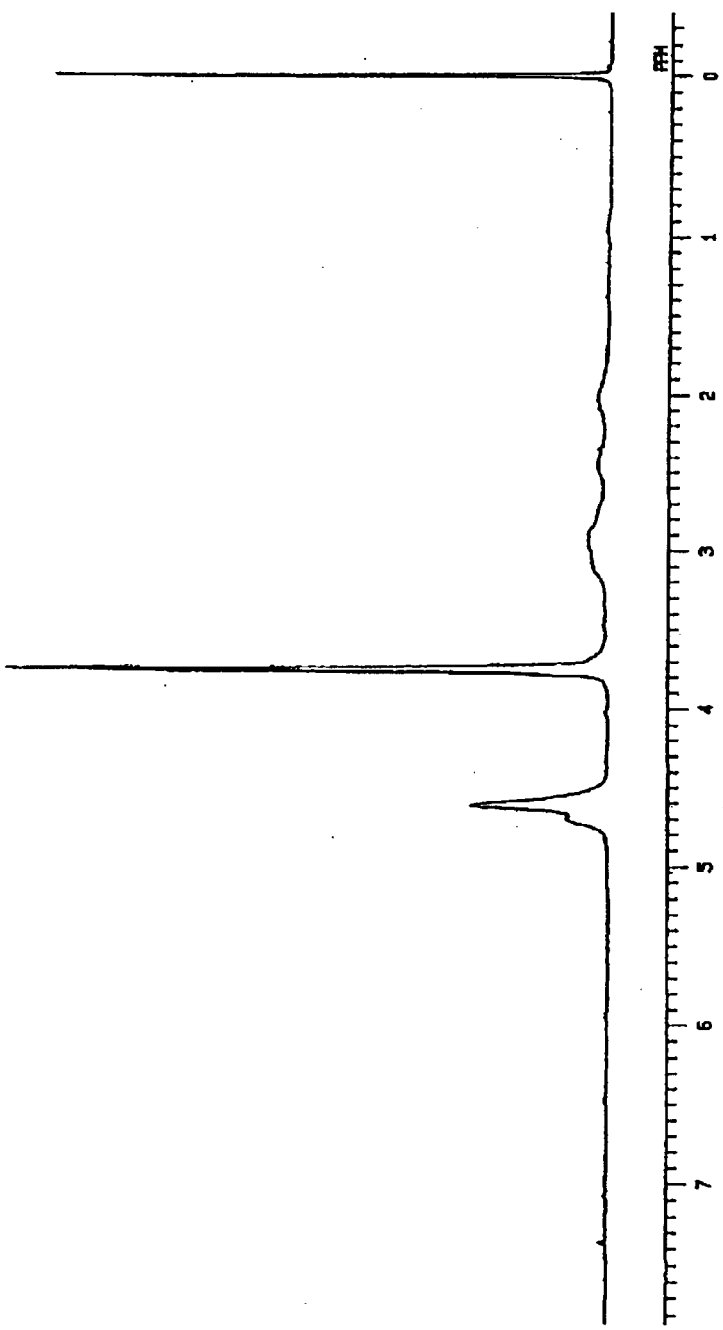
FIG. 2 is a $^1$H-NMR spectrum of the vinyl polymer obtained in Example 1.

In a glass reaction vessel equipped with an air cooling tube, 10.0 parts of BMCMI, 0.30 parts of di-tert-butyl peroxide (DTBPO), 7.0 parts of n-butyl acetate (BAc) and 3.0 parts of xylene (Xy) were charged and sufficiently mixed, and then the reaction vessel was dipped in an oil bath maintained at 120° C. and heating was started. After 12 hours, 24 hours and 36 hours since the start of heating, 0.1 parts of DTBPO was added. The polymerization was carried out by heating for 48 hours in total to obtain a polymer solution. To the resulting polymer solution, 40 parts of methanol was added, followed by sufficient mixing and further extraction of methanol-soluble fraction. The operation of extracting the soluble fraction using 40 parts of methanol was conducted three times to obtain a highly viscous liquid residue. The volatile material was removed from the liquid residue under reduced pressure to obtain 7.82 parts of a homopolymer of BMCMI (yield: 78.2%) as a solid with adherent nature. The resulting resin had a weight-average molecular weight (Mw) of 1,900. IR spectrum is shown in FIG. 1 and $^1$H-NMR spectrum is shown in FIG. 2.

EXAMPLE 2

Preparation of Vinyl Polymer

Figure 3:
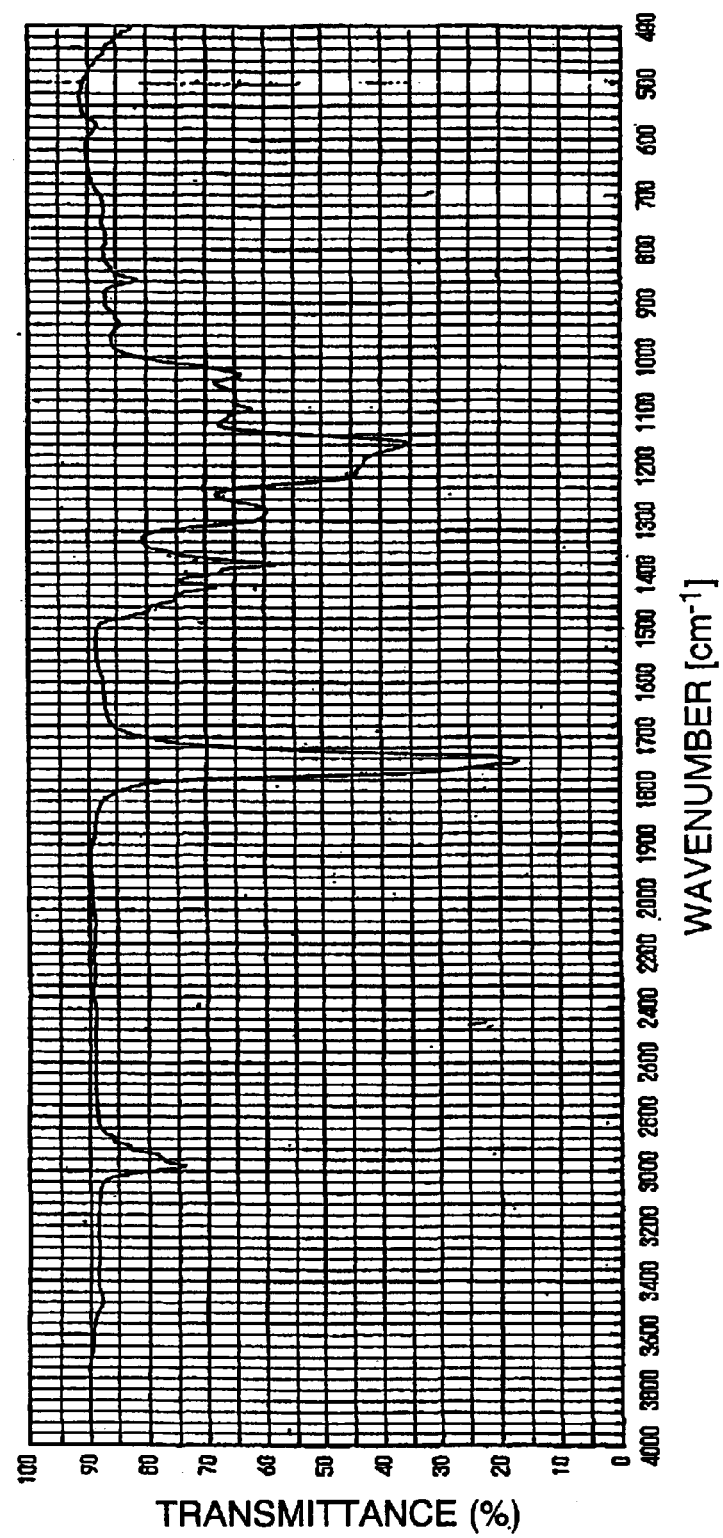
FIG. 3 is an IR spectrum of the vinyl polymer obtained in Example 2.
Figure 4:
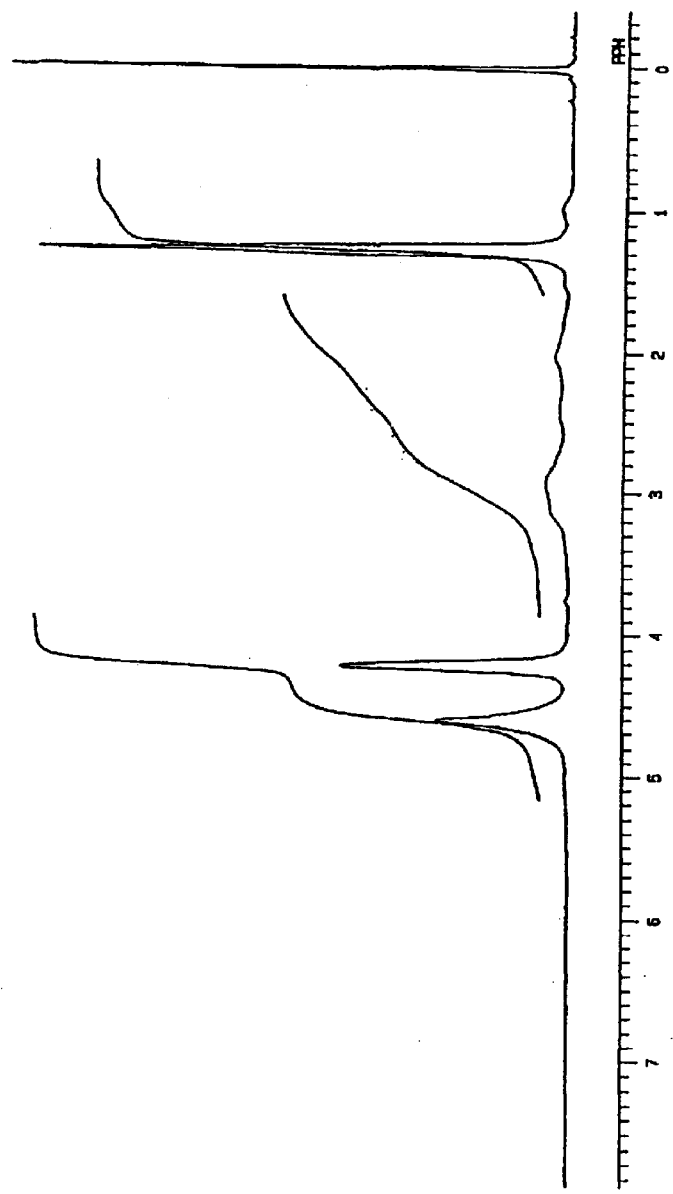
FIG. 4 is a $^1$H-NMR spectrum of the vinyl polymer obtained in Example 2.

In the same manner as in Example 1, except that 10 parts of BECMI was used in place of 10 parts of BMCMI, the polymerization, the operation of isolating the polymer and the removal of the volatile material were conducted to obtain 7.14 parts of a homopolymer of BECMI (yield: 71.4%) as a solid with adherent nature. The resulting resin had a weight-average molecular weight (Mw) of 18,300. The IR spectrum is shown in FIGS. 3 and $^1$H-NMR spectrum is shown in FIG. 4.

EXAMPLE 3

Preparation of Vinyl Polymer

Figure 5:
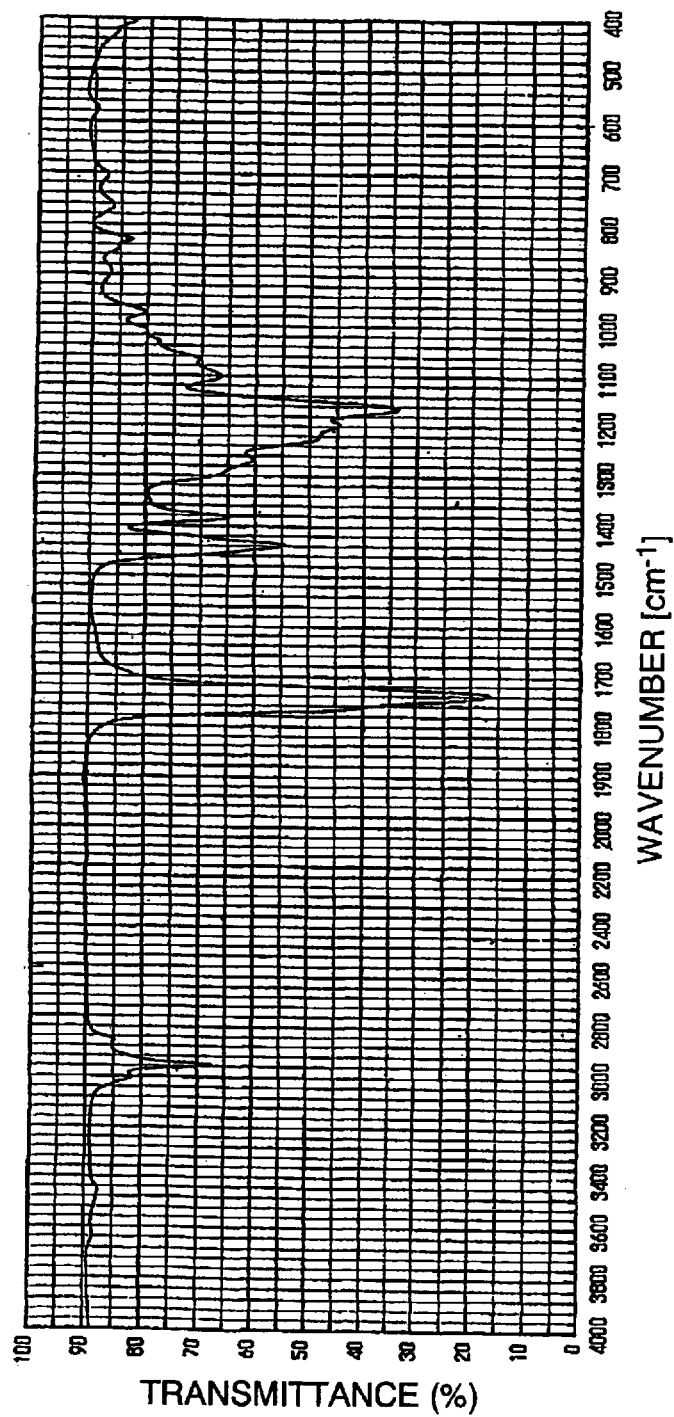
FIG. 5 is an IR spectrum of the vinyl polymer obtained in Example 3.
Figure 6:
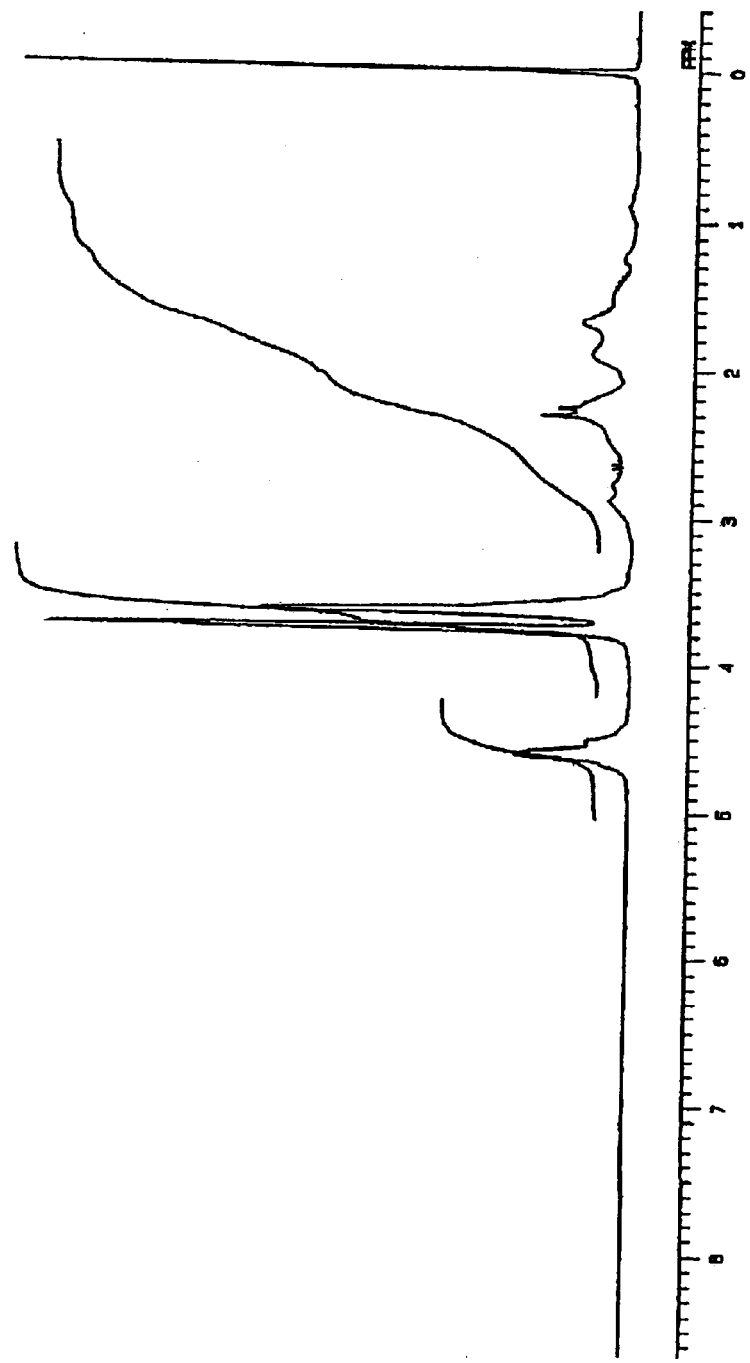
FIG. 6 is a $^1$H-NMR spectrum of the vinyl polymer obtained in Example 3.

In the same reaction vessel as in Example 1, 5 parts of BMCMI, 5 parts of methyl acrylate (MA), 0.3 parts of DTBPO, 2 parts of Xy, 2 parts of propylene glycol monomethyl ether (PGME) and 6 parts of BAc were charged and sufficiently mixed, and then the reaction vessel was dipped in an oil bath maintained at 120° C. and the polymerization was conducted by heating for 16 hours. A solution obtained by dissolving the resulting copolymer solution in 20 parts of tetrahydrofuran (THF) was poured into 400 parts of methanol to precipitate the copolymer. The precipitated copolymer was isolated by filtration and dried under reduced pressure for one day to obtain 8.46 parts of a copolymer of BMCMI and MA (yield: 84.6%) as a white powder. The resulting copolymer had Mw of 25,500 and contained 24.8 mol % of a repeating unit derived from BMCMI. The IR spectrum is shown in FIG. 5 and $^1$H-NMR spectrum is shown in FIG. 6.

EXAMPLE 4

Preparation of Vinyl Polymer

In the same manner as in Example 3, except that 5 parts of BECMI and 5 parts of MA were used in place of 5 parts of BMCMI and 5 parts of MA, the polymerization, the isolation operation and drying of the polymer were conducted to obtain 8.12 parts of a white powdered copolymer of BECMI and MA (yield: 81.2%) as a white powder. The resulting copolymer had Mw of 35,800 and contained 14.3 mol % of a repeating unit derived from BECMI.

EXAMPLE 5

Preparation of Vinyl Polymer

Figure 7:
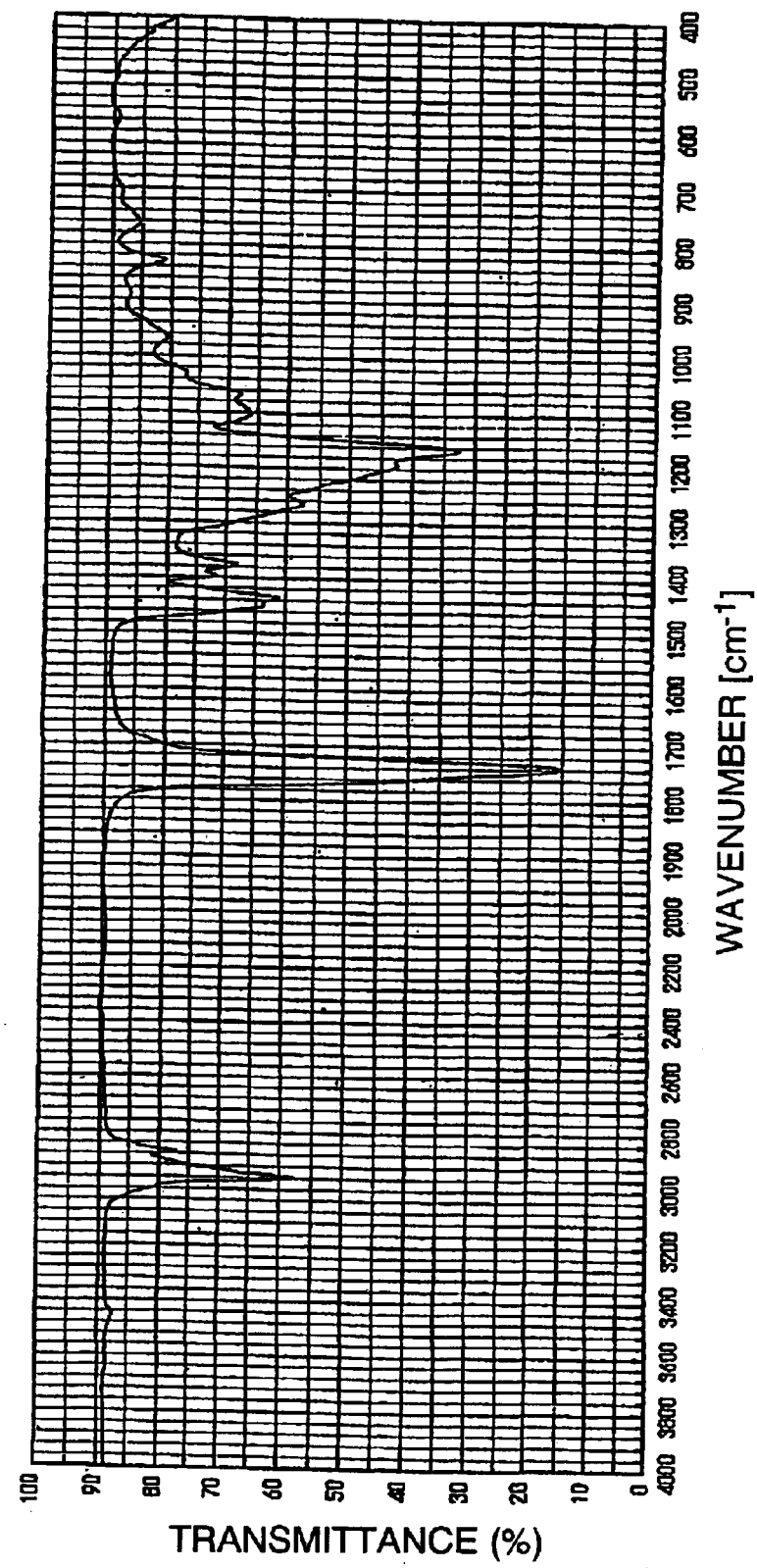
FIG. 7 is an IR spectrum of the vinyl polymer obtained in Example 5.
Figure 8:
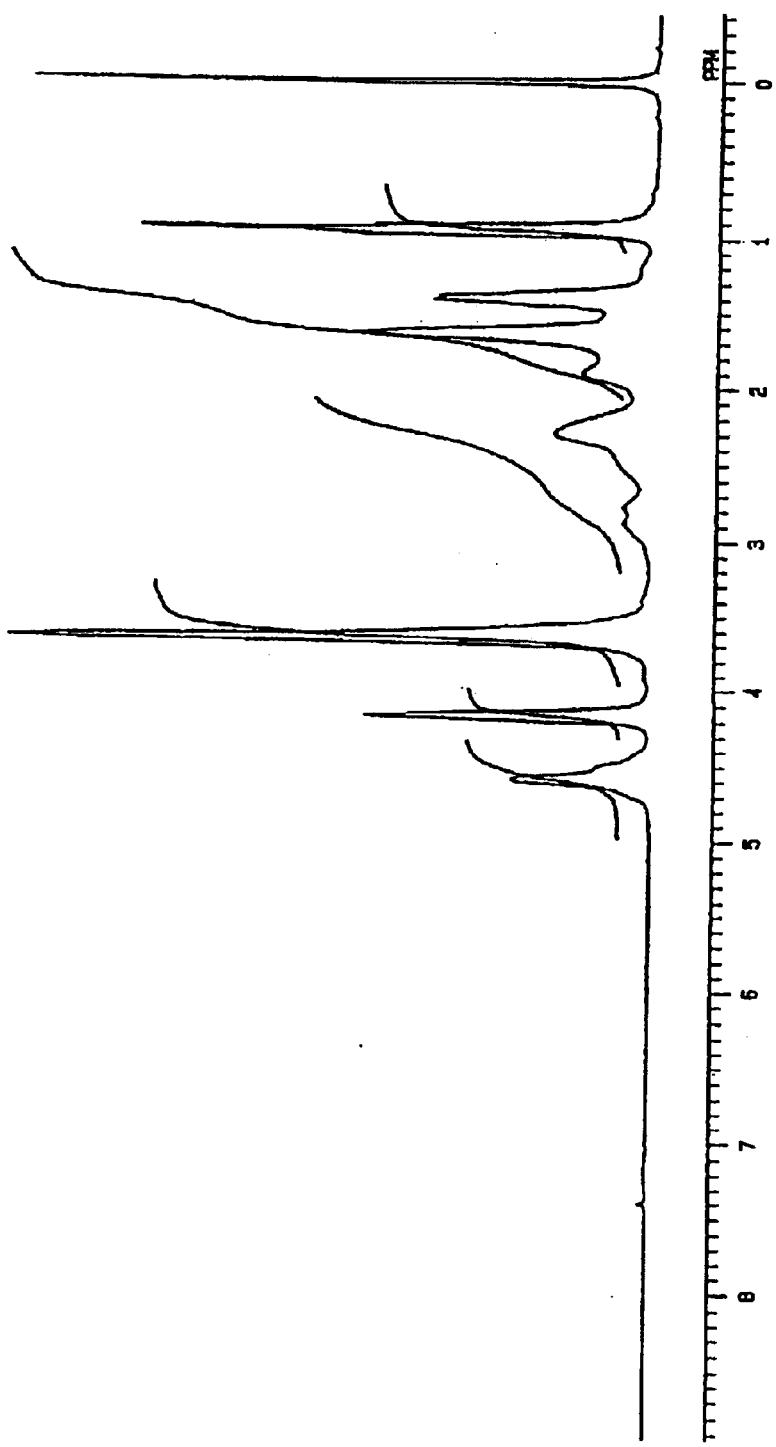
FIG. 8 is a $^1$H-NMR spectrum of the vinyl polymer obtained in Example 5.

In the same manner as in Example 3, except that 5 parts of BBCMI and 5 parts of MA were used in place of 5 parts of BMCMI and 5 parts of MA, the polymerization, the isolation operation and drying of the polymer were conducted to obtain 7.81 parts of a copolymer of BBCMI and MA (yield: 78.1%) as a white powder. The resulting copolymer had an Mw of 46,100 and contained 19.5 mol % of a repeating unit derived from BBCMI. The IR spectrum is shown in FIG. 7 and $^1$H-NMR spectrum is shown in FIG. 8.

EXAMPLE 6

Preparation of Vinyl Polymer

Figure 9:
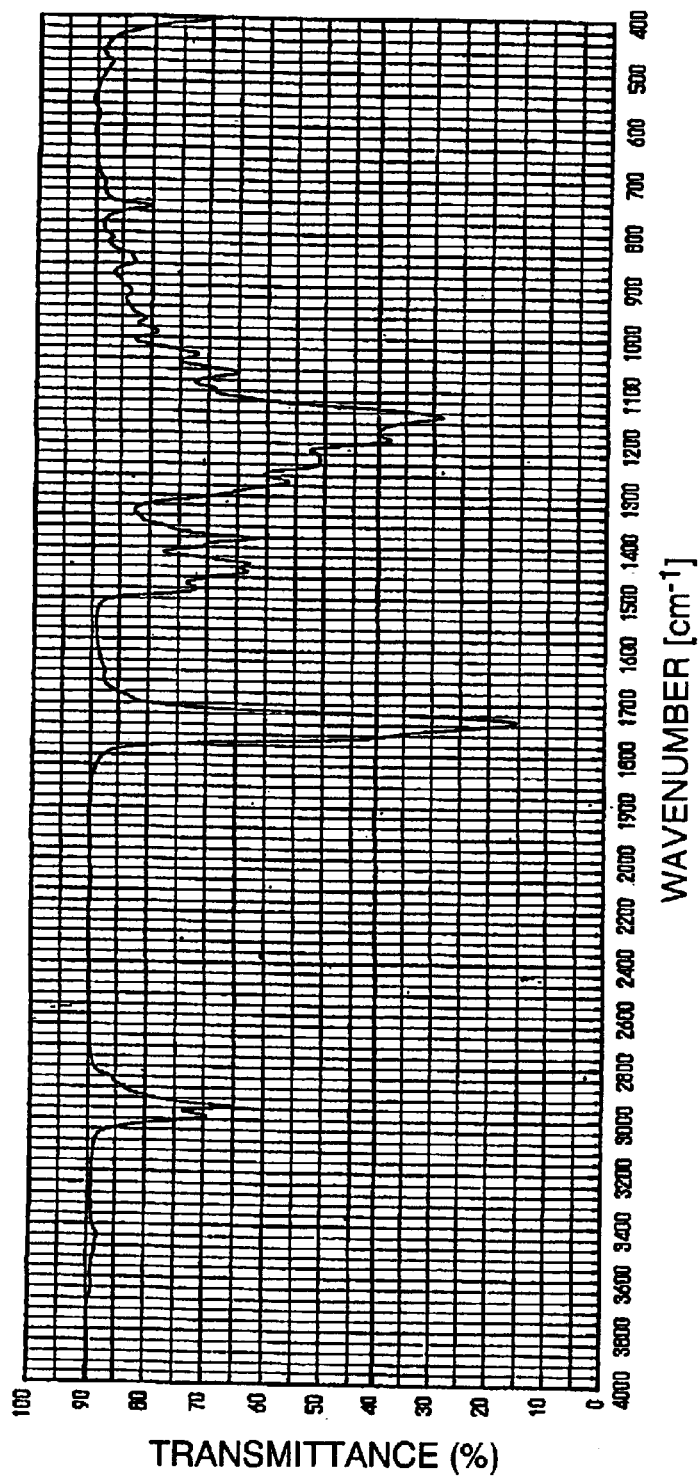
FIG. 9 is an IR spectrum of the vinyl polymer obtained in Example 6.
Figure 10:
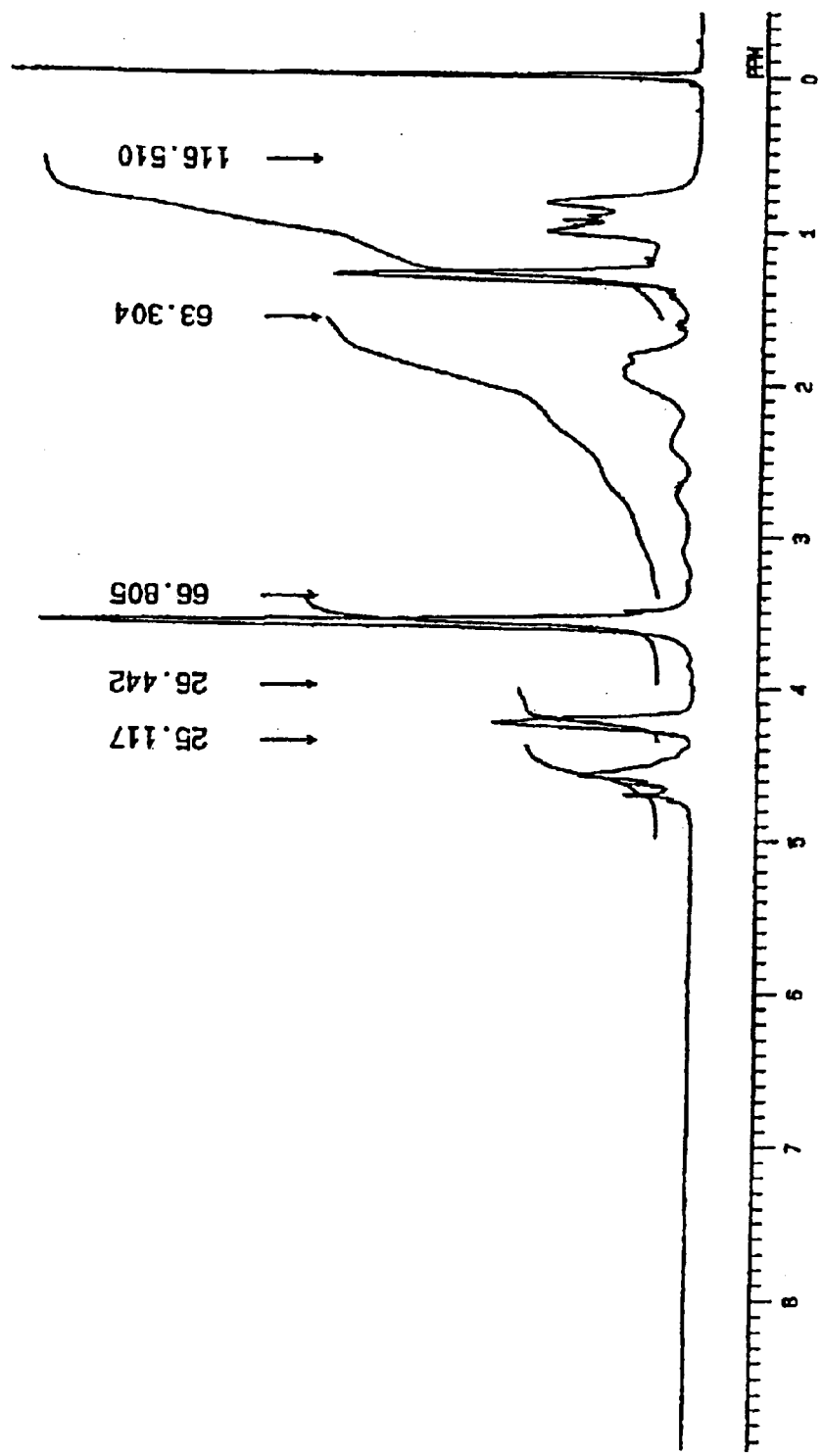
FIG. 10 is a $^1$H-NMR spectrum of the vinyl polymer obtained in Example 6.

In the same manner as in Example 3, except that 5 parts of BECMI and 5 parts of methyl methacrylate (MMA) were used in place of 5 parts of BMCMI and 5 parts of MA, the polymerization, the isolation operation and drying of the polymer were conducted to obtain 8.82 parts of a copolymer of BECMI and MMA (yield: 88.2%) as a white powder. The resulting copolymer had an Mw of 39,700 and contained 22.4 mol % of a repeating unit derived from BECMI. The IR spectrum is shown in FIG. 9 and $^1$H-NMR spectrum is shown in FIG. 10.

EXAMPLE 7

Preparation of Vinyl Polymer

In the same manner as in Example 3, except that 5 parts of BBCMI and 5 parts of MMA were used in place of 5 parts of BMCMI and 5 parts of MA, the polymerization, the isolation operation and drying of the polymer were conducted to obtain 8.53 parts of a copolymer of BBCMI and MMA (yield: 85.3%) as a white powder. The resulting copolymer had Mw of 30,000 and contained 18.7 molt of a repeating unit derived from BBCMI.

EXAMPLE 8

Preparation of Vinyl Polymer

Figure 11:
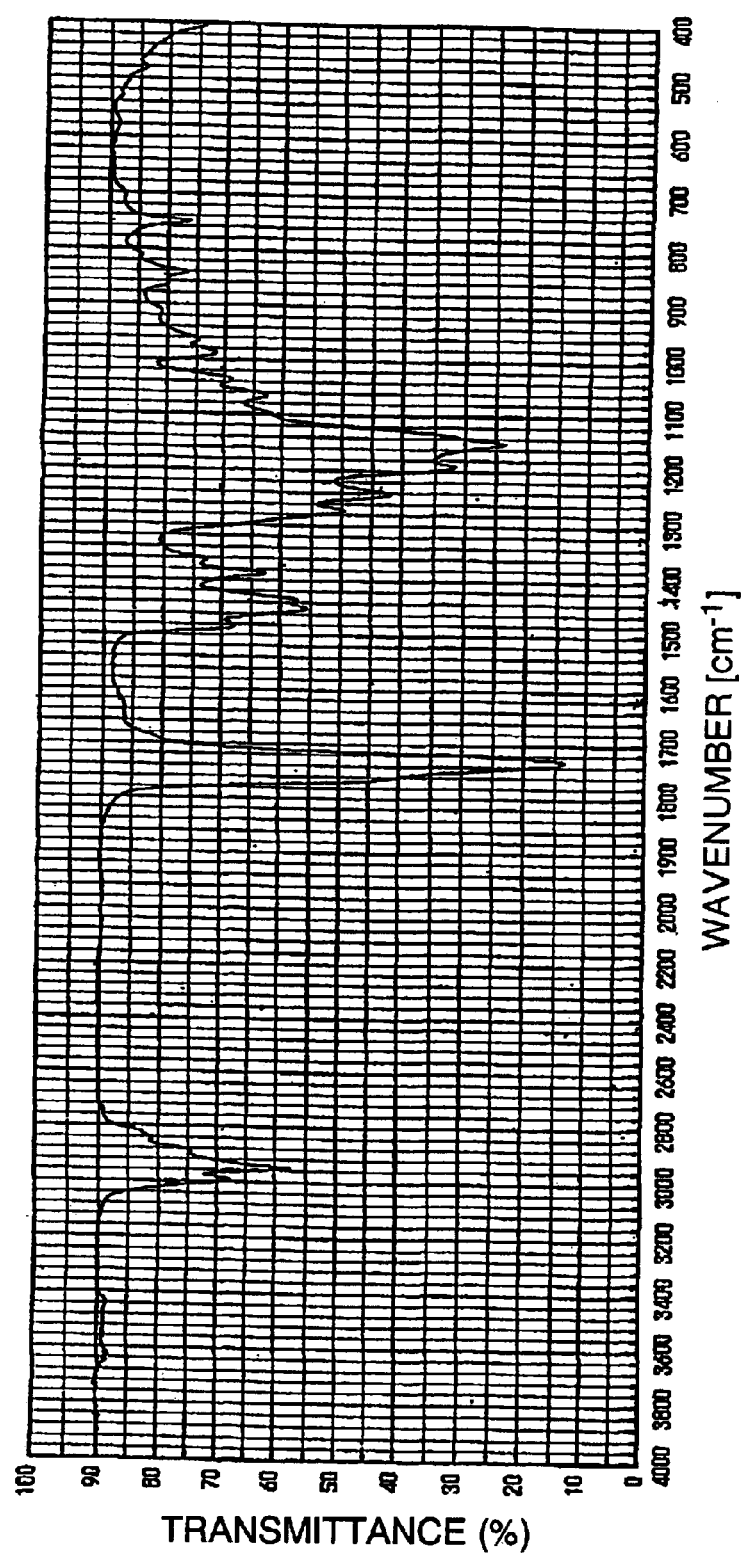
FIG. 11 is an IR spectrum of the vinyl polymer obtained in Example 8.
Figure 12:
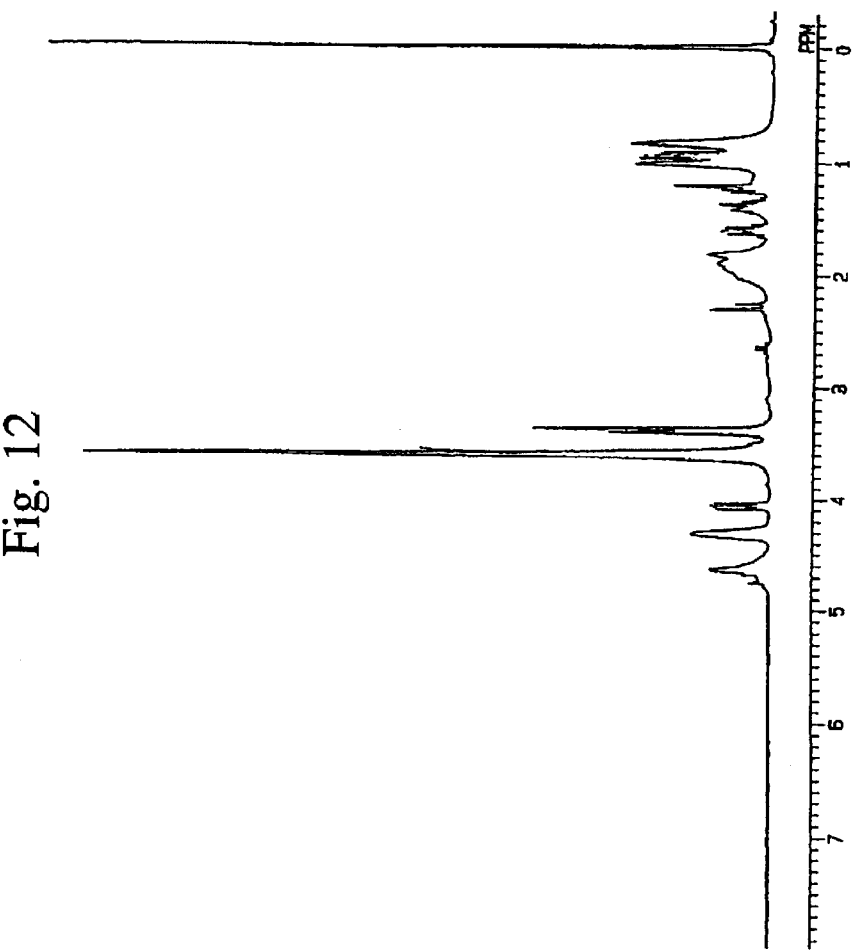
FIG. 12 is a $^1$H-NMR spectrum of the vinyl polymer obtained in Example 8.

In the same manner as in Example 3, except that 5 parts of BMECMI and 5 parts of MMA were used in place of 5 parts of BMCMI and 5 parts of MA, the polymerization, the isolation operation and drying of the polymer were conducted to obtain 7.24 parts of a copolymer of BMECMI and MMA (yield: 72.4%) as a white powder. The resulting copolymer had Mw of 21,300 and contained 19.2 molt of a repeating unit derived from BMECMI. IR spectrum is shown in FIG. 11 and $^1$H-NMR spectrum is shown in FIG. 12.

EXAMPLE 9

Preparation of Vinyl Polymer

Figure 13:
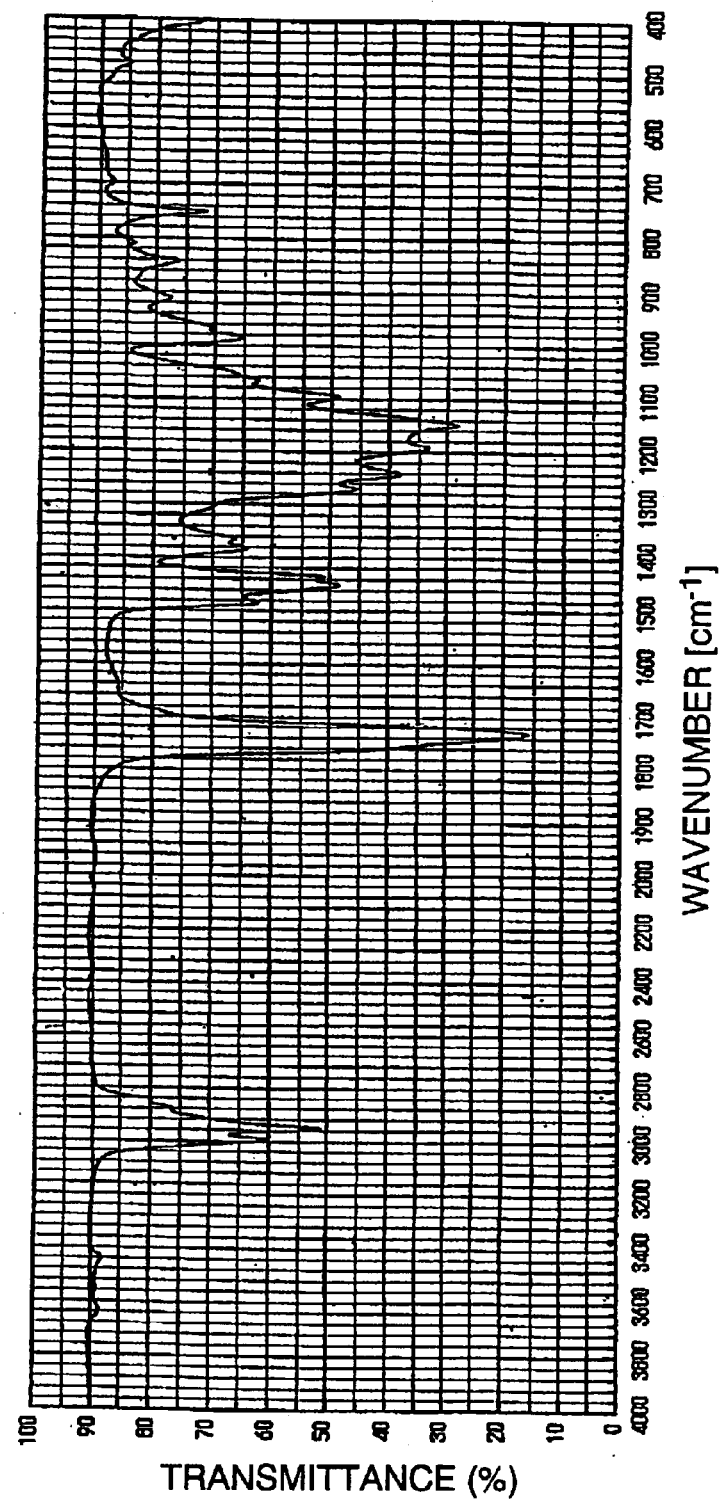
FIG. 13 is an IR spectrum of the vinyl polymer obtained in Example 9.
Figure 14:
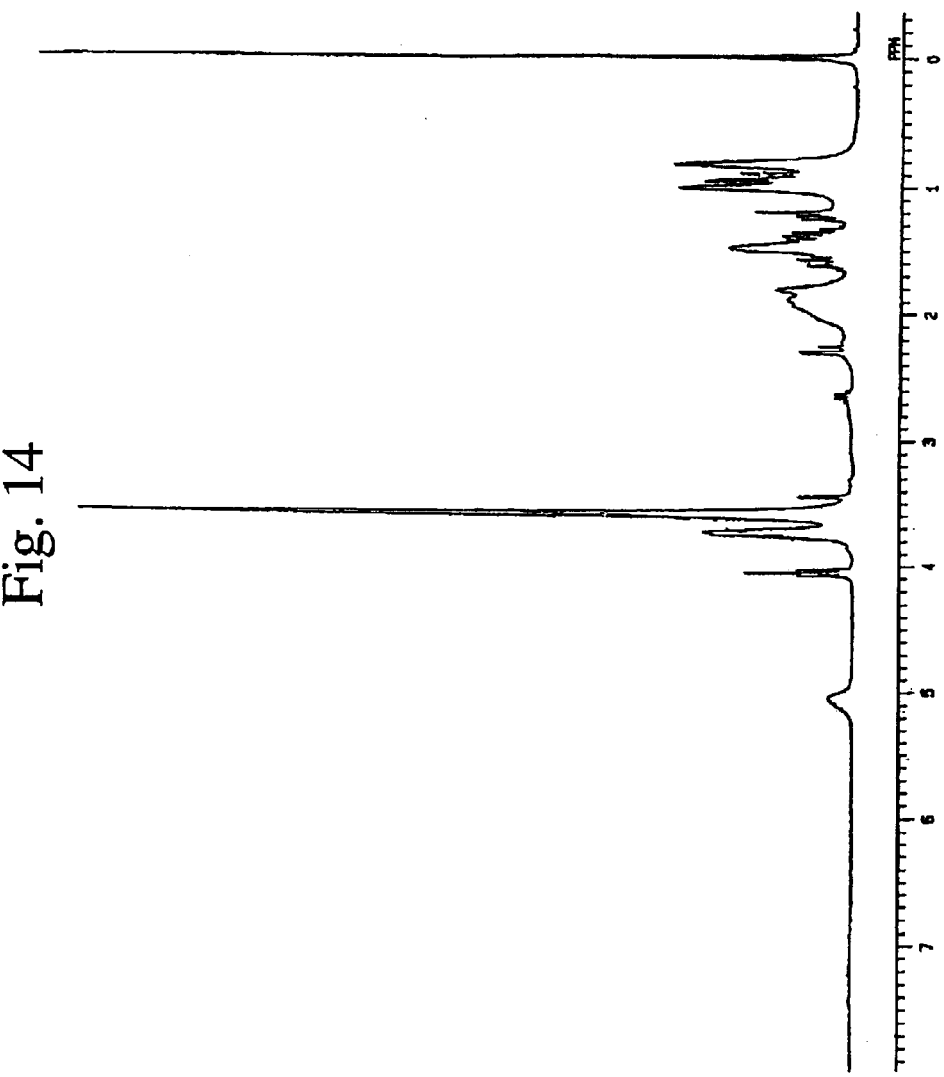
FIG. 14 is a $^1$H-NMR spectrum of the vinyl polymer obtained in Example 9.

In the same manner as in Example 3, except that 5 parts of BMCEI and 5 parts of MMA were used in place of 5 parts of BMCMI and 5 parts of MA, the polymerization, the isolation operation and drying of the polymer were conducted to obtain 7.86 parts of a copolymer of BMCEI and MMA (yield: 78.6%) as a white powder. The resulting copolymer had an Mw of 20,200 and contained 22.6 molt of a repeating unit derived from BMCEI. The IR spectrum is shown in FIG. 13 and $^1$H-NMR spectrum is shown in FIG. 14.

EXAMPLE 10

Preparation of Vinyl Polymer

Figure 15:
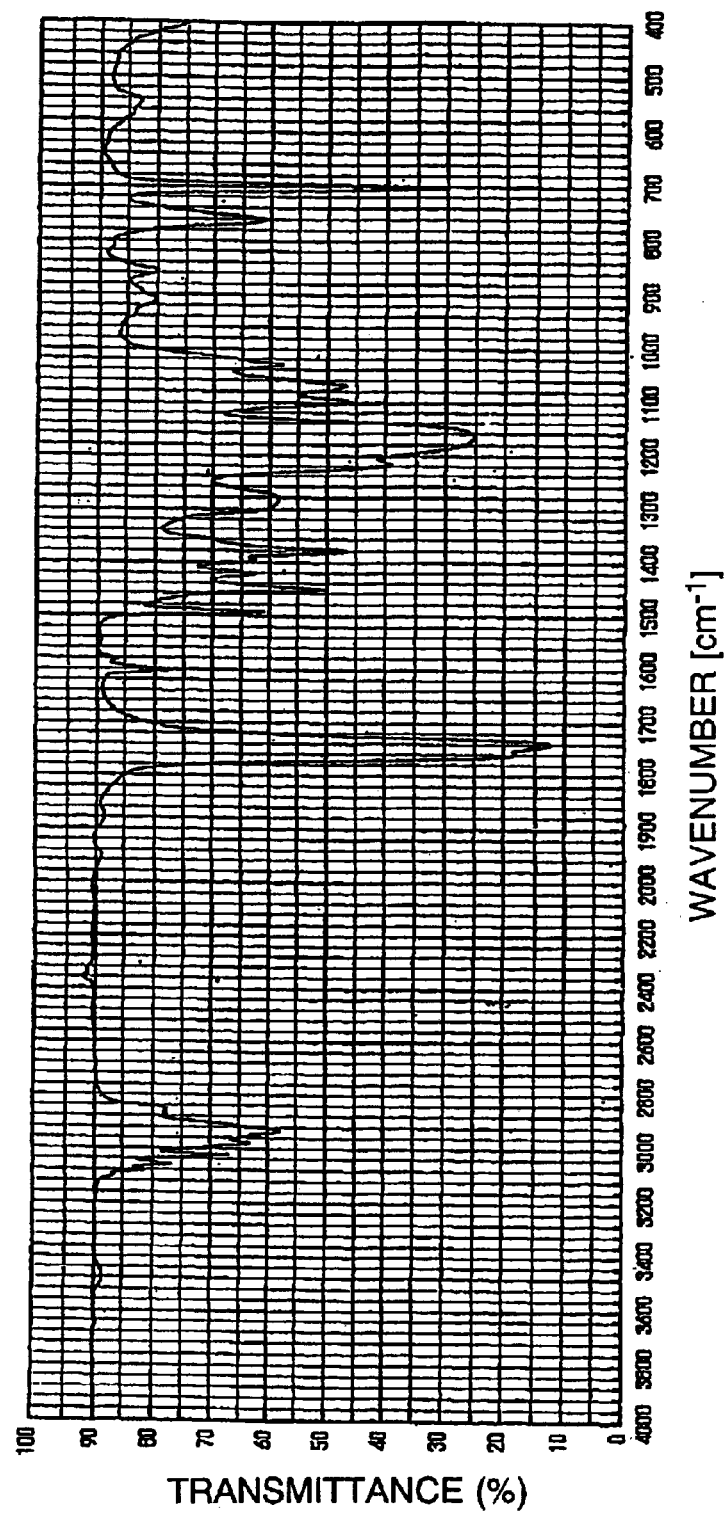
FIG. 15 is an IR spectrum of the vinyl polymer obtained in Example 10.
Figure 16:
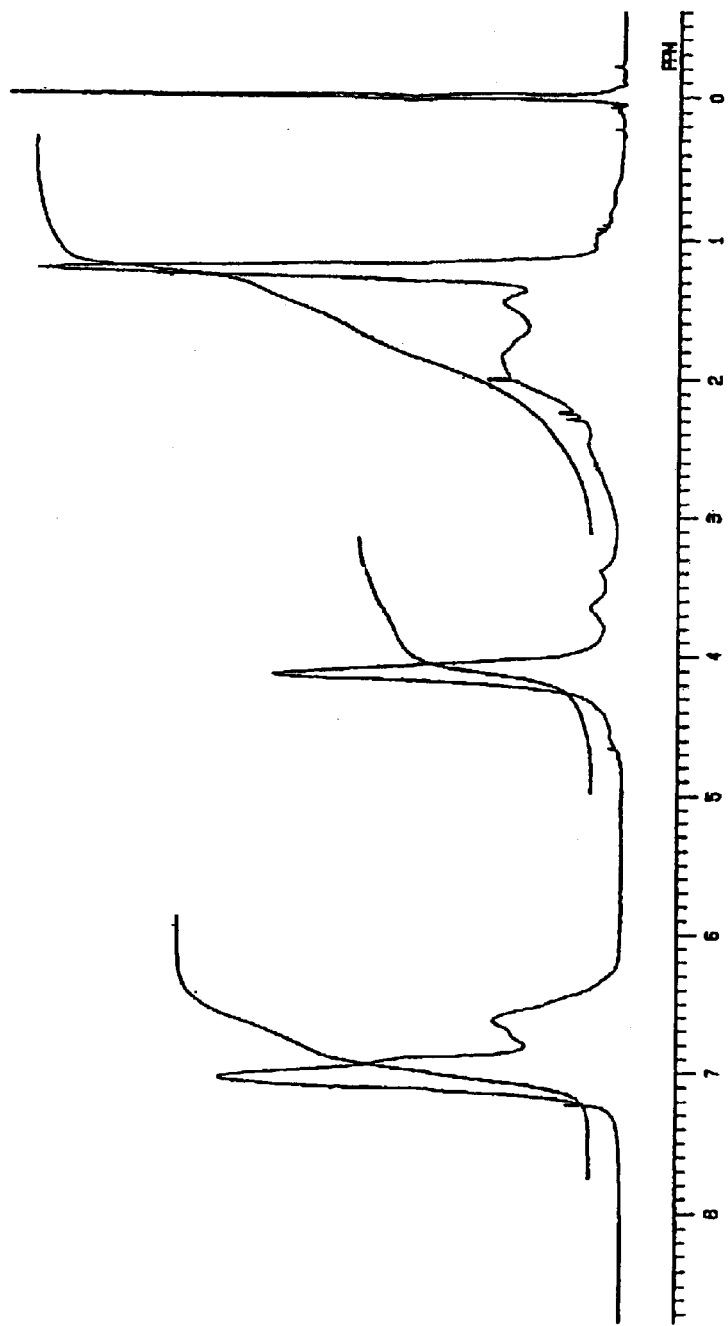
FIG. 16 is a $^1$H-NMR spectrum of the vinyl polymer obtained in Example 10.

In the same manner as in Example 3, except that 5 parts of BECMI and 5 parts of styrene (ST) were used in place of 5 parts of BMCMI and 5 parts of MA, the polymerization, the isolation operation and drying of the polymer were conducted to obtain 9.01 parts of a copolymer of BECMI and ST (yield: 90.1°) as a white powder. The resulting copolymer had an Mw of 25,600 and contained 26.3 mol % of a repeating unit derived from BECMI. The IR spectrum is shown in FIG. 15 and $^1$H-NMR spectrum is shown in FIG. 16.

EXAMPLE 11

Preparation of Vinyl Polymer

Figure 17:
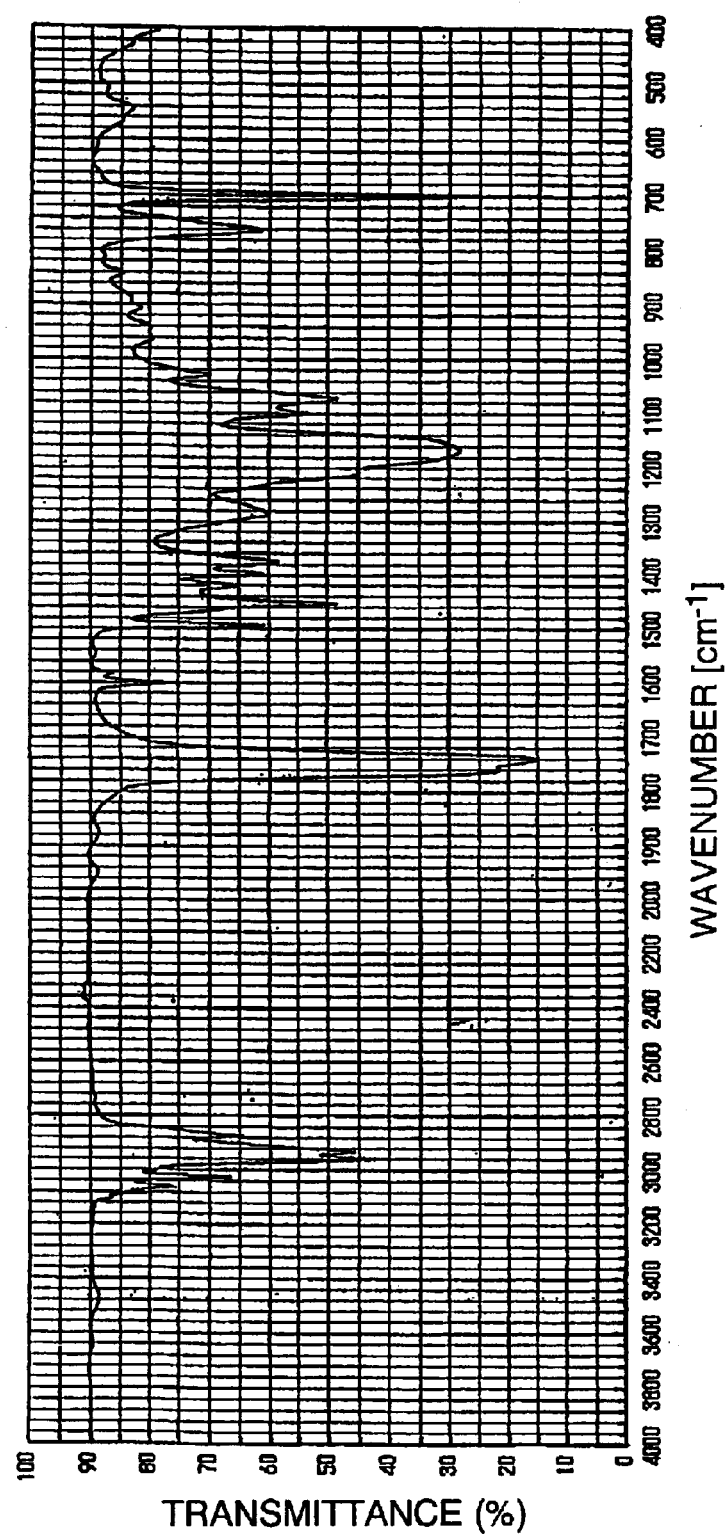
FIG. 17 is an IR spectrum of the vinyl polymer obtained in Example 11.
Figure 18:
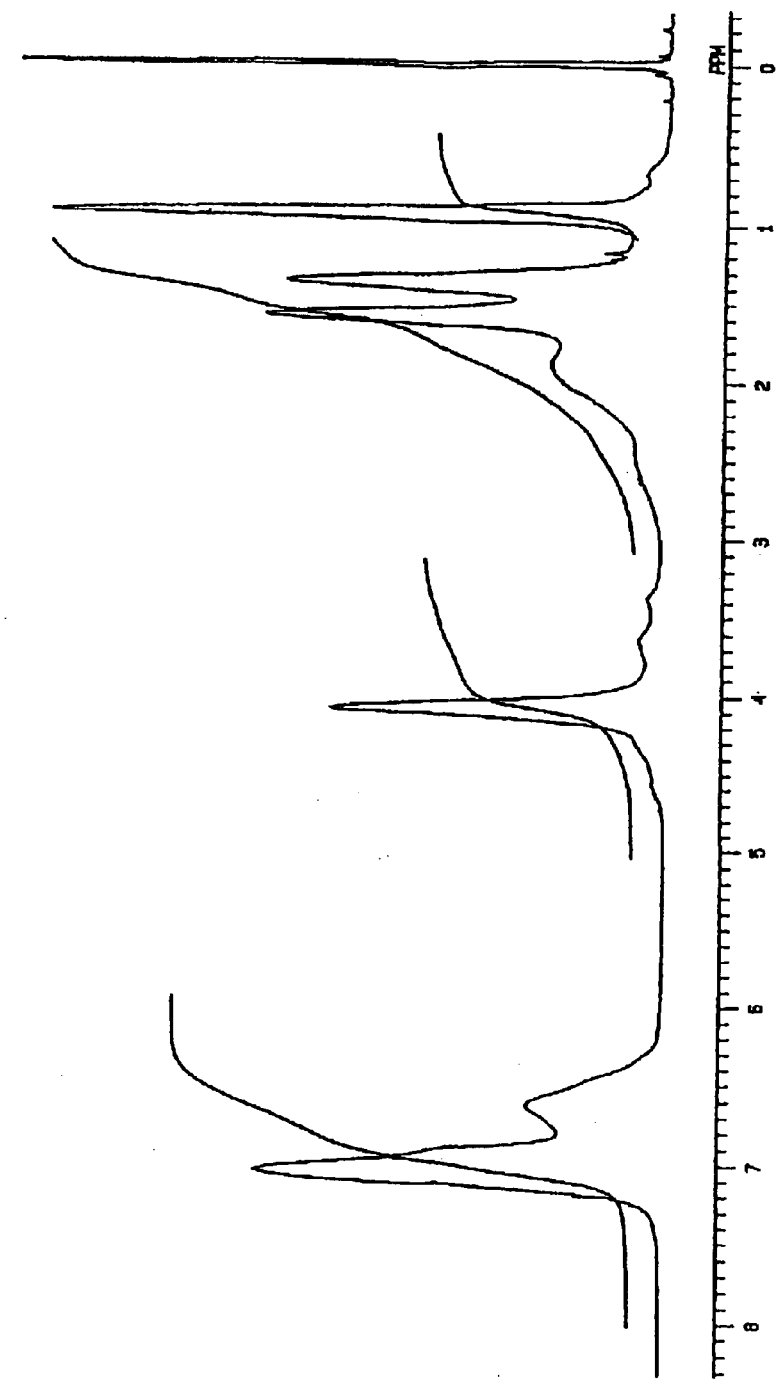
FIG. 18 is a $^1$H-NMR spectrum of the vinyl polymer obtained in Example 11.

In the same manner as in Example 3, except that 5 parts of BBCMI and 5 parts of ST were used in place of 5 parts of BMCMI and 5 parts of MA, the polymerization, the isolation operation and drying of the polymer were conducted to obtain 7.68 parts of a copolymer of BBCMI and ST (yield: 76.8%) as a white powder. The resulting copolymer had an Mw of 20,700 and contained 23.1 mol % of a repeating unit derived from BBCMI. The IR spectrum is shown in FIG. 17 and $^1$H-NMR spectrum is shown in FIG. 18.

EXAMPLE 12

Preparation of Vinyl Polymer

In a reaction vessel equipped with a stirrer, a thermometer, a condenser and a nitrogen gas inlet tube, 300 parts of Xy and 450 parts of BAc were charged and the mixture was heated to 120° C. while stirring under a nitrogen gas flow. Then, a mixture comprising 500 parts of MMCMI, 500 parts of MMA, 30 parts of DTBPO and 250 parts of BAc was added dropwise over 4 hours. After 2 hours have passed since the completion of the dropwise addition, 3 parts of DTBPO was added and the reaction was continued at the same temperature for 10 hours to obtain a solution of a copolymer of MMCMI and MMA which had nonvolatile content of 50.2%. The copolymer had an Mw of 22,400 and also contained 31.6 mol % of a repeating unit derived from MMCMI. Hereinafter, this copolymer solution is abbreviated to a vinyl polymer (VR-2-1).

EXAMPLE 13

Preparation of Vinyl Polymer

In the same reaction vessel as in Example 12, 200 parts of Xy, 350 parts of BAc and 200 parts of PGME were charged and the mixture was heated to 120° C. while stirring under a nitrogen gas flow. Then, a mixture comprising 500 parts of MBCMI, 500 parts of MMA, 30 parts of DTBPO and 250 parts of BAc was added dropwise over 4 hours. After 2 hours had passed since the completion of the dropwise addition, 3 parts of DTBPO was added and the reaction was conducted at the same temperature for 10 hours to obtain a solution of a copolymer of MBCMI and MMA which had nonvolatile content of 50.1%. The copolymer had an Mw of 19,800 and also contained 27.9 mol % of a repeating unit derived from MBCMI. Hereinafter, this copolymer solution is abbreviated to a vinyl polymer (VR-2-2).

EXAMPLE 14

Preparation of Vinyl Polymer

In the same reaction vessel as in Example 12, 500 parts of Xy and 250 parts of BAc were charged and the mixture was heated to 90° C. while stirring under a nitrogen gas flow. Then, a mixture comprising 350 parts of BBCMI, 650 parts of MMA, 250 parts of BAc and 25 parts of tert-butylperoxy-2-ethylhexanoate (TBPOEH) was added dropwise over 3 hours. After the completion of the dropwise addition, stirring was conducted at the same temperature for 10 hours to obtain a solution of a copolymer of BBCMI and MMA which had nonvolatile content of 50.0%. The copolymer had an Mw of 17,412 and also contained 13.1 mol % of a repeating unit derived from BBCMI. Hereinafter, this copolymer solution is abbreviated to a vinyl polymer (VR-2-3).

EXAMPLE 15

Preparation of Vinyl Polymer

In the same reaction vessel as in example 12,200 parts of Xy, 200 parts of PGME and 350 parts of BAc were charged and the mixture was heated to 80° C. while stirring under a nitrogen gas flow. Then, a mixture comprising 500 parts of BMCMI, 250 parts of MMA, 200 parts of vinyl acetate (VAc), 50 parts of 2-methoxyethyl metbacrylate (MEMA), 30 parts of TBPOEH and 250 parts of BAc was added dropwise over 4 hours. After 2 hours had passed since the completion of the dropwise addition, 3 parts of TBPOEH were added and stirring was conducted at the same temperature for 10 hours to obtain a solution of a BMCMI.MMA.VAc.MEMA copolymer which had nonvolatile content of 50.1%. The copolymer had an Mw of 21,800 and also contained 26.1 mol % of a repeating unit, 35.7 mol % of a repeating unit, 33.2 mol % of a repeating unit and 5.0 mol % of a repeating unit which are respectively derived from BMCMI, MMA, VAc and MEMA. Hereinafter this copolymer solution is abbreviated to a vinyl polymer (VR-2-4).

EXAMPLE 16

Preparation of Vinyl Polymer

In the same manner as in Example 15, except that 400 parts of BMCMI, 400 parts of MMA, 150 parts of VAc and 50 parts of N-methoxymethylacrylamide (MMAM) were used as the vinyl monomer in place of 500 parts of BMCMI, 250 parts of MMA, 200 parts of VAc and 50 parts of MEMA, the polymerization was conducted to obtain a solution of a BMCMI.MMA.VAc.MMAM copolymer which had nonvolatile content of 50.2%. The copolymer had an Mw of 29,600 and also contained 19.1 molt of a repeating unit, 52.4 molt of a repeating unit, 22.8 molt of a repeating unit and 5.7 molt of a repeating unit which are respectively derived from BMCMI, MMA, VAc and MMAM. Hereinafter, this copolymer solution is abbreviated to a vinyl polymer (VR-2-5).

EXAMPLE 17

Preparation of Vinyl Polymer

In the same manner as in Example 15, except that 500 parts of BMCMI, 200 parts of MMA, 200 parts of VAc and 100 parts of methoxypolyethylene glycol monomethacrylate (MPEGMA) having a number-average molecular weight of 490 were used as the vinyl monomer in place of 500 parts of BMCMI, 250 parts of MMA, 200 parts of VAc and 50 parts of MEMA, the polymerization was conducted to obtain a solution of a BMCMI.MMA.VAc.MPEGMA copolymer which had nonvolatile content of 50.3%. The copolymer had Mw of 26,500 and also contained 28.7 mol % of a repeating unit, 31.5 mol % of a repeating unit, 36.6 mol % of a repeating unit and 3.2 mol % of a repeating unit which are respectively derived from BMCMI, MMA, VAc and MPEGMA. Hereinafter, this copolymer solution is abbreviated to a vinyl polymer (VR-2-6).

EXAMPLE 18

Preparation of Vinyl Polymer

Figure 19:
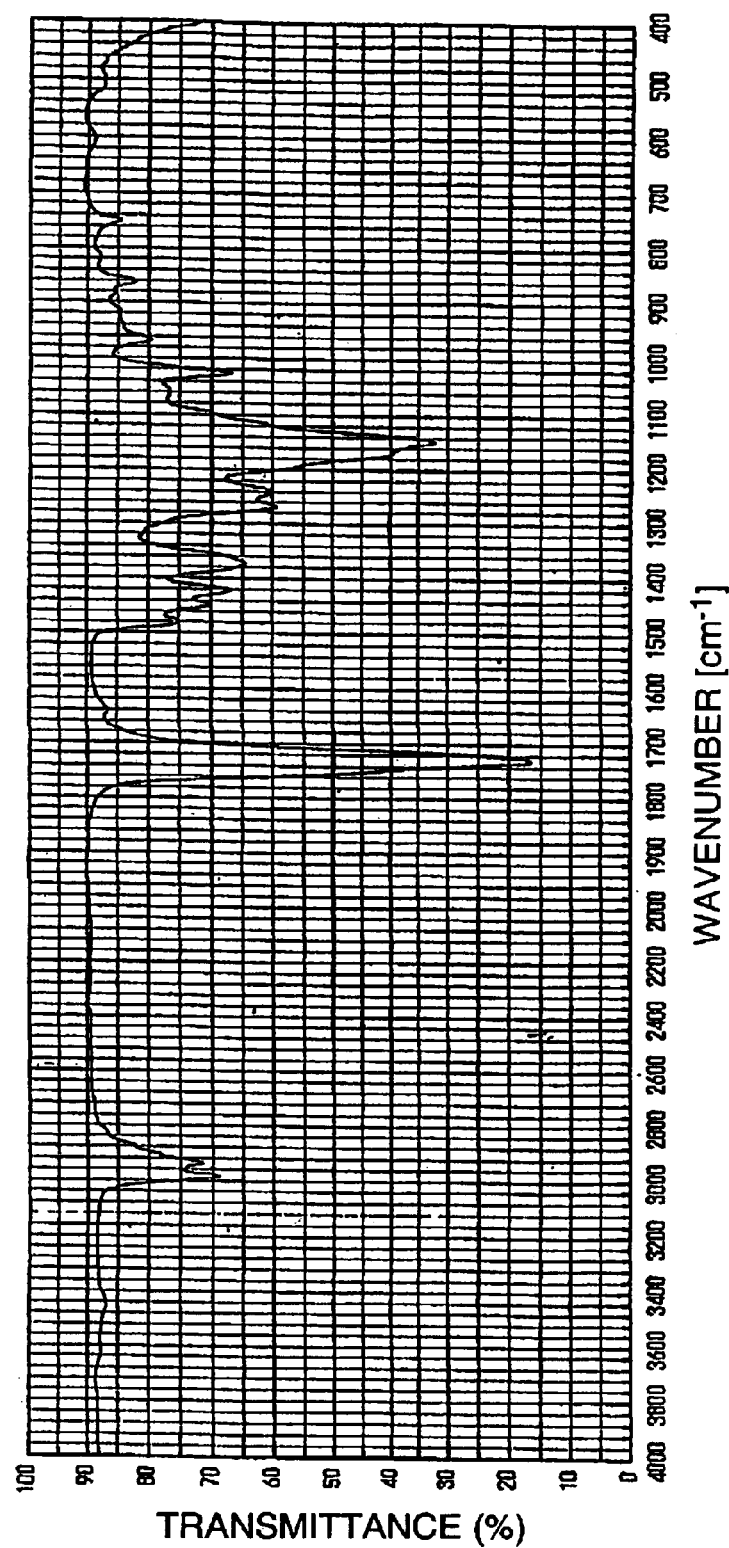
FIG. 19 is an IR spectrum of the vinyl polymer obtained in Example 18.
Figure 20:
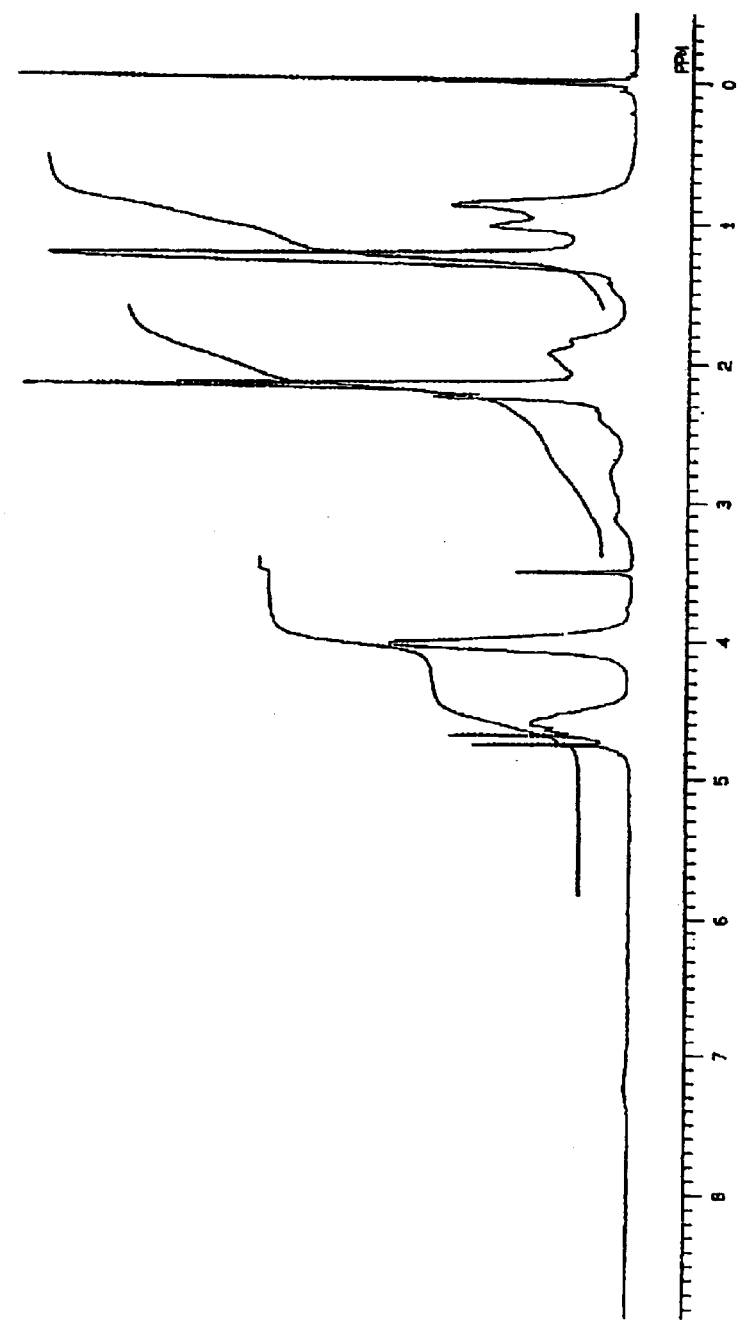
FIG. 20 is a $^1$H-NMR spectrum of the vinyl polymer obtained in Example 18.

In the same reaction vessel as in Example 1, 2.0 parts of OXPI, 2.0 parts of ethyl methacrylate (EMA), 2.0 parts of BAc, 2.0 parts of Xy and 0.2 parts of TBPOEH were charged and sufficiently mixed, and then the reaction vessel was dipped in an oil bath maintained at 80° C. and the polymerization was conducted by heating for 16 hours. A solution obtained by dissolving the resulting copolymer solution in 8 parts of THF was poured into 160 parts of methanol, to precipitate the copolymer. The precipitated copolymer was isolated by filtration and dried under reduced pressure for one day to obtain 3.10 parts of a copolymer of OXPI and EMA (yield: 77.5%) as a white powder. The resulting copolymer had an Mw of 17,800 and contained 32.0 mol % of a repeating unit derived from OXPI. The IR spectrum is shown in FIG. 19 and $^1$H-NMR spectrum is shown in FIG. 20.

EXAMPLE 19

Preparation of Vinyl Polymer

In the same manner as in Example 18, except that 2.0 parts of OXPI and 2.0 parts of MMA were used in place of 2.0 parts of OXPI and 2.0 parts of EMA, the polymerization, the isolation operation and drying of the polymer were conducted to obtain 3.14 parts of a copolymer of OXPI and MMA (yield: 78.5%) as a white powder. The resulting copolymer had an Mw of 23,000 and contained 29.2 mol % of a repeating unit derived from OXPI.

EXAMPLE 20

Preparation of Vinyl Polymer

In the same manner as in Example 18, except that 2.0 parts of OXPI and 2.0 parts of cyclohexyl methacrylate (CHMA) were used in place of 2.0 parts of OXPI and 2.0 parts of EMA, the polymerization, the isolation operation and drying of the polymer were conducted to obtain 3.21 parts of a copolymer of OXPI and CHMA (yield: 80.3%) as a white powder. The resulting copolymer had an Mw of 28,600 and contained 41.0 mol % of a repeating unit derived from OXPI.

EXAMPLE 21

Preparation of Vinyl Polymer

In the same manner as in Example 18, except that 2.0 parts of OXPI and 2.0 parts of ST were used in place of 2.0 parts of OXPI and 2.0 parts of EMA, the polymerization, the isolation operation and the drying of the polymer were conducted to obtain 3.36 parts of a copolymer of OXPI and ST (yield: 84.0%) as a white powder. The resulting copolymer had an Mw of 23,600 and contained 30.1 mol % of a repeating unit derived from OXPI.

EXAMPLE 22

Preparation of Vinyl Polymer

Figure 21:
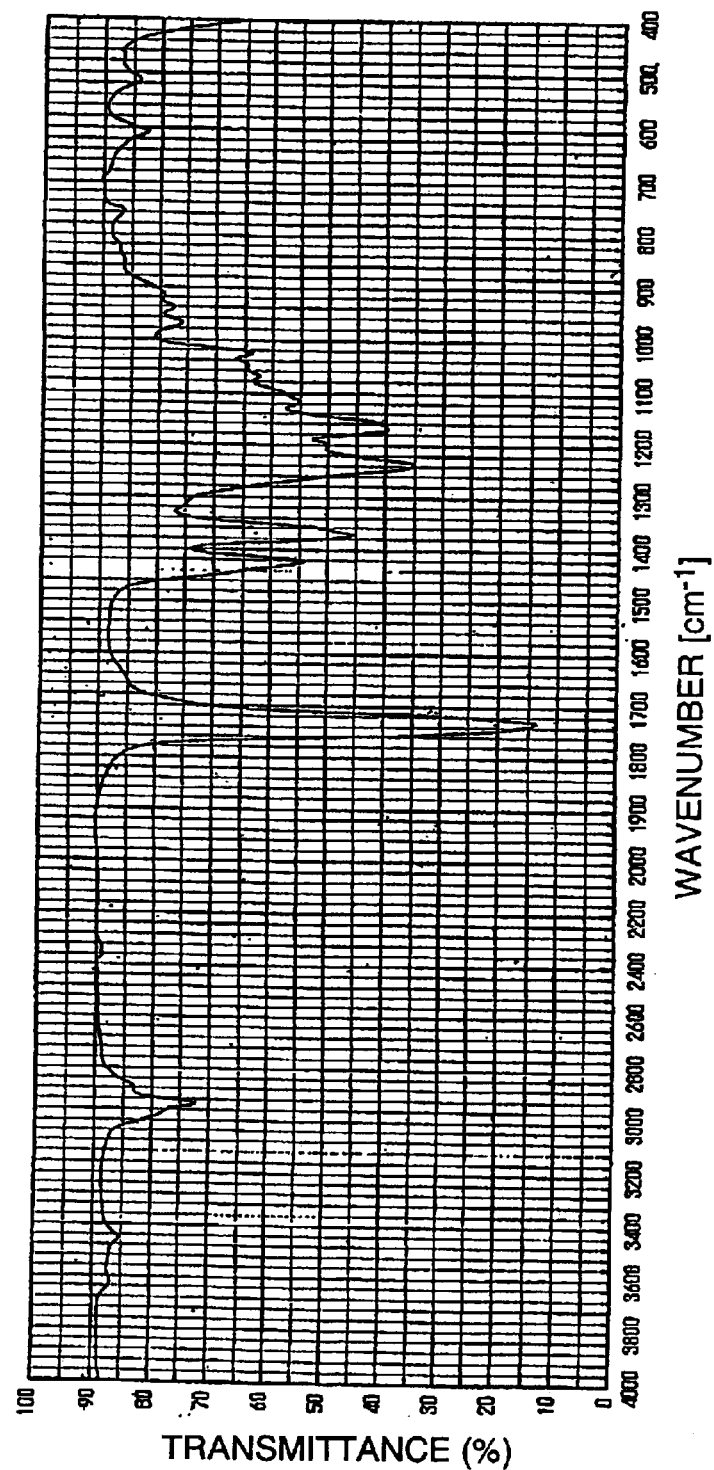
FIG. 21 is an IR spectrum of the vinyl polymer obtained in Example 22.
Figure 22:
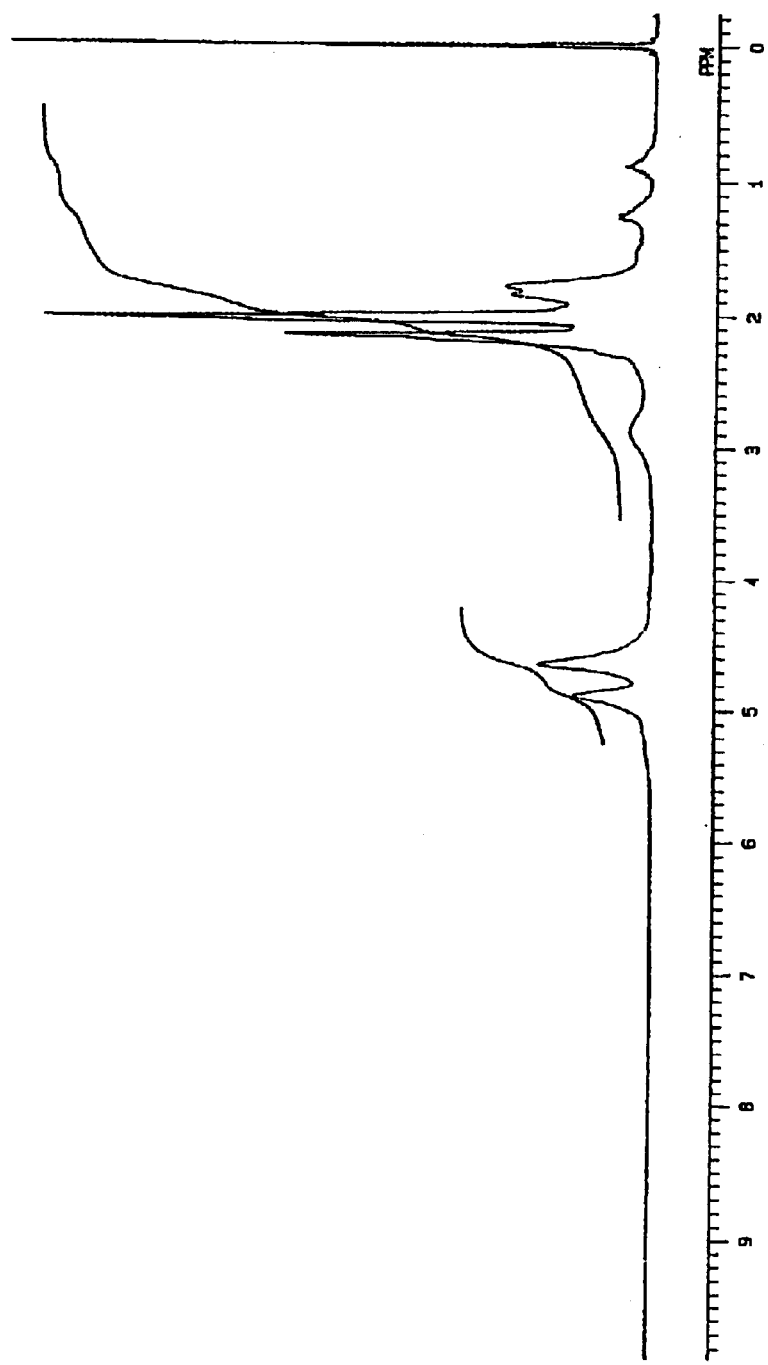
FIG. 22 is a $^1$H-NMR spectrum of the vinyl polymer obtained in Example 22.

In the same manner as in Example 18, except that 2.0 parts of OXPI and 2.0 parts of VAc were used in place of 2.0 parts of OXPI and 2.0 parts of EMA, the polymerization, the isolation operation and the drying of the polymer were conducted to obtain 2.89 parts of a copolymer of OXPI and VAc (yield: 72.3%) as a white powder. The resulting copolymer had a Mw of 14,800 and contained 32.0 mol % of a repeating unit derived from OXPI. The IR spectrum is shown in FIG. 21 and the $^1$H-NMR spectrum is shown in FIG. 22.

EXAMPLE 23

Preparation of Vinyl Polymer

In the same manner as in Example 18, except that 1.2 parts of BMCMF and 2.8 parts of ST were used in place of 2.0 parts of OXPI and 2.0 parts of EMA, the polymerization, the isolation operation and the drying of the polymer were conducted to obtain 3.32 parts of a copolymer of BMCMF and ST (yield: 83.0%) as a white powder. The resulting copolymer contained 14.6 mol % of a repeating unit derived from BMCMF and had an Mw of 18,200.

EXAMPLE 24

Preparation of Vinyl Polymer

In the same manner as in Example 18, except that 2.0 parts of BMCEF and 2.0 parts of ST were used in place of 2.0 parts of OXPI and 2.0 parts of EMA, the polymerization, the isolation operation and the drying of the polymer were conducted to obtain 3.40 parts of a copolymer of BMCEF and ST (yield: 85.0%) as a white powder. The resulting copolymer had an Mw of 44,800 and contained 26.5 mol % of a repeating unit derived from BMCEF.

EXAMPLE 25

Preparation of Vinyl Polymer

Figure 23:
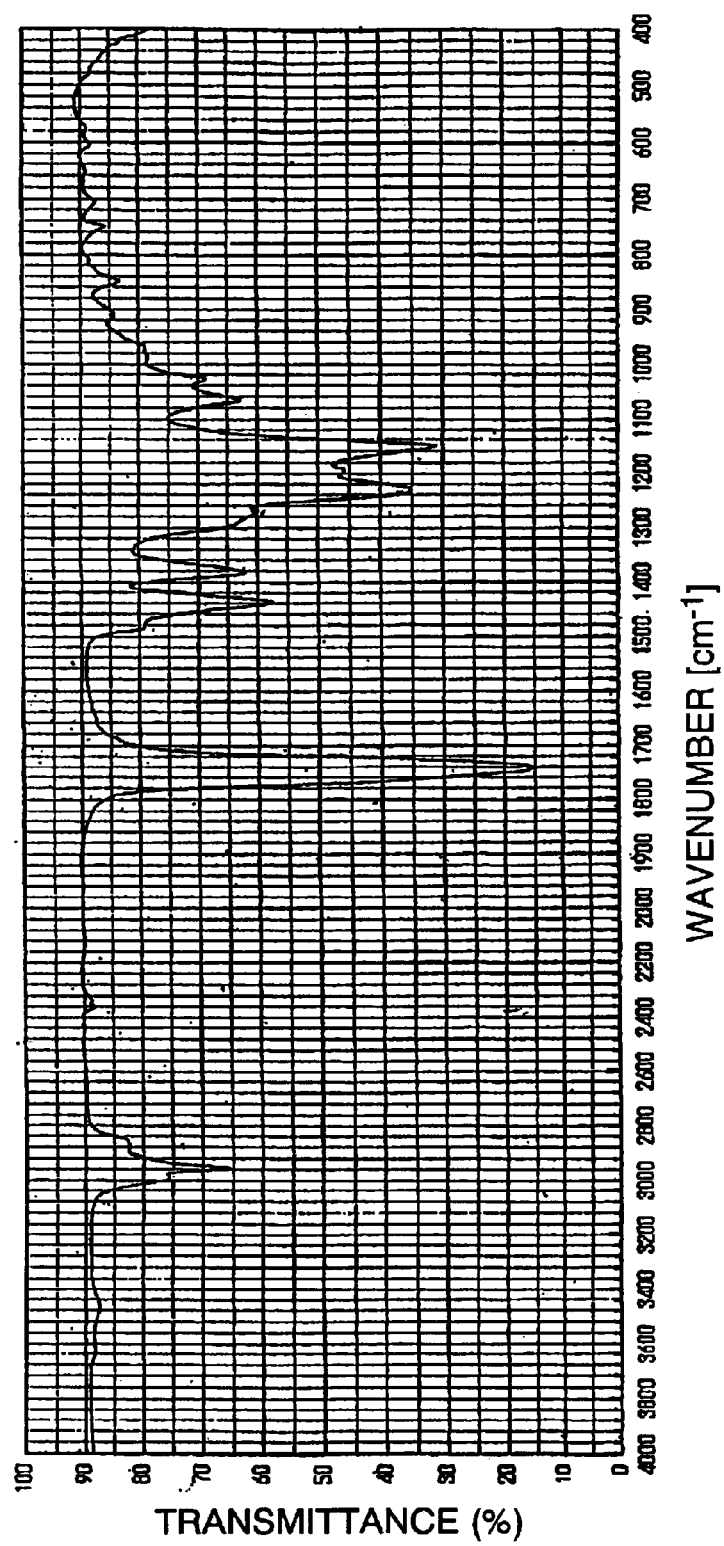
FIG. 23 is an IR spectrum of the vinyl polymer obtained in Example 25.
Figure 24:
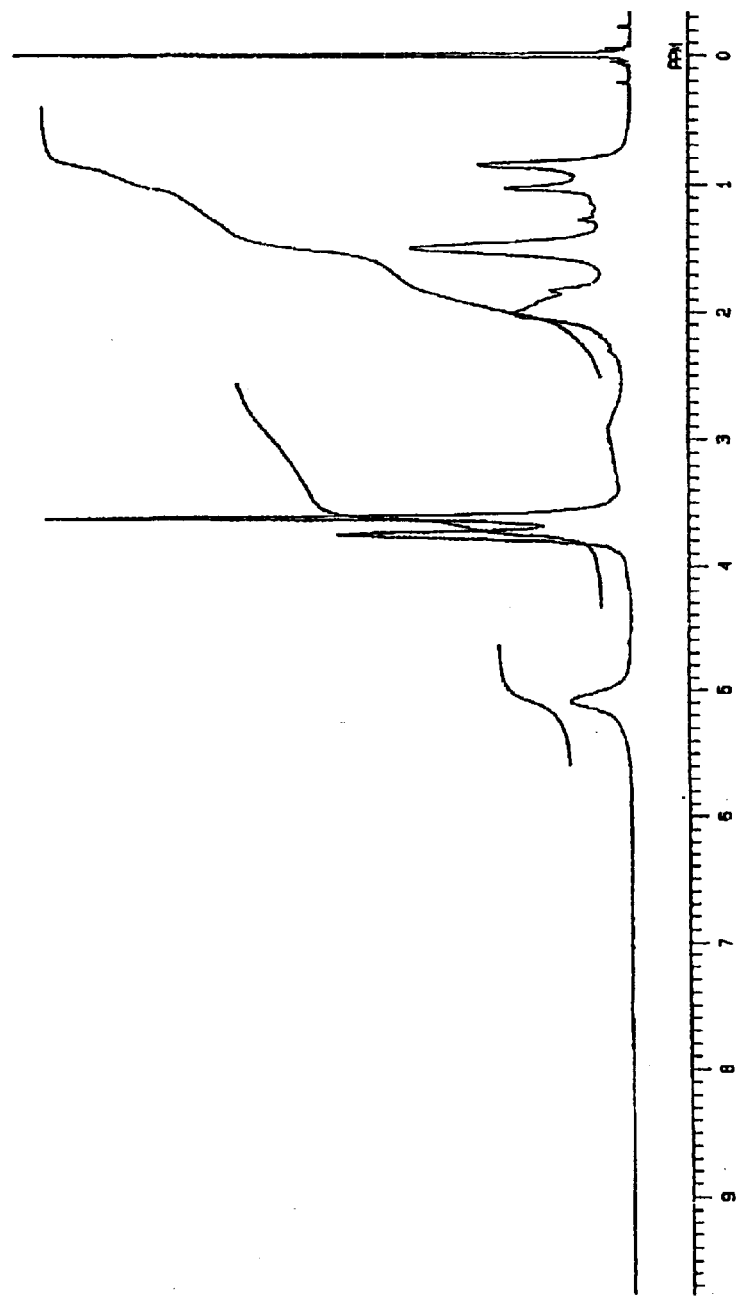
FIG. 24 is a $^1$H-NMR spectrum of the vinyl polymer obtained in Example 25.

In the same manner as in Example 18, except that 2.0 parts of BMCEF, 1.2 parts of MMA and 0.8 parts of VAc were used in place of 2.0 parts of OXPI and 2.0 parts of EMA, the polymerization, the isolation operation and the drying of the polymer were conducted to obtain 3.14 parts of a BMCEF.MMA.VAc copolymer (yield: 78.5%) as a white powder. The resulting copolymer had an Mw of 16,500 and contained 26.8 mol % of a repeating unit, 53.5% of a repeating unit and 19.7 mol % of a repeating unit which are respectively derived from BMCEF, MMA and VAc. The IR spectrum is shown in FIG. 23 and the $^1$H-NMR spectrum is shown in FIG. 24.

EXAMPLE 26

Preparation of Vinyl Polymer

In the same manner as in Example 18, except that 2.0 parts of BMCMM and 2.0 parts of ST were used in place of 2.0 parts of OXPI and 2.0 parts of EMA, the polymerization, the isolation operation and the drying of the polymer were conducted to obtain 3.09 parts of a copolymer of BMCMM and ST (yield: 77.3%) as a white powder. The resulting copolymer had an Mw of 13,500 and contained 28.6 mol % of a repeating unit derived from BMCMM.

EXAMPLE 27

Preparation of Vinyl Polymer

In the same reaction vessel as in Example 12, 100 parts of Xy and 250 parts of BAc were charged and the mixture was heated to 80° C. while stirring under a nitrogen gas flow. Then, a mixture comprising 200 parts of OXPI, 186 parts of MMA, 64 parts of VAc, 50 parts of MEMA, 10 parts of TBPOEH and 150 parts of BAc was added dropwise over 4 hours. After 2 hours had passed since the completion of the dropwise addition, 2.5 parts of TBPOEH was added and stirring was conducted at the same temperature for 10 hours to obtain a solution of a OXPI.MMA.VAc.MEMA copolymer which had nonvolatile content of 50.1%. The copolymer had an Mw of 41,200 and also contained 21.9 mol % of a repeating unit, 49.2 mol % of a repeating unit, 19.7 mol % of a repeating unit and 9.2 mol % of a repeating unit which are respectively derived from OXPI, MMA, VAc and MEMA. Hereinafter, this copolymer solution is abbreviated to a vinyl polymer (VR-2-7).

REFERENCE EXAMPLE 1

Preparation of Polymer Used in Comparative Test

In the same reaction vessel as in Example 12, 500 parts of Xy and 300 parts of BAc were charged and the mixture was heated to 80° C. while stirring under a nitrogen gas flow. Then, a mixture comprising 366 parts of methoxycarbonyl-methyl methacrylate (MCMA), 500 parts of MMA, 134 parts of VAc, 200 parts of BAc, 20 parts of TBPOEH and 20 parts of azobisisobutyronitrile was added dropwise over 4 hours. After 2 hours had passed since the completion of the dropwise addition, 5 parts of TBPOEH was added and stirring was conducted at the same temperature for 10 hours to obtain a solution of an MCMA copolymer (RP-1) which had nonvolatile content of 50.0%. The copolymer had Mw of 25,500.

REFERENCE EXAMPLE 2

Preparation of Polymer Used in Comparative Test

In the same reaction vessel as in Example 12, 500 parts of Xy and 250 parts of BAc were charged and the mixture was heated to 90° C. while stirring under a nitrogen gas flow. Then, a mixture comprising 260 parts of 2-hydroxyethyl acrylate, 500 parts of MMA, 240 parts of 2-methoxyethyl acrylate, 250 parts of BAc and 30 parts of TBPOEH was added dropwise at the same temperature over 3 hours. After the completion of the dropwise addition, stirring was conducted at the same temperature for 10 hours to obtain a solution of a copolymer (RP-2) having a hydroxyl group which had nonvolatile content of 50.0%. Mw of the resulting copolymer was 15,250.

REFERENCE EXAMPLE 3

Preparation of Polymer Used in Comparative Test

In the same reaction vessel as in Example 12, 500 parts of Xy and 250 parts of BAc were charged and the mixture was heated to 90° C. while stirring under a nitrogen gas flow. Then, a mixture comprising 563 parts of tributyltin methacrylate (TBTMA), 437 parts of MMA, 250 parts of BAc and 30 parts of TBPOEH was added dropwise at the same temperature over 3 hours. After the completion of the dropwise addition, stirring was conducted at the same temperature for 10 hours to obtain a solution of a TBTMA copolymer (RP-3) which contained 50.0% of a nonvolatile material. The resulting copolymer contained 25.6 mol % of a repeating unit derived from TBTMA and also had Mw of 13,230.

EXAMPLE 28

Preparation of Antifouling Coating Composition and Evaluation of Performances of Antifouling Coating Film An antifouling coating with the composition shown in Table 1 was prepared by a conventional procedure. That is, a mixture comprising 37 parts of a vinyl polymer (VR-2-1) as the copolymer solution prepared in Example 12, 41 parts of cuprous oxide, 6 parts of titanium oxide, 2 parts of "DISPARLON A603-20X" (fatty acid amide wax manufactured by Kusumoto Chemicals, Ltd.) as an anti-sagging agent and 14 parts of xylene was dispersed in a paint conditioner for 2 hours, using glass beads as a grinding medium, and then the resulting mixture was passed through a 100 mesh filter to obtain an antifouling coating composition.

Using the resulting antifouling coating composition, coated panels were prepared in the following manner, and then the state of the coating film, for example, the occurrence of blistering, delamination, and cracking, was evaluated, in addition to antifouling properties and polishing rate. The evaluation results are shown in Table 2.

"Evaluation of Antifouling Properties"

A sandblasted steel plate (70×200×3 mm in size) was bent so that it could be mounted to the outside of a rotating drum set up in seawater of Hiroshima Bay. An epoxy zinc-rich primer, an epoxy anticorrosive coating and a vinyl binder coat ("Silvax SQ-K", manufactured by Chugoku Marine Paints, Ltd.) were coated on the steel plate successively with a interval of one day so that each dry film thickness became 20 $\mu$m, 150 $\mu$m and 50 $\mu$m, followed by drying at room temperature for 7 days. Then, the antifouling coating composition was coated on the resulting multi-layered coating film so that the dry film thickness became 200 $\mu$m, followed by drying at room temperature for 7 days to obtain a test plate. After mounting the test plate to the outside of the rotating drum, a test under high fouling environmental conditions was conducted at a peripheral speed of 15 knots under 50% running conditions (running for 12 hours in the nighttime, while being stopped for 12 hours in the daytime) for 3, 6, 12 and 18 months. Then, antifouling properties were evaluated.

Antifouling properties were evaluated by visual observation in accordance with the following criteria.

(Criteria for Evaluation)
5: No adhesions of marine organisms are observed on the surface of a coating film.
4: Thin layer of slime is observed to adhere to the surface of a coating film.
3: Thick layer of slime is observed to adhere to the surface of a coating film.
2: Adhesion of slime and partial adhesion of plants such as the Ectocarpaceae are observed on the surface of a coating film.
1: Entire surface of a coating film is covered by a plant such as those of the Ectocarpaceae (green layer).

"Evaluation of Polishing Rate and State of Coating Film"

On a disk-shaped sandblasted steel plate having a diameter of 300 mm and a thickness of 3 mm, an epoxy zinc-rich primer, an epoxy anticorrosive coating and vinyl binder coat were coated successively with a interval of one day so that each dry film thickness became 20 $\mu$m, 150 $\mu$m or 50 $\mu$m, followed by drying at room temperature for 7 days. Then, on the multi-layered film, the antifouling coating composition was radially applied in the outer peripheral direction from the center using an applicator having an opening space of 500 $\mu$m, followed by drying at room temperature for 7 days to obtain a test plate. After mounting the test plate to a motor set up in a bath containing seawater maintained at 25° C., the test plate was rotated at a peripheral speed of 15 knots for 6 months. After 1,3 and 6 months had passed, the film thickness in the vicinity of the periphery was measured and the polishing rate was evaluated based on a difference in film thickness before and after the test, that is, a value of reduction in film thickness ($\mu$m). The larger the value, the larger the polishing rate. After rotating under the same conditions for 24 months, the state of the coating film in the vicinity of the circumference was evaluated by visual observation.

EXAMPLES 29 TO 42

In the same manner as in Example 28, except that the respective components were used in the ratio shown in Table 1, antifouling coating compositions were prepared. Using the resulting respective antifouling coating compositions, test plates were prepared in the same manner as in Example 28, and then antifouling properties, the polishing rate, and the state of the coating film were evaluated in the same manner as in Example 28. The evaluation results are shown in Table 2.

COMPARATIVE EXAMPLES 1 TO 3

In the same manner as in Example 28, except that the copolymer solutions (RP-1), (RP-2) and (RP-3) synthesized in Reference Examples 1, 2 and 3 were used as the vehicle component and other various components shown in Table 1 were used, antifouling coating compositions were prepared. Using the resulting respective antifouling coating compositions, test plates were prepared in the same manner as in Example 28, and then antifouling properties, the polishing rate and the state of the coating film were evaluated in the same manner as in Example 28. The evaluation results are shown in Table 2.

Contents of the respective components described in Table 1 are as follows.

(1) Inorganic Copper Compound Component
cuprous oxide: "NC303" manufactured by NISSIN CHEMCO, LTD.
(2) Organic Antifouling Agent
C-2-1: copper pyrithione
C-2-2: pyridine-triphenyl boron
C-2-3: 4,5-dichloro-2-n-octyl-4-isothiazolin-3-one
C-2-4: zinc pyrithione
C-2-5: 2-methylthio-4-tert-butylamino-6-cyclopropylamino-s-triazine
(2) Zinc Oxide
Zinc oxide (JIS class-3) was used.
(3) Elution Acceleration Component
Rosin solution: A 50% xylene solution of WW rosin was used. Copper naphthenate solution: A xylene solution of copper naphthenate (copper content in solution: 8%) was used.
(4) Vinyl Ether Polymer
"Lutonal A-25": polyethyl vinyl ether manufactured by BASF, Germany; viscosity: 2.5 to 6.0 Pa-s (23° C.), specific gravity: 0.96 (20° C.)
(5) Plasticizer
"Toyopalax 150": chlorinated paraffin manufactured by Tosoh Corporation; average number of carbon atoms: 14.5, chlorine content: 50% by weight, viscosity: 12 poise (25° C.), specific gravity: 1.25 (25° C.)
TCP: abbreviation of tricresyl phosphate.
(6) Dehydrating Agent
"Soluble Anhydrous Gypsum D-1": manufactured by Noritake Co., Limited.
(7) Pigment
Titanium oxide: "Titanium White R-5N" manufactured by SAKAI CHEMICAL INDUSTRY CO., LTD. was used.
Red iron oxide: Those having a red iron oxide content of at least 80% by weight were used.
(8) Additive
As the anti-sagging agent, "DISPARLON A603-20X" (fatty acid amide wax manufactured by Kusumoto Chemicals, Ltd., xylene paste having a concentration of 20%) was used.
(9) Solvent
PGME: abbreviation of propylene glycol monomethyl ether.

TABLE 1(1)

| | Examples | | | | | | | |
|---|---|---|---|---|---|---|---|---|
| | 28 | 29 | 30 | 31 | 32 | 33 | 34 | 35 |
| VR-2-1 | 37 | | | | 33 | | | |
| VR-2-2 | | 37 | | | | 33 | | |
| VR-2-3 | | | 37 | 55 | | | | |
| VR-2-4 | | | | | | | 35 | 34 |
| Cuprous oxide | 41 | 41 | 41 | | 41 | 41 | 35 | 45 |
| C-2-1 | | | | | | | 2 | |
| C-2-2 | | | | 12 | | | | 2 |
| C-2-4 | | | | | | | | |

TABLE 1(1)-continued

| | Examples | | | | | | | |
|---|---|---|---|---|---|---|---|---|
| | 28 | 29 | 30 | 31 | 32 | 33 | 34 | 35 |
| Zinc Oxide | | | | | | | 7 | |
| Rosin solution | | | | | 4 | 4 | 3 | |
| Copper naphthenate solution | | | | | | | | 4 |
| Soluble anhydrous gypsum D-1 | | | | | | | 1 | |
| Titanium oxide | 6 | 6 | 6 | 11 | 6 | 6 | 2.5 | 2.5 |
| Red iron oxide | | | | | | | 0.5 | 0.5 |
| DISPARLON A-603-20X | 2 | 2 | 2 | 2 | 2 | 2 | 2 | 2 |
| PGME | | | | | | | 5 | 5 |
| Xylene | 14 | 14 | 14 | 20 | 14 | 14 | 7 | 5 |
| Total | 100 | 100 | 100 | 100 | 100 | 100 | 100 | 100 |

TABLE 1(2)

| | Examples | | | | | | |
|---|---|---|---|---|---|---|---|
| | 36 | 37 | 38 | 39 | 40 | 41 | 42 |
| VR-2-4 | 34 | 34 | 34 | 34 | | | |
| VR-2-5 | | | | | 26 | | |
| VR-2-6 | | | | | | 26 | |
| VR-2-7 | | | | | | | 26 |
| Cuprous oxide | 36 | 35 | 44 | 44 | 38 | 38 | 38 |
| C-2-1 | | | | 3 | 3 | 3 | 3 |
| C-2-3 | | 3 | | | | | |
| C-2-5 | 3 | | 5 | | | | |
| Zinc oxide | 7 | 7 | | | 6 | 6 | 6 |
| Rosin solution | | 4 | | | 3 | 3 | 3 |
| Lutonal A-25 | 2 | | | | | | |
| Toyopalax 150 | | | 1 | | | | |
| TCP | | 2 | | 2 | 1 | 1 | 2 |
| Soluble anhydrous gypsum D-1 | 1 | 1 | | 1 | 1 | 1 | 1 |
| Titanium oxide | 2.5 | 2.5 | 2.5 | 2.5 | 3 | 3 | 3 |
| Red iron oxide | 0.5 | 0.5 | 0.5 | 0.5 | 0.5 | 0.5 | 0.5 |
| DISPARLON A-603-20X | 2 | 2 | 2 | 2 | 3 | 3 | 3 |
| PGME | 5 | 4 | 5 | 5 | 5 | 5 | 5 |
| Xylene | 7 | 5 | 6 | 6 | 10.5 | 10.5 | 9.5 |
| Total | 100 | 100 | 100 | 100 | 100 | 100 | 100 |

TABLE 1(3)

| | Examples | | |
|---|---|---|---|
| | 1 | 2 | 3 |
| RP-1 | 37 | | |
| RP-2 | | 30 | |
| RP-3 | | | 30 |
| Cuprous oxide | 41 | 45 | 45 |
| C-2-1 | | 2 | 2 |
| Zinc oxide | | 8 | 8 |
| Soluble anhydrous gypsum D-1 | | 1 | 1 |
| Titanium oxide | 6 | 2.5 | 2.5 |
| Red iron oxide | | 0.5 | 0.5 |
| DISPARLON A-603-20X | 2 | 2 | 2 |
| Xylene | 14 | 9 | 9 |
| Total | 100 | 100 | 100 |

TABLE 2(1)

| | | Examples | | | | | | | |
|---|---|---|---|---|---|---|---|---|---|
| | | 28 | 29 | 30 | 31 | 32 | 33 | 34 | 35 |
| Coating film polishing rate (μm) | after 1 month | 4 | 3 | 3 | 6 | 7 | 5 | 8 | 7 |
| | after 3 months | 12 | 8 | 9 | 15 | 20 | 15 | 23 | 22 |
| | after 6 months | 22 | 17 | 23 | 28 | 34 | 28 | 45 | 41 |
| Antifouling properties | after 3 months | 5 | 5 | 5 | 5 | 5 | 5 | 5 | 5 |
| | after 6 months | 5 | 5 | 5 | 5 | 5 | 5 | 5 | 5 |
| | after 12 months | 4 | 4 | 4 | 4 | 5 | 5 | 5 | 5 |
| | after 18 months | 3 | 3 | 3 | 2 | 4 | 4 | 4 | 4 |
| State of coating film | after 24 months | Good (no occurrence of blistering, cracking or peeling off was observed) | | | | | | | |

TABLE 2(2)

| | | Examples | | | | | |
|---|---|---|---|---|---|---|---|
| | | 36 | 40 | 41 | 42 | 40 | 41 | 42 |
| Coating film polishing rate (μm) | after 1 month | 6 | 10 | 6 | 7 | 8 | 10 | 15 |
| | after 3 months | 18 | 24 | 14 | 17 | 19 | 25 | 27 |
| | after 6 months | 33 | 45 | 28 | 30 | 38 | 46 | 54 |
| Antifouling properties | after 3 months | 5 | 5 | 5 | 5 | 5 | 5 | 5 |
| | after 6 months | 5 | 5 | 5 | 5 | 5 | 5 | 5 |
| | after 12 months | 5 | 5 | 5 | 4 | 5 | 5 | 5 |
| | after 18 months | 4 | 4 | 4 | 4 | 5 | 5 | 5 |
| State of coating film | after 24 months | Good (no occurrence of blistering, cracking or peeling off was observed) | | | | | | |

TABLE 2(3)

| | | Comparative Examples | | |
|---|---|---|---|---|
| | | 1 | 2 | 3 |
| Coating film polishing rate (μm) | after 1 month | 4 | 3 | 4 |
| | after 3 months | 6 | 3 | 12 |
| | after 6 months | 10 | 4 | 26 |
| Antifouling properties | after 3 months | 5 | 3 | 5 |
| | after 6 months | 4 | 2 | 5 |
| | after 12 months | 2 | 1 | 4 |
| | after 18 months | 1 | 1 | 4 |
| State of coating film | after 24 months | Cracking occurred | Blistering occurred | Good |

As is apparent from Table 2, the coating films obtained from the antifouling coating composition of the present invention have a proper coating film polishing rate and exhibit excellent antifouling properties for a long period. Also the coating film maintained an excellent state without blistering, cracking and delamination even when immersed in seawater for 24 months. On the other hand, as shown by Comparative Examples 1 and 2, the coating films obtained from an antifouling coating composition which does not contain a vinyl polymer of the present invention, are inferior in antifouling properties and did not maintain a good state as judged from crack and blister formation after immersion in seawater.

Industrial Applicability

According to the present invention, there can be provided an antifouling coating composition having an excellent coating film strength and exellent antifouling properties, a coated article coated with the composition, a novel resin which is useful as a matrix resin for the composition, and a manufacturing method thereof.

Therefore, an antifouling coating obtained by the present invention is particularly useful for coating hulls and marine structures.

What is claimed is:

1. An antifouling coating composition comprising a vinyl polymer (A) having, as a repeating unit, a structural unit (a) represented by the following formula (1):

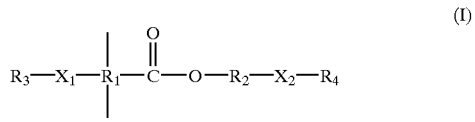

(in the formula (1), $X_1$ and $X_2$ each independently represents an ester bond or a carbonyl group; $R_1$ represents an ethylene structure which forms a covalent bond with the carbonyl carbon atom and $X_1$ in the formula (1) at the same or adjacent carbon atom; $R_2$ represents a gem-alkylene group, a vic-alkylene group, an arylmethylidene group or an arylethylene group; and $R_3$ and $R_4$ represent an alkyl group or an aryl group, or a hydrocarbon group having a carbonyl group, an ether bond or an ester bond) and an antifouling agent (B).

2. The composition according to claim 1, wherein the structural unit (a) is represented by the following formula (2):

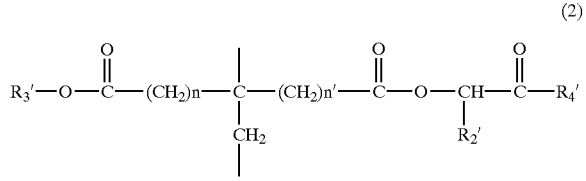

(in the formula (2), $R_2'$ represents a group selected from an alkyl group having 1 to 11 carbon atoms, a benzyl group, a phenyl group and a methylphenyl group, or a hydrogen atom; $R_3'$ represents a structure of R—, R—O—R'—, R—O—CO—CH($R_2'$)—, R—CO—CH($R_2'$)— or R—O—R'—O—CO—CH($R_2'$)—; $R_4'$ represents a structure of R—, R—O—, R—O—R'— or R—O—R'—O—, in which R represents an alkyl group having 1 to 8 carbon atoms, a benzyl group, a phenyl group, a naphthyl group or a methylphenyl group and R' represents an alkylene group having 1 to 8 carbon atoms; and n and n' each independently represents an integer of 0 or 1).

3. The composition according to claim 1, wherein the structural unit (a) is represented by the following formula (3):

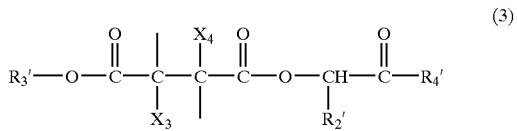

(in the formula (3), $R_2'$ represents a group selected from an alkyl group having 1 to 11 carbon atoms, a benzyl group, a phenyl group and a methylphenyl group, or a hydrogen atom; $R_3'$ represents a structure of R—, R—O—R'—, R—O—CO—CH($R_2'$)—, R—CO—CH($R_2'$)— or R—O—R'—O—CO—CR$_2'$)—; $R_4'$ represents a structure of R—, R—O—, R—O—R'— or R—O—R'—O—; and $X_3$ and $X_4$ each independently represents a hydrogen atom or a methyl group; in which R represents an alkyl group having 1 to 8 carbon atoms, a benzyl group, a phenyl group, a naphthyl group or a methylphenyl group and R' represents an alkylene group having 1 to 8 carbon atoms).

4. The composition according to claim 1, 2 or 3, wherein the vinyl polymer (A) has a weight-average molecular weight of 1,000 to 300,000.

5. The composition according to claim 1, 2 or 3, wherein the vinyl polymer (A) contains a structural unit (b) as a divalent group, which is derived from a (meth)acrylate, a (meth)acrylamide compound, a vinyl alkylcarboxylate or an aromatic vinyl compound, in a ratio of [structural unit (a)/structural unit (b)] within a range from (1/99) to (70/30) in terms of the number of each structural unit, in addition to the structural unit (a).

6. The composition according to claim 1, 2 or 3, which contains the antifouling agent (B) in the amount within a range from 1 to 70% by weight therein.

7. The composition according to claim 6, wherein the antifouling agent (B) is a compound containing Cu(I).

8. The composition according to claim 6, which contains zinc oxide in the amount within a range from 0.5 to 35% by weight therein.

9. The composition according to claim 6, which contains an elution accelerator in the amount within a range from 0.1 to 30% by weight based on the composition.

10. The composition according to claim 6, which contains a vinyl ether polymer in the amount within a range from 0.1 to 10% by weight therein.

11. A resin which has a weight-average molecular weight within a range from 1,000 to 300,000 and comprises, as a repeating unit, a structural unit (a2) represented by the following formula (2):

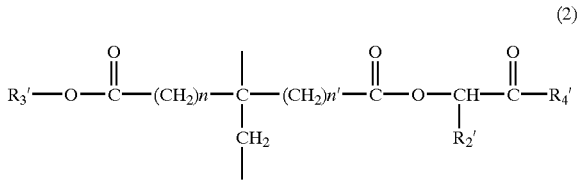

(in the formula (2), $R_2'$ represents a group selected from an alkyl group having 1 to 11 carbon atoms, a benzyl group, a phenyl group and a methylphenyl group, or a hydrogen atom; $R_3'$ represents a structure of R—, R—O—R'—, R—O—CO—CH($R_2'$)—, R—CO—CH($R_2'$)— or R—O—R'—O—CO—CH($R_2'$)—; $R_4'$ represents a structure of R—, R—O—, R—O—R'— or R—O—R'—O—, in which R represents an alkyl group having 1 to 8 carbon atoms, a benzyl group, a phenyl group, a naphthyl group or a methylphenyl group and R' represents an alkylene group having 1 to 8 carbon atoms; and n and n' each represents an integer of 0 or 1, where n is 1 when n' is 0, and n is 0 when n' is 1).

12. A resin which has a weight-average molecular weight within a range from 1,000 to 300,000 and comprises, as a repeating unit, the structural unit (a2) in claim 11 and a structural unit (b) as a divalent group, which is derived from a (meth)acrylate, a (meth)acrylamide compound, a vinyl alkylcarboxylate or an aromatic vinyl compound, wherein a ratio of the structural unit (a2) to the structural unit (b), [structural unit (a2)/structural unit (b)], is within a range from (1/99) to (70/30) in terms of the number of each structural unit.

13. A resin which has a weight-average molecular weight within a range from 1,000 to 300,000 and comprises, as a repeating unit, a structural unit (a3) represented by the following formula (3):

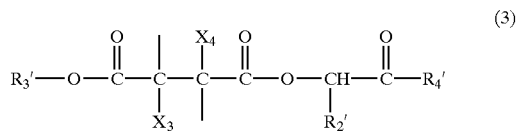

(in the formula (3), $R_2'$ represents a group selected from an alkyl group having 1 to 11 carbon atoms, a benzyl group, a phenyl group and a methylphenyl group, or a hydrogen atom; $R_3'$ represents a structure of R—, R—O—R'—, R—O—CO—CH($R_2'$)—, R—CO—CH($R_2'$)— or R—O—R'—O—CO—CH($R_2'$)—; $R_4'$ represents a structure of R—, R—O—, R—O—R'— or R—O—R'—O—; and $X_3$ and $X_4$ each independently represents a hydrogen atom or a methyl group; in which R represents an alkyl group having 1 to 8 carbon atoms, a benzyl group, a phenyl group, a naphthyl group or a methylphenyl group and R' represents an alkylene group having 1 to 8 carbon atoms).

14. A resin which has a weight-average molecular weight within a range from 1,000 to 300,000 and comprises, as a repeating unit, the structural unit (a3) in claim 13 and a structural unit (b) as a divalent group, which is derived from a (meth)acrylate, a (meth)acrylamide compound, a vinyl alkylcarboxylate or an aromatic vinyl compound, wherein a ratio of the structural unit (a2) to the structural unit (b), [structural unit (a3)/structural unit (b)], is within a range from (1/99) to (70/30) in terms of the number of each structural unit.

* * * * *